United States Patent
Perlmutter et al.

(10) Patent No.: US 12,496,297 B1
(45) Date of Patent: *Dec. 16, 2025

(54) COMPOSITIONS OF AUTOPHAGY MODULATING AGENTS AND USES THEREOF

(71) Applicants: David Perlmutter, St. Louis, MO (US); Gary Silverman, St. Louis, MO (US); Stephen Pak, St. Louis, MO (US); Roland E. Dolle, St. Louis, MO (US)

(72) Inventors: David Perlmutter, St. Louis, MO (US); Gary Silverman, St. Louis, MO (US); Stephen Pak, St. Louis, MO (US); Roland E. Dolle, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,970

(22) Filed: Oct. 22, 2021

Related U.S. Application Data

(60) Provisional application No. 63/104,780, filed on Oct. 23, 2020.

(51) Int. Cl.
| | | |
|---|---|---|
| *A61K 31/4725* | (2006.01) | |
| *A61K 31/166* | (2006.01) | |
| *A61K 31/4035* | (2006.01) | |
| *A61K 31/473* | (2006.01) | |
| *A61K 31/502* | (2006.01) | |
| *A61K 31/506* | (2006.01) | |
| *A61P 25/28* | (2006.01) | |

(52) U.S. Cl.
CPC ........ *A61K 31/4725* (2013.01); *A61K 31/166* (2013.01); *A61K 31/4035* (2013.01); *A61K 31/473* (2013.01); *A61K 31/502* (2013.01); *A61K 31/506* (2013.01); *A61P 25/28* (2018.01)

(58) Field of Classification Search
CPC .............. A61K 31/4725; A61K 31/166; A61K 31/4035; A61K 31/473; A61K 31/502; A61K 31/506; A61P 25/28
See application file for complete search history.

(56) References Cited

U.S. PATENT DOCUMENTS

| | | | | |
|---|---|---|---|---|
| 2004/0248931 A1* | 12/2004 | Fujio | ........................ | A61P 9/10 514/309 |
| 2009/0069300 A1* | 3/2009 | Zhou | .................... | C07D 403/14 514/394 |
| 2014/0302987 A1* | 10/2014 | Frackenpohl | .......... | A01N 43/42 546/64 |

FOREIGN PATENT DOCUMENTS

| | | | | |
|---|---|---|---|---|
| CN | 110746353 A | * | 2/2020 | .............. A61P 29/00 |
| WO | WO-02090334 A1 | * | 11/2002 | .............. A61K 31/47 |
| WO | WO-02094790 A1 | * | 11/2002 | ......... A61K 31/4365 |
| WO | WO-2010017048 A1 | * | 2/2010 | ........... C07D 217/24 |
| WO | WO-2010039079 A1 | * | 4/2010 | ......... A61K 31/4725 |

OTHER PUBLICATIONS

Wang et al. An analog of libenclamide selectively enhances autophagic degradation of misfolded alpha1-antitrypsin Z. PLOS One. Published Jan. 23, 2019. (Year: 2019).*
Translation of CN110746353. Retrieved from Google Patents on Nov. 6, 2024, https://patents.google.com/patent/CN110746353A/en?oq=cn110746353. Published Feb. 4, 2020. (Year: 2020).*
Abernathy et al. (2017) MicroRNAs Induce a Permissive Chromatin Environment that Enables Neuronal Subtype-Specific Reprogramming of Adult Human Fibroblasts. Cell Stem Cell, 21, 332-348 e339, doi:10.1016/j.stem.2017.08.002.

(Continued)

*Primary Examiner* — James H Alstrum-Acevedo
*Assistant Examiner* — Lauren Wells

(57) ABSTRACT

The present disclosure is directed to compositions and methods for modulating autophagy for treatment and prevention of autophagy-associated diseases, disorders, or conditions. Methods include administering a pharmaceutical composition comprising an autophagy modulating agent selected from formulas

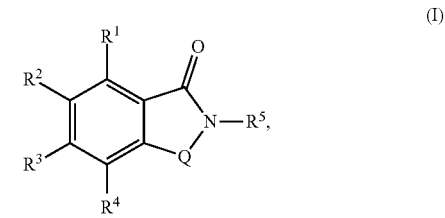

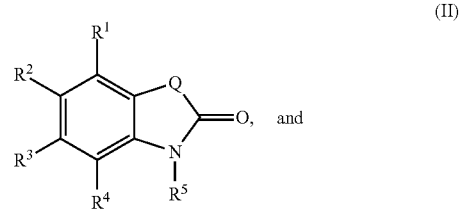

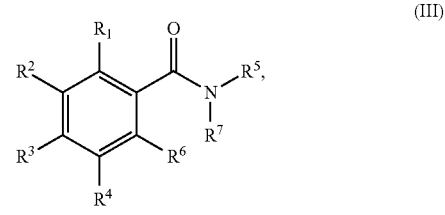

as defined herein.

17 Claims, 59 Drawing Sheets

Specification includes a Sequence Listing.

(56) References Cited

OTHER PUBLICATIONS

Ao et al. (2014) Regulation of autophagy by the Rab GTPase network. Cell Death Differ 21, 348-358, doi:10.1038/cdd.2013.187.

Ashkenazi et al. (2017) Polyglutamine tracts regulate beclin 1-dependent autophagy. Nature, 545, 108-111, doi:10.1038/nature22078.

Baumann et al. (2014) miRNA-based therapies: strategies and delivery platforms for oligonucleotide and non-oligonucleotide agents. Future Med Chem, 6, 1967-1984, doi: 10.4155/fmc.14.116.

Brinkman et al. (1997) The likelihood of being affected with Huntington disease by a particular age, for a specific CAG size. Am J Hum Genet, 60, 1202-1210.

Byun et al. (2009) The Rac1/MKK7/JNK pathway signals upregulation of Atg5 and subsequent autophagic cell death in response to oncogenic Ras. Carcinogenesis, 30, 1880-1888, doi:10.1093/carcin/bgp235.

Cates et al. (2021) Deconstructing Stepwise Fate Conversion of Human Fibroblasts to Neurons by MicroRNAs. Cell Stem Cell, 28, 127-140 e129, doi:10.1016/j.stem.2020.08.015.

Chen et al. (2016) The Inhibition of microRNA-128 on IGF-1-Activating mTOR Signaling Involves in Temozolomide-Induced Glioma Cell Apoptotic Death. PLoS One, 11, e0167096, doi: 10.1371/journal.pone.0167096.

Church et al. (2021) Generation of Human Neurons by microRNA-Mediated Direct Conversion of Dermal Fibroblasts. Methods Mol Biol, 2239, 77-100, doi: 10.1007/978-1-0716-1084-8_6.

Corces et al. (2017) An improved ATAC-seq protocol reduces background and enables interrogation of frozen tissues. Nat Methods, 14, 959-962, doi:10.1038/nmeth.4396.

Fox et al. (2020) Huntington's Disease Pathogenesis Is Modified In Vivo by Alfy/Wdfy3 and Selective Macroautophagy. Neuron, 105, 813-821 e816, doi:10.1016/j.neuron.2019.12.003.

Gabel et al. (2015) Disruption of DNA-methylation-dependent long gene repression in Rett syndrome. Nature, 522, 89-93, doi: 10.1038/nature14319.

Hanna et al. (2019) The Potential for microRNA Therapeutics and Clinical Research. Front Genet, 10, 478, doi:10.3389/fgene.2019.00478.

Hidvegi et al. (2005). Accumulation of mutant alpha1-antitrypsin Z in the endoplasmic reticulum activates caspases-4 and -12, NFkappaB, and BAP31 but not the unfolded protein response. J Biol Chem, 280(47):39002-39015. Doi:10.1074/jbc.M508652200.

Hidvegi et al. (2010). An autophagy-enhancing drug promotes degradation of mutant alpha-1-antitrypsin Z and reduces hepatic fibrosis. Science, 329(5988):229-232.

Horvath. (2013) DNA methylation age of human tissues and cell types. Genome Biol, 14, R115, doi:10.1186/gb-2013-14-10-r115.

Huh et al. (2016) Maintenance of age in human neurons generated by microRNA-based neuronal conversion fibroblasts. Elife, 5, doi: 10.7554/eLife.18648.

Jung et al. (2005) STAT3 is a potential modulator of HIF-1-mediated VEGF expression in human renal carcinoma cells. FASEB J, 19, 1296-1298, doi:10.1096/fj.04-3099fje.

Kremer et al. (1994) A worldwide study of the Huntington's disease mutation. The sensitivity and specificity of measuring CAG repeats. N Engl J Med, 330, 1401-1406, doi:10.1056/NEJM199405193302001.

Langfelder et al. (2008) WGCNA: an R package for weighted correlation network analysis. BMC Bioinformatics, 9, 559, doi:10.1186/1471-2105-9-559.

Lee et al. (2018) MicroRNAs Overcome Cell Fate Barrier by Reducing EZH2-Controlled REST Stability during Neuronal Conversion of Human Adult Fibroblasts. Dev Cell, 46, 73-84 e77, doi:10.1016/j.devcel.2018.06.007.

Li et al. (2014). Fluphenazine reduces proteotoxicity in C. elegans and mammalian models of alpha-1-antitrypsin deficiency. PLoS One, 9(1):e87260. Doi: 10.1371/journal.pone.0087260.

Li et al. (2017) Chemotherapy-mediated miR-29b expression inhibits the invasion and angiogenesis of cervical cancer. Oncotarget, 8, 14655-14665, doi:10.18632/oncotarget.14738.

Mccoy et al. (2020) Intron and gene size expansion during nervous system evolution. BMC Genomics, 21, 360, doi:10.1186/s12864-020-6760-4.

Mccoy et al. (2018) LONGO: an R package for interactive gene length dependent analysis for neuronal identity. Bioinformatics, 34, i422-i428, doi:10.1093/bioinformatics/bty243.

Mertens et al. (2015) Directly Reprogrammed Human Neurons Retain Aging-Associated Transcriptomic Signatures and Reveal Age-Related Nucleocytoplasmic Defects. Cell Stem Cell, 17, 705-718, doi:10.1016/j.stem.2015.09.001.

Mertens et al. (2016) Evaluating cell reprogramming, differentiation and conversion technologies in neuroscience. Nat Rev Neurosci, 17, 424-437, doi: 10.1038/nrn.2016.46.

Miller et al. (2013) Human iPSC-based modeling of late-onset disease via progerin-induced aging. Cell Stem Cell, 13, 691-705, doi:10.1016/j.stem.2013.11.006.

Ocker et al. (2007) Histone deacetylase inhibitors: signalling towards p21cip1/waf1. Int J Biochem Cell Biol, 39, 1367-1374, doi:10.1016/j.biocel.2007.03.001.

Patterson et al. (2012) Defining the nature of human pluripotent stem cell progeny. Cell Res, 22, 178-193, doi:10.1038/cr.2011.133.

Pensa et al. (2014) Signal transducer and activator of transcription 3 and the phosphatidylinositol 3-kinase regulatory subunits p55alpha and p50alpha regulate autophagy in vivo. FEBS J, 281, 4557-4567, doi:10.1111/febs.13035.

Richner et al. (2015) MicroRNA-based conversion of human fibroblasts into striatal medium spiny neurons. Nat Protoc, 10, 1543-1555, doi: 10.1038/nprot.2015.102.

Ross et al. (2014) Huntington disease: natural history, biomarkers and prospects for therapeutics. Nat Rev Neurol, 10, 204-216, doi:10.1038/nrneurol.2014.24.

Ryabaya et al. (2017) Autophagy inhibitors chloroquine and LY294002 enhance temozolomide cytotoxicity on cutaneous melanoma cell lines in vitro. Anticancer Drugs, 28, 307-315, doi:10.1097/CAD.0000000000000463.

Victor et al. (2014) Generation of human striatal neurons by microRNA-dependent direct conversion of fibroblasts. Neuron, 84, 311-323, doi: 10.1016/j.neuron.2014.10.016.

Victor et al. (2018) Striatal neurons directly converted from Huntington's disease patient fibroblasts recapitulate age-associated disease phenotypes. Nat Neurosci, 21: 341-352.

Vonsattel et al. (1998) Huntington disease. J Neuropathol Exp Neurol, 57, 369-384, doi:10.1097/00005072-199805000-00001.

Wang et al. (2019) Degradation of CCNB1 mediated by APC11 through UBA52 ubiquitination promotes cell cycle progression and proliferation of non-small cell lung cancer cells. Am J Transl Res, 11, 7166-7185.

Yoo et al. (2011) MicroRNA-mediated conversion of human fibroblasts to neurons. Nature, 476, 228-231, doi:10.1038/nature10323.

Yoo et al. (2009) MicroRNA-mediated switching of chromatin remodelling complexes in neural development. Nature, 460, 642-646, doi:10.1038/nature08139.

Yoshii et al. (2017) Monitoring and Measuring Autophagy. Int J Mol Sci, 18, doi:10.3390/ijms18091865.

You et al. (2015) The role of STAT3 in autophagy. Autophagy, 11, 729-739, doi:10.1080/15548627.2015.1017192.

\* cited by examiner

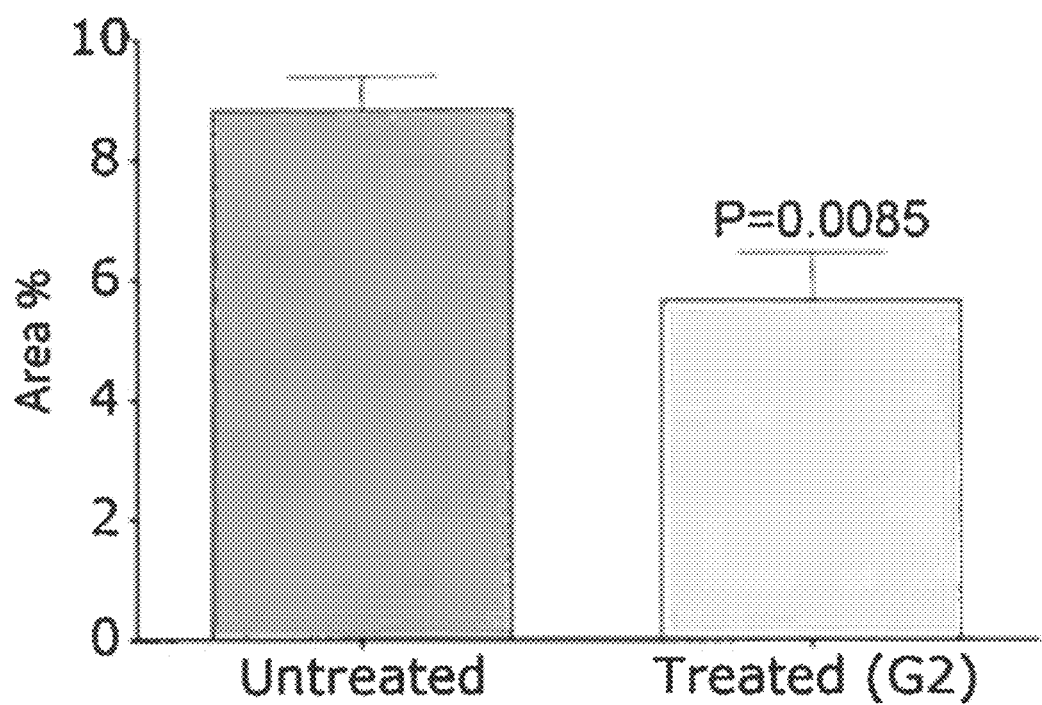

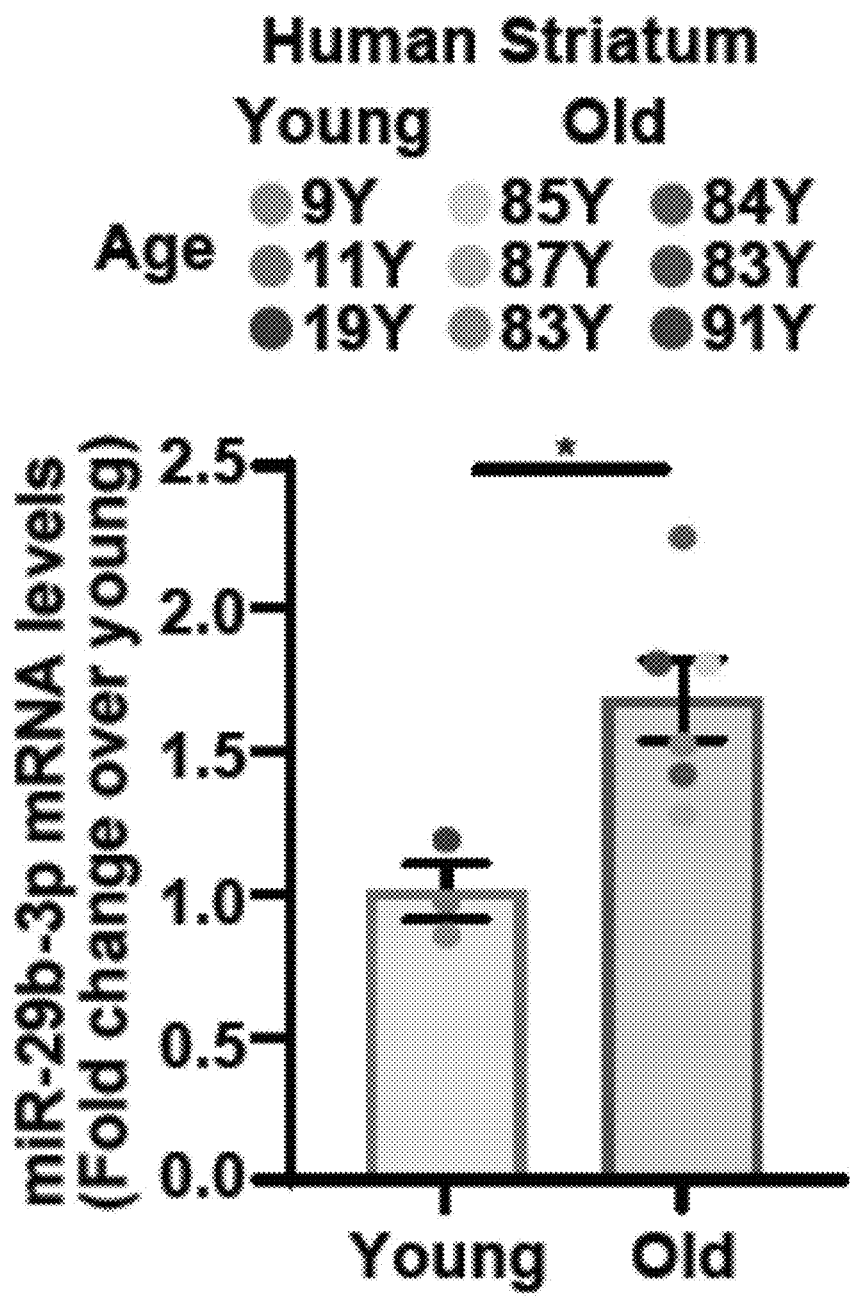

SEQUENCE LISTING

```
<160> NUMBER OF SEQ ID NOS: 6

<210> SEQ ID NO 1
<211> LENGTH: 23
<212> TYPE: DNA
<213> ORGANISM: Artificial Sequence
<220> FEATURE:
<223> OTHER INFORMATION: synthetic primer

<400> SEQUENCE: 1
ctttgagacc gaggtgtatc acc                                          23

<210> SEQ ID NO 2
<211> LENGTH: 22
<212> TYPE: DNA
<213> ORGANISM: Artificial Sequence
<220> FEATURE:
<223> OTHER INFORMATION: synthetic primer

<400> SEQUENCE: 2
ggtcagcatg ttgtaccaca gg                                           22

<210> SEQ ID NO 3
<211> LENGTH: 19
<212> TYPE: DNA
<213> ORGANISM: Artificial Sequence
<220> FEATURE:
<223> OTHER INFORMATION: synthetic primer

<400> SEQUENCE: 3
ccaaggaccg caagaagat                                               19

<210> SEQ ID NO 4
<211> LENGTH: 20
<212> TYPE: DNA
<213> ORGANISM: Artificial Sequence
<220> FEATURE:
<223> OTHER INFORMATION: synthetic primer
```

```
<400> SEQUENCE: 4
ctcctctggt gaggagtgct                                         20

<210> SEQ ID NO 5
<211> LENGTH: 20
<212> TYPE: DNA
<213> ORGANISM: Artificial Sequence
<220> FEATURE:
<223> OTHER INFORMATION: synthetic primer

<400> SEQUENCE: 5
atgttcgtca tgggtgtgaa                                         20

<210> SEQ ID NO 6
<211> LENGTH: 20
<212> TYPE: DNA
<213> ORGANISM: Artificial Sequence
<220> FEATURE:
<223> OTHER INFORMATION: synthetic primer

<400> SEQUENCE: 6
tgtggtcatg agtccttcca                                         20
```

COMPOSITIONS OF AUTOPHAGY MODULATING AGENTS AND USES THEREOF

CROSS-REFERENCE TO RELATED APPLICATIONS

This application claims priority from U.S. Provisional Application Ser. No. 63/104,780 filed on 23 Oct. 2020, which is incorporated herein by reference in its entirety.

STATEMENT REGARDING FEDERALLY SPONSORED RESEARCH OR DEVELOPMENT

This invention was made with government support under DK096990 and DK104946 awarded by the National Institutes of Health. The government has certain rights in the invention.

FIELD OF THE INVENTION

The present disclosure generally relates to methods of modulating autophagy in subjects suffering from autophagy-associated diseases, disorders, or conditions.

MATERIAL INCORPORATED-BY-REFERENCE

The Sequence Listing, which is a part of the present disclosure, includes a computer-readable form comprising nucleotide and/or amino acid sequences of the present invention (file name "019139-US—NP_Sequence_Listing_ST25.txt" created Tuesday, Oct. 12, 2021; 1,448 bytes). The subject matter of the Sequence Listing is incorporated herein by reference in its entirety.

SUMMARY OF THE INVENTION

Among the various aspects of the present disclosure is the provision of methods of modulating autophagy for treatment of autophagy-associated diseases.

An aspect of the present disclosure provides for a method of modulating autophagy or treating or preventing an autophagy-associated disease, disorder, or condition in a subject in need thereof, comprising administering to the subject a therapeutically effective amount of a pharmaceutical composition comprising an autophagy modulating agent selected from of any one formulas: a pharmaceutically acceptable salt thereof, including all tautomers and stereoisomers, and substituted analogs thereof.

In some embodiments, $R^1$, $R^2$, $R^3$, or $R^4$, is hydrogen (H), amino, acetamide, cyano, halo (e.g., Cl, F), $C_{1-8}$alkyl (e.g., methyl, ethyl, butyl, propyl, isopropyl, isopentyl), $C_{1-8}$alkoxy (e.g., methoxy), alkylamino (e.g., dimethylamino), $C_{3-10}$cycloamino (e.g., phenylamino), $C_{3-10}$heterocycloamino (e.g., pyridinylamino), halogen substituted $C_{1-8}$alkyl (e.g., trifluoromethyl), halogen substituted $C_{1-8}$alkoxy (e.g., $OCF_3$), $C_{3-10}$cycloalkyl (e.g., phenyl), $C_{3-10}$cycloalkoxy (e.g., cyclopropoxy, alkylphenoxy, chlorophenoxy, benzyloxy), $C_{3-10}$heterocyclyloxy (e.g., piperidinyloxy, cyclopentylpiperidinyloxy), 2, 3, or 4-halocycloalkyl (e.g., chlorophenyl), hydroxyl$C_{1-8}$alkyl (e.g., hydroxylbutyl), amino$C_{1-8}$alkylsulphonyl (e.g., aminomethylsulfonyl), $C_{1-8}$alkylsulphonyl (e.g., methyl sulfonyl), aminosulfonyl (e.g., sulfonamide), sulfonaminyl (e.g., sulfonamide), $C_{1-8}$alkylsulfonaminyl (e.g., methylsulfonamide), $C_{3-10}$cycloalkylacetamide (e.g., phenylacetamide), $C_{3-10}$cycloalkylsulfonaminyl (e.g., benzenesulfonamide, benzylsulfonamide, N-methylbenzenesulfonamide), heterocyclyl, anilinyl, $C_{1-8}$alkylanilinyl (e.g., methylanilinyl), imidazolyl (e.g., imidazol-1, 2, 3, or 4-yl), pyridyl (e.g., pyridin-1, 2, 3, or 4-yl), piperidinyl (e.g., piperidin-1, 2, 3, or 4-yl), piperidinylcarbonyl (e.g., piperidin-1, 2, 3, 4-yl-carbonyl), $C_{3-10}$cycloalkylpiperidinyl (e.g., phenylpiperidin-1, 2, 3, or 4-yl), pyrrolidyl (e.g., pyrrolidin-1, 2, or 3-yl), pyrazolyl (e.g., pyrazol-1, 2, 3, 4, or 5-yl), $C_{3-10}$cycloalkylpyrrolidinyl (e.g., 2, 3, or 4-phenylpyrrolidin-1, 2, or 3-yl), pyrimidinyl (e.g., pyrimidin-2, 4, or 5-yl), azaspiroheptanyl (optionally substituted with N, O, or S) (e.g., oxa-azaspiroheptanyl), oxazolyl (e.g., oxa-2, 3, 4, or 5-yl), or any one of $R^5$, $R^6$, $R^7$, or $R^8$. In some embodiments, $R^5$ is hydrogen (H), $C_{1-8}$alkyl (e.g., methyl, ethyl, propyl, isobutyl, isopropyl, isopentyl), halogen substituted $C_{1-8}$alkoxy (e.g., $OCF_3$), hydroxyl$C_{1-8}$alkyl (e.g., hydroxylbutyl), $C_{3-10}$cycloalkyl (e.g., phenyl), or any one of $R^1$, $R^2$, $R^3$, $R^4$, $R^6$, $R^7$, or $R^8$. In some embodiments, $R^6$, $R^7$, or $R^8$ is nothing, hydrogen (H), $C_{1-8}$alkyl (e.g., methyl, isopropyl, isopentyl), halogen substituted $C_{1-8}$alkoxy (e.g., $OCF_3$), hydroxyl$C_{1-8}$alkyl (e.g., hydroxylbutyl), or any one of $R^1$, $R^2$, $R^3$, $R^4$, or $R^5$. In some embodiments, Q is carbon (C), cyano (—C≡N—), $C_{1-8}$alkyl, C—$R^6$, C—$R^7$, C—$R^8$, $C_{1-8}$alkyl-substituted $C_{1-8}$alkyl (e.g., methyl-substituted $C_2$ alkyl), N—$R^6$, N—$R^7$, N—$R^8$,

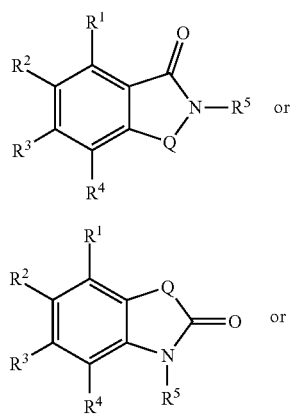

(I)

(II)

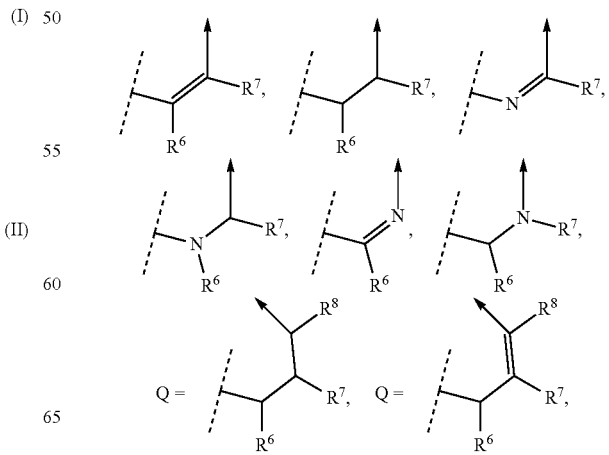

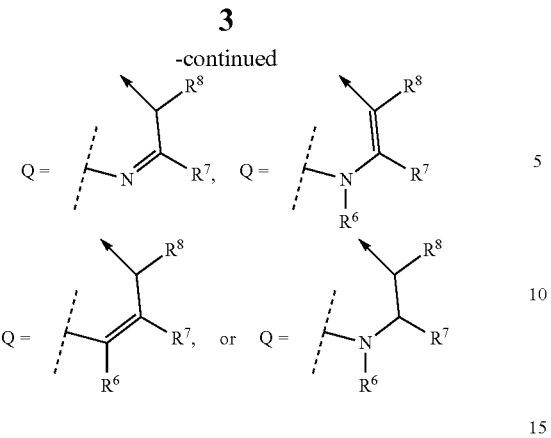

wherein the dashed line is bound to the phenyl ring of formula (I) or formula (II).

In some embodiments, the autophagy modulating agent is:

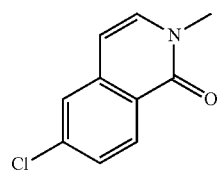

(G2-19) or a pharmaceutically acceptable salt thereof, including all tautomers and stereoisomers, and optionally substituted analogs thereof.

In some embodiments, the autophagy modulating agent of formula (I) is selected from the group consisting of:

(G2-22)

(G2-25)

(G2-28)

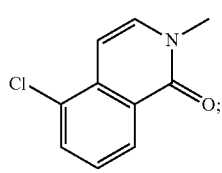

(G2-29)

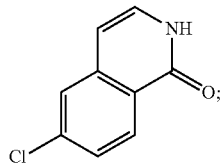

(G2-30)

(G2-37)

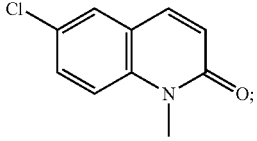

(G2-41)

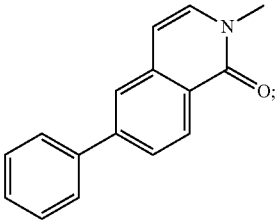

(G2-42)

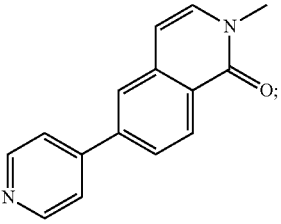

(G2-45)

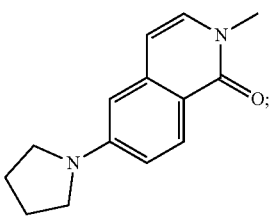

(G2-48)

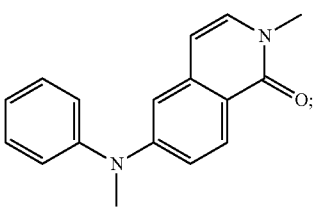

(G2-51)

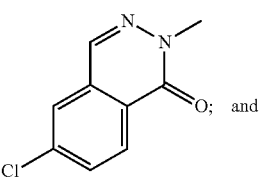

and

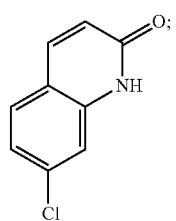
(G2-69)
or a pharmaceutically acceptable salt thereof, including all tautomers and stereoisomers, and optionally substituted analogs thereof.
In some embodiments, the autophagy modulating agent of formula (II) is selected from the group consisting of:
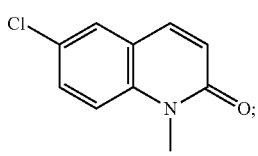
(G2-37)
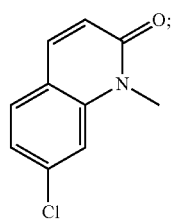
(G2-54)
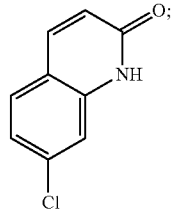
(G2-69)
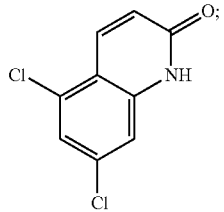
(G2-115)
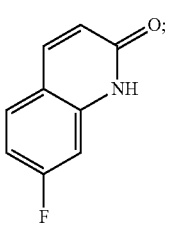
(G2-124)
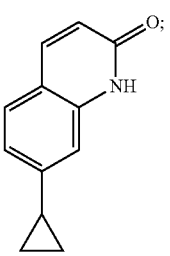
(G2-156)
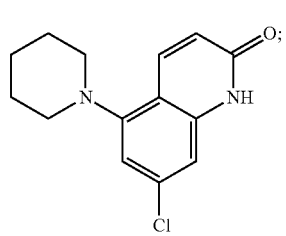
(G2-195)
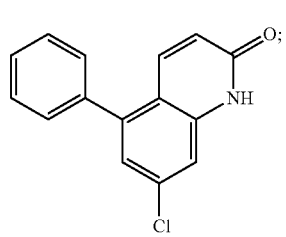
(G2-196)
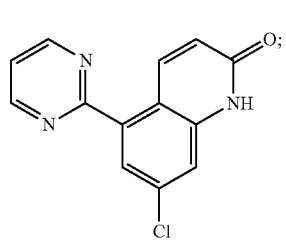
(G2-197)
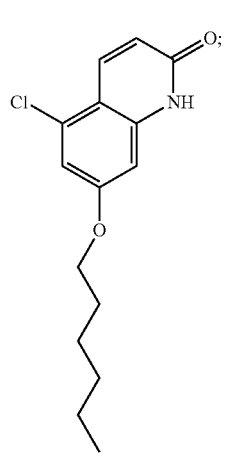
(G2-211)
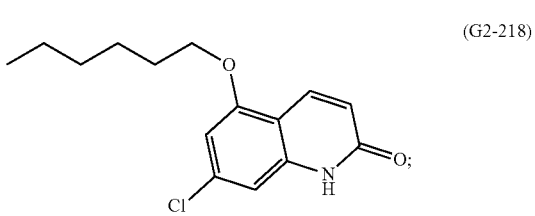
(G2-218)

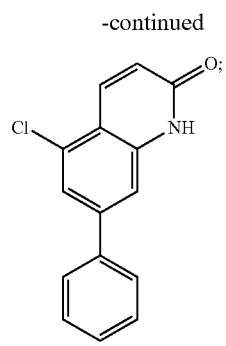
(G2-233)

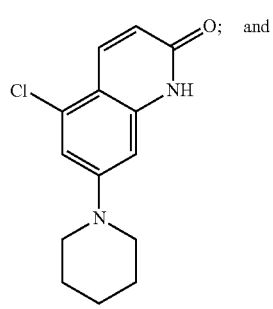
(G2-235) and

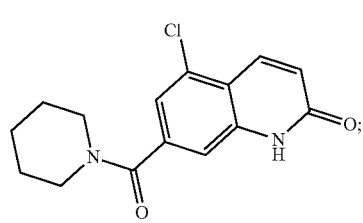
(G2-237)

or a pharmaceutically acceptable salt thereof, including all tautomers and stereoisomers, and optionally substituted analogs thereof.

Another aspect of the present disclosure provides for a method of modulating autophagy or treating or preventing an autophagy-associated disease, disorder, or condition in a subject in need thereof, comprising administering to the subject a therapeutically effective amount of a pharmaceutical composition comprising an autophagy modulating agent selected from formula:

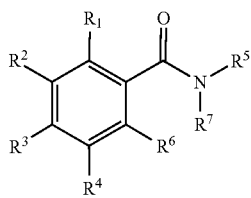
(III)

or a pharmaceutically acceptable salt thereof, including all tautomers and stereoisomers, and substituted analogs thereof. In some embodiments, $R^1$, $R^2$, $R^3$, $R^4$, or $R^6$ is hydrogen (H), amino, acetamide, cyano, halo (e.g., Cl, F), $C_{1-8}$alkyl (e.g., methyl, ethyl, butyl, propyl, isopropyl, isopentyl), $C_{1-8}$alkoxy (e.g., methoxy), alkylamino (e.g., dimethylamino), $C_{3-10}$cycloamino, $C_{3-10}$heterocycloamino (e.g., pyridinylamino), halogen substituted $C_{1-8}$alkyl (e.g., trifluoromethyl), halogen substituted $C_{1-8}$alkoxy (e.g., $OCF_3$), $C_{3-10}$cycloalkyl (e.g., phenyl), $C_{3-10}$cycloalkoxy (e.g., cyclopropoxy, alkylphenoxy, chlorophenoxy, benzyloxy), $C_{3-10}$heterocyclyloxy (e.g., piperidinyloxy, cyclopentylpiperidinyloxy), 2, 3, or 4-halocycloalkyl (e.g., chlorophenyl), hydroxyl$C_{1-8}$alkyl (e.g., hydroxylbutyl), amino$C_{1-8}$alkylsulphonyl (e.g., aminomethylsulfonyl), $C_{1-8}$alkylsulphonyl (e.g., methyl sulfonyl), aminosulfonyl (e.g., sulfonamide), sulfonaminyl (e.g., sulfonamide), $C_{1-8}$alkylsulfonaminyl (e.g., methylsulfonamide), $C_{3-10}$cycloalkylacetamide (e.g., phenylacetamide), $C_{3-10}$cycloalkylsulfonaminyl (e.g., benzenesulfonamide, benzylsulfonamide, N-methylbenzenesulfonamide), heterocyclyl, anilinyl, $C_{1-8}$alkylanilinyl (e.g., methylanilinyl), imidazolyl (e.g., imidazol-1, 2, 3, or 4-yl), pyridyl (e.g., pyridin-1, 2, 3, or 4-yl), piperidinyl (e.g., piperidin-1, 2, 3, or 4-yl), piperidinylcarbonyl (e.g., piperidin-1, 2, 3, 4-ylcarbonyl), $C_{3-10}$cycloalkylpiperidinyl (e.g., phenylpiperidin-1, 2, 3, or 4-yl), pyrrolidyl (e.g., pyrrolidin-1, 2, or 3-yl), pyrazolyl (e.g., pyrazol-1, 2, 3, 4, or 5-yl), $C_{3-10}$cycloalkylpyrrolidinyl (e.g., 2, 3, or 4-phenylpyrrolidin-1, 2, or 3-yl), pyrimidinyl (e.g., pyrimidin-2, 4, or 5-yl), azaspiroheptanyl (optionally substituted with N, O, or S) (e.g., oxa-azaspiroheptanyl), or oxazolyl (e.g., oxa-2, 3, 4, or 5-yl). In some embodiments, $R^5$ or $R^7$ is hydrogen (H), $C_{1-8}$alkyl (e.g., methyl, ethyl, propyl, isobutyl, isopropyl, isopentyl), halogen substituted $C_{1-8}$alkoxy (e.g., $OCF_3$), hydroxyl$C_{1-8}$alkyl (e.g., hydroxylbutyl), $C_{3-10}$cycloalkyl (e.g., phenyl), wherein $R^6$ and $R^7$ optionally form a bond.

In some embodiments, the autophagy modulating agent of formula (III) is selected from the group consisting of:

(G2)

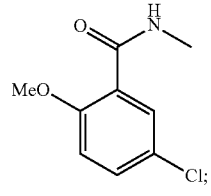
(G2-3)

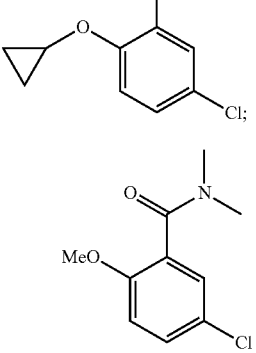
(G2-12)

and (G2-13)

(G2-13); or combinations thereof or a pharmaceutically acceptable salt thereof, including all tautomers and stereoisomers, and optionally substituted analogs thereof.

In some embodiments, the autophagy modulating agent has autophagy modulating activity.

In some embodiments, the autophagy modulating agent is an autophagy enhancing agent or an autophagic pathway modulating agent.

In some embodiments, the subject has or is suspected of having an autophagy-associated disease, disorder, or condition.

In some embodiments, the autophagy-associated disease, disorder, or condition is alpha-1 antitrypsin deficiency (ATD).

In some embodiments, the autophagy-associated disease, disorder, or condition is liver disease from alpha-1-antitrypsin deficiency (ATD).

In some embodiments, the autophagy-associated disease, disorder, or condition is a polyglutamine (polyQ) disease.

In some embodiments, the polyQ disease is Huntington's disease (HD); spinocerebellar ataxias (SCA) types 1, 2, 6, 7, 17; Machado-Joseph disease (MJD/SCA3); dentatorubral pallidoluysian atrophy (DRPLA); spinal and bulbar muscular atrophy; or X-linked 1 (SMAX1/SBMA).

In some embodiments, the autophagy-associated disease, disorder, or condition is Alzheimer's disease (AD).

In some embodiments, the autophagy-associated disease, disorder, or condition is inherited emphysema.

In some embodiments, the autophagy-associated disease, disorder, or condition is diabetes.

In some embodiments, the autophagy-associated disease, disorder, or condition is Huntington's disease (HD).

In some embodiments, the autophagy-associated disease, disorder, or condition is cancer.

In some embodiments, the autophagy-associated disease, disorder, or condition is an age-dependent degenerative disease.

In some embodiments, the therapeutically effective amount of the pharmaceutical composition comprising the autophagy modulating agent reduces aggregated ATZ protein in the subject having α1-antitrypsin deficiency (ATD).

In some embodiments, the therapeutically effective amount of the pharmaceutical composition comprising the autophagy modulating agent reduces cellular accumulation of misfolded aggregated α1-antitrypsin Z variant (ATZ).

In some embodiments, the therapeutically effective amount of the pharmaceutical composition comprising the autophagy modulating agent reduces cellular accumulation of misfolded or aggregated proteins.

In some embodiments, the therapeutically effective amount of the pharmaceutical composition comprising the autophagy modulating agent has anti-tumor activity in the subject having cancer.

In some embodiments, the therapeutically effective amount of the pharmaceutical composition comprising the autophagy modulating agent reduces neuronal cell death.

In some embodiments, the therapeutically effective amount of the pharmaceutical composition comprising the autophagy modulating agent treats or prevents hepatic fibrosis.

In some embodiments, the therapeutically effective amount of the pharmaceutical composition comprising the autophagy modulating agent reduces or prevents accumulation of misfolded protein in liver cells, liver damage, liver fibrosis, or liver failure.

In some embodiments, the therapeutically effective amount of the pharmaceutical composition comprising the autophagy modulating agent reduces liver fibrosis.

In some embodiments, the therapeutically effective amount of the pharmaceutical composition comprising the autophagy modulating agent inhibits progression of the autophagy-associated disease, disorder, or condition.

In some embodiments, the therapeutically effective amount of the pharmaceutical composition comprising the autophagy modulating agent does not significantly affect insulin secretion.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 5A-FIG. 5B shows (A) PAS/D staining of hepatic cells in an ATD mouse model either untreated or treated with G2 and (B) quantification of ATZ protein aggregates in the treated and untreated hepatic cells. Mice treated with G2 showed reduced ATZ protein aggregation.

in FIG. 15E and FIG. 15**F: 100 μm. Mean±s.e.m.

FIG. 16A-FIG. 16I. Identification of miR-29b-3p as an upstream regulator. (A) Heatmaps showing signal intensity in chromatin peaks by comparing genomic regions identified by ATAC-seq in pre-HD-MSNs and HD-MSNs at PID21 (adj. p<0.05, |log FC|>1). (B) Integrative Genomics Viewer (IGV) snapshots showing peaks enriched in HD-MSNs (green) over pre-HD-MSNs (purple) within gene miR29B1 (DAR highlighted in blue). (C, D) RT-qPCR analysis for miR-29b-3p in pre-HD and HD-MSNs at PID26 (C, n=9) and in human young striatums aged 9, 11, and 19 years and human old striatums aged 83, 84, 85, 87, and 91 years (D, n=3-6). (E) Representative images and quantification of pre-HD-MSNs expressing control or miR-29b (n=3, control: 353 cells, miR-29b: 392 cells) and HD-MSNs with control or miR-29b-3p inhibitor (n=3, control: 380 cells, miR-29b-3p inhibitor: 421 cells) at PID26 assayed with CYTO-ID green. (F, G) Representative images and quantification for neuronal cell death assay using Caspase-3/7 or Annexin V reagents in pre-HD-MSNs expressing control or miR-29b at PID 26 (Caspase 3/7) or at PID 30 (Annexin V) (F, n=12) and HD-MSNs expressing negative control or miR-29b-3p inhibitor at PID 27 (Caspase 3/7) or at PID 30 (Annexin V) (G, n=12). (H, I) Representative images and quantification of pre-HD-MSNs expressing control or miR-29b (H, 3 independent pre-HD/group, control: 437 cells, miR-29b: 389 cells) and HD-MSNs with control or miR-29b-3p inhibitor (I, 3 independent HD/group, control: 406 cells, miR-29b-3p inhibitor: 630 cells) at PID30 assayed for HTT inclusion bodies (IBs). The sample size (n) corresponds to the number of biological replicates. Statistical significance was determined using unpaired t-test (C, D, F, G, H, I) or one-way ANOVA with Tukey's multiple comparisons test (E); ** P<0.0001,  p<0.01, *p<0.05; Scale bars in E, H, I: 20 μm, in F, G: 100 μm; Mean±s.e.m.

DETAILED DESCRIPTION OF THE INVENTION

Figure 1:
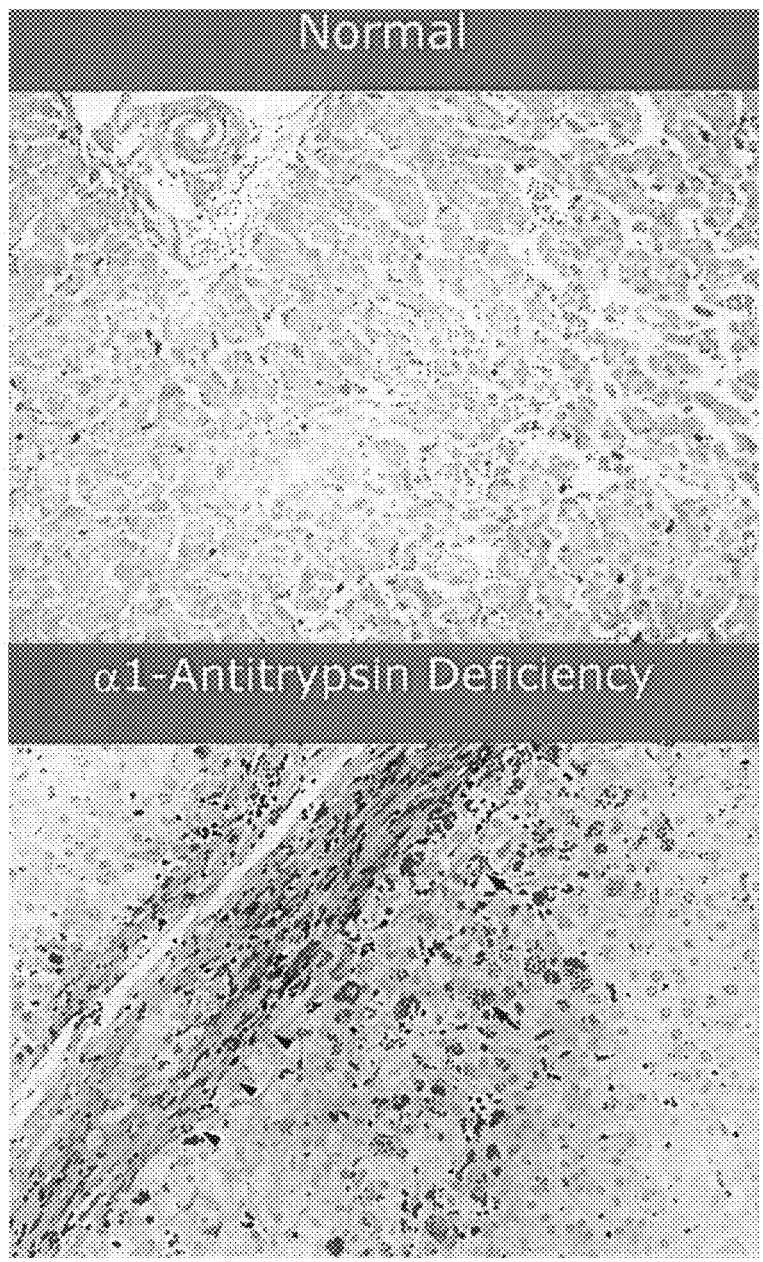
FIG. 1 shows immunohistological images of hepatic cells from a normal subject and a subject with alpha-1 antitrypsin deficiency (ATD). The ATD cells show accumulation of mutant alpha-1 antitrypsin protein aggregates (ATZ).

The present disclosure is based in part on the discovery of autophagy modulating agents for the modulation (i.e., enhancement) of autophagy; the treatment of alpha-1-antitrypsin deficiency (ATD); the treatment of Huntington's disease (HD); and other autophagy-associated diseases.

ATD is an inherited disorder that can result in liver disease. As described herein, a series of glyburide structural analogs have also been created that exhibited improved efficacy compared to glyburide.

Taken together these results are consistent with an effect of the analog on two different types of misfolded proteins and two different types of misfolded diseases, as would be predicted for an autophagy enhancer drug. The data also suggests that this analog and derivative could be a therapeutic for other misfolded protein diseases and age-dependent degenerative diseases.

Autophagy-Associated Diseases, Disorders, or Conditions

Another aspect of the present disclosure provides for modulation of autophagy in a subject suffering from an autophagy-associated disease, disorder, or condition. Autophagy can be described as a pathway or process in a cell or organism that involves degradation of cellular components via delivery to a lysosome. For example, the pathway can be chaperone-mediated autophagy, microautophagy, macroautophagy, or variants of macroautophagy, such as LC3-associated phagocytosis. An autophagy-associated disease, disorder, or condition may also be one that involves membrane trafficking pathways that are dependent on autophagy genes, such as 'unconventional protein secretion', 'exocytosis of secretory granules/lysosomes', 'exosome secretion', or 'retromer-dependent trafficking'. These pathways are capable of removing misfolded proteins, aggregated proteins, or parts of organelles by delivery to the plasma membrane for exocytosis without involving degradation and/or delivery to the lysosome. As such, an autophagy modulating agent can be capable of modulating such autophagic pathways.

As described herein, an autophagy-associated disease, disorder, or condition can be a disease resulting from defects in, or abnormal function of, autophagic processes or autophagic pathways in a cell or organism; diseases and disorders that are caused by misfolded and/or aggregated proteins, which can include age-dependent degenerative diseases; or diseases in which autophagy function has been implicated. Defects in, or abnormal function of, an autophagic pathway or process may involve a defect in, or abnormal function of the action of various cellular components, such as an organelle or protein. For example, the organelle can be a lysosome, a vesicle, an autophagosome, a vacuole, a phagophore, or a plasma membrane. As another example, the protein can be insulin, insulin growth factor, insulin receptor, a TOR or mTOR protein, an Atg protein, Ras, PKA, Sch9, Gcn2, elF2alpha, Gcn4, Snf1, Pho85, PDK1, PTEN, Rheb, TSC1, TSC2, AMPK, Beclin1, Bcl-2, LKB1, p70S6K, p27, EF1 alpha, GFAP, LAMP-2A, Hsp90, hsc70, aldolase B, Annexin, aspartate aminotransferase, Fos, Eps8, hemoglobin, Pax2, MEF2D, microglobulin, phosphoglycerate mutase, pyruvate kinase, RCAN1, RNAse A, alpha synuclein, subunits of 20S proteasome, tau, or ubiquitin. As such, an autophagy-associated disease, disorder, or condition can be a disease, disorder, or condition associated with the autophagy pathway or dysfunction in the above organelles or proteins among others. As such, an autophagy modulating agent can be capable of modulating such autophagic pathways.

For example, an autophagy-associated disease, disorder, or condition can be adult polyglucosan body disease, Afibrinogenemia, alpha-1 antitrypsin deficiency (ATD), Alzheimer's disease (AD), amyotrophic lateral sclerosis, an age-dependent degenerative disease, autism spectrum disorders, Becker muscular dystrophy, beta-propellar protein-associated neurodegeneration, Birt-Hogg-Dube syndrome, Blau syndrome, cancer, Centronuclear myopathy, Chanarin-Dorfman syndrome, Charcot-Marie-Tooth (CMT) disease, childhood ataxia, Chorea-acanthocytosis, Chronic progressive external ophthalmoplegia, Congenital disorders of glycosylation, Congenital dyserythropoietic anemia, Congenital myasthenic syndrome, Congenital myotonic dystrophy, Corneal dystrophy Avellino type, cortical atrophy, Crohn's disease, Danon disease, Danon's cardiomyopathy, diabetes, distal myopathy, Dysferlinopathy, Emery-Dreifuss muscular dystrophy, epilepsy, Familial encephalopathy with neuroserpin inclusion bodies, familial Mediterranean fever, Familial partial lipodystrophy, Fanconi anemia congenital syndrome, frontotemporal dementia, Galloway-Mowat syndrome, Gaucher's disease, Gerstmann-Straussler-Scheinker disease, Glycogen storage disease type 2, Griscelli syndrome, Groenouw type I corneal dystrophy, Hermansky-Pudlak syndrome, Huntington's disease (HD), Idiopathic pulmonary fibrosis, inflammatory bowel disease, juvenile arthritis, Kearns-Sayre syndrome, Keshan disease, LEOPARD syndrome, Li-Fraumeni syndrome, Limb-girdle muscular dystrophy type 1D, 2B, LRBA deficiency, Macrophagic myofasciitis, Marek disease, Martsolf syndrome, Miyoshi myopathy, Mulibrey Nanism, multiple sclerosis (MS), multisystem disorder, cystinosis, Myofibrillar myopathy, Myostatin-related muscle hypertrophy, Myotonic dystrophy, Nemaline myopathy, neuronal ceroid lipofuscinosis, Neuronal ceroid lipofuscinosis, non-alcoholic fatty liver disease, NORSE, osteoarthritis, osteopetrosis, Paget's disease of the bone, Papillon Lefevre syndrome, Parkinson's disease, Pelger-Huet anomaly, Perry syndrome, Peters anomaly, Phosphoglycerate kinase deficiency, primary microcephaly, primary open angle glaucoma, Progeria, *Proteus* syndrome, Reducing body myopathy, Retinitis pigmentosa, Rett syndrome, Salla disease, SAPHO syndrome, Schaaf-Yang syndrome, Sengers syndrome, sensory and autonomic neuropathy type II, SHORT syndrome, Simpson-Golabi-Behmel syndrome, Sitosterolemia, Smith-Magenis syndrome, Snyder-Robinson syndrome, spastic paraplegia, spinocerebellar ataxia, Stargardt disease, systematic lupus erythematosus, systemic sclerosis, Tangier disease, tuberculosis, ulcerative colitis, Vici syndrome, Wiskott Aldrich syndrome, X-linked myopathy with excessive autophagy, X-linked myotubular myopathy, Yunis-Varon syndrome, or Zellweger syndrome spectrum disorders.

As another example, an autophagy-associated disease, disorder, or condition can be a disease, disorder, or condition can be diseases and disorders that are caused by misfolded and/or aggregated proteins, which can include age-dependent degenerative diseases, Amyotonia congenita, Benign hereditary chorea, Bethlem myopathy, Bourneville syndrome, Brown syndrome, Central diabetes insipidus, Charcot-Marie-Tooth disease, Cholesteryl ester storage disease, Chorea minor, Cramp-fasciculation syndrome, Dentatorubral-pallidoluysian atrophy, Doxorubicin induced cardiomyopathy, Episodic ataxia with nystagmus, Fabry disease, Familial Mediterranean fever, Froster-Huch syndrome, Hypergonadotropic ovarian failure, familial or sporadic, Idiopathic inflammatory myopathy, Inclusion body myositis, Kennedy disease, Lafora disease, Leber congenital amaurosis 11, Leber congenital amaurosis 3, Limb-girdle muscular dystrophy, Marinesco-Sjogren syndrome, Oculopharyngeal muscular dystrophy, Pancreatitis, pediatric, Pelizaeus-Merzbacher disease, Phenylketonuria, Pigment-dispersion syndrome, Refsum disease, infantile form, Spinal muscular atrophy, Spinocerebellar ataxia, or Tubular aggregate myopathy.

As another example, an autophagy-associated disease, disorder, or condition can be a disease resulting from defects in, or abnormal function of, autophagic processes or autophagic pathways in a cell or organism or diseases in which autophagy function has been implicated such as adult polyglucosan body disease, Afibrinogenemia, Centronuclear myopathy, Congenital dyserythropoietic anemia, Congenital myotonic dystrophy, Danon disease, Familial encephalopathy with neuroserpin inclusion bodies, Hermansky-Pudlak syndrome, Idiopathic pulmonary fibrosis, Miyoshi myopathy, Myofibrillar myopathy, Myotonic dystrophy, Progeria, Retinitis pigmentosa, Stargardt disease, X-linked myopathy with excessive autophagy, or X-linked myotubular myopathy.

Alpha-1 Antitrypsin Deficiency (ATD)

An aspect of the present disclosure provides for modulation of autophagy in a subject suffering from alpha-1 antitrypsin deficiency (ATD). ATD is an inherited disorder that can result in liver disease, due to accumulation of misfolded mutant alpha-1 antitrypsin protein (ATZ). ATD is a well-known genetic cause of severe liver disease including cirrhosis and hepatocellular carcinoma in adults. The classical form of ATD is characterized by a point mutation that substitutes lysine for glutamate 342 in the mutant variant called ATZ.

The inventors have discovered that glibenclamide (GB), an FDA approved drug for type 2 diabetes, enhances the autophagic degradation of misfolded ATZ and therefore is a potential therapeutic for ATD. In those studies they proved that the mechanism of action of GB was enhanced autophagic degradation of ATZ in a number of ways but most definitively by showing that the drug effect was blocked when the autophagy gene ATG14 was deleted in a mammalian cell line model of ATD. Furthermore, the G2 analog of the parent drug decreased hepatic ATZ load together with increased LC3-II conversion and decreased p62 levels in the liver of the PiZ mouse model of ATD, markers of increased autophagic activity. As such, a series of GB analogs were created. One of the analogs G2-19, reduced hepatic ATZ load and fibrosis in a PiZ mouse model of ATD without affecting insulin secretion. This analog also decreased cellular ATZ load in the *C. elegans* model of ATD in a dose-dependent fashion.

G2-19 also improved the survival of human striatal neurons derived from patients with Huntington's disease. G2-19 also lowers HTT inclusion body (IB) in HD-MSNs in contrast to the inactive form (see e.g., FIG. 13).

These results are consistent with an effect of G2-19 on two different types of misfolded proteins and two different types of misfolded diseases, as would be consistent with an effect on autophagic degradation by an autophagy enhancing agent or drug. This data, together with the known functions of autophagy, suggests that G2-19 and derivatives thereof can be therapeutic or preventative for misfolded protein diseases and age-dependent degenerative diseases.

The classical form of ATD is characterized by a point mutation that substitutes lysine for glutamate 342 in the mutant variant called ATZ. The substitution is known to favor misfolding of ATZ and sets up a kinetic-determined tendency for this variant protein to polymerize and form aggregates in the endoplasmic reticulum (ER) and perhaps other pre-Golgi vesicular compartments of the cell. There is evidence that liver disease is caused by gain-of-function mechanisms triggered by the proteotoxic effects of misfolded ATZ accumulation. Genetic and environmental modifiers that target proteostasis mechanisms are hypothesized to account for wide variation in the hepatic phenotype among homozygotes for this disorder.

ATD Disease Models

Transgenic *C. elegans* ('Z worm') expressing the human Z mutant form of alpha-1 antitrypsin (ATZ) fused to green fluorescent protein (GFP) can be used as a model of ATD for screening and testing of autophagy modulating agents to treat ATD. The *C. elegans* model of ATD exhibits ATZ aggregation within the endoplasmic reticulum, slow growth, reduced fertility, and shortened lifespan. These phenotypes are also exhibited in humans with ATD, proving that *C. elegans* is a representative model of the disease.

A transgenic mouse model expressing the human mutant variant of alpha-1 antitrypsin, referred to as PiZ mouse, can also be used as a model of ATD. The PiZ mouse exhibits accumulation of mutant alpha-1 antitrypsin aggregates, liver fibrosis, and development of malignant liver tumors.

Autophagy Modulating Agents

Another aspect of the present disclosure provides for modulation of autophagy in a subject, comprising administering to the subject a therapeutically effective amount of a composition comprising an autophagy modulating.

In some aspects of the present disclosure, the autophagy modulating agent can be any one of formulas:

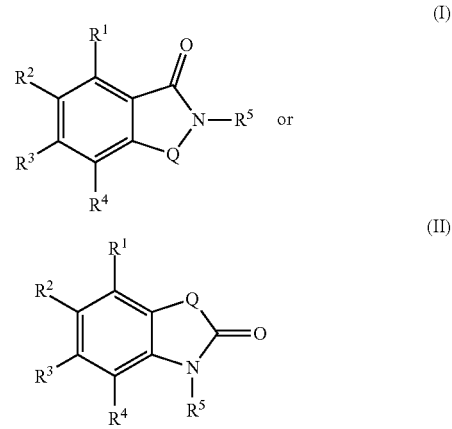

or a pharmaceutically acceptable salt thereof, including all tautomers and stereoisomers, and substituted analogs thereof wherein $R^1$, $R^2$, $R^3$, or $R^4$, is hydrogen (H), amino, acetamide, cyano, halo (e.g., Cl, F), $C_{1-8}$alkyl (e.g., methyl, ethyl, butyl, propyl, isopropyl, isopentyl), $C_{1-8}$alkoxy (e.g., methoxy), alkylamino (e.g., dimethylamino), $C_{3-10}$cycloamino (e.g., phenylamino), $C_{3-10}$heterocycloamino (e.g., pyridinylamino), halogen substituted $C_{1-8}$alkyl (e.g., trifluoromethyl), halogen substituted $C_{1-8}$alkoxy (e.g., $OCF_3$), $C_{3-10}$cycloalkyl (e.g., phenyl), $C_{1-10}$carbonyl, $C_{3-10}$cycloalkoxy (e.g., cyclopropoxy, alkylphenoxy, chlorophenoxy, benzyloxy), $C_{3-10}$heterocycyloxy (e.g., piperidinyloxy, cyclopentylpiperidinyloxy), 2, 3, or 4-halocycloalkyl (e.g., chlorophenyl), hydroxyl$C_{1-8}$alkyl (e.g., hydroxylbutyl), amino$C_{1-8}$alkylsulphonyl (e.g., aminomethylsulfonyl), $C_{1-8}$alkylsulphonyl (e.g., methyl sulfonyl), aminosulfonyl (e.g., sulfonamide), sulfonaminyl (e.g., sulfonamide), $C_{1-8}$alkylsulfonaminyl (e.g., methylsulfonamide), $C_{3-10}$cycloalkylacetamide (e.g., phenylacetamide), $C_{3-10}$cycloalkylsulfonaminyl (e.g., benzenesulfonamide, benzylsulfonamide, N-methylbenzenesulfonamide), heterocyclyl, anilinyl, $C_{1-8}$alkylanilinyl (e.g., methylanilinyl), imidazolyl (e.g., imidazol-1, 2, 3, or 4-yl), pyridyl (e.g., pyridin-1, 2, 3, or 4-yl), piperidinyl (e.g., piperidin-1, 2, 3, or 4-yl), piperidinylcarbonyl (e.g., piperidin-1, 2, 3, 4-ylcarbonyl), $C_{3-10}$cycloalkylpiperidinyl (e.g., phenylpiperidin-1, 2, 3, or 4-yl), pyrrolidyl (e.g., pyrrolidin-1, 2, or 3-yl), pyrazolyl (e.g., pyrazol-1, 2, 3, 4, or 5-yl), $C_{3-10}$cycloalkylpyrrolidinyl (e.g., 2, 3, or 4-phenylpyrrolidin-1, 2, or 3-yl), pyrimidinyl (e.g., pyrimidin-2, 4, or 5-yl), azaspiroheptanyl (optionally substituted with N, O, or S) (e.g., oxaazaspiroheptanyl), oxazolyl (e.g., oxa-2, 3, 4, or 5-yl), or any one of $R^5$, $R^6$, $R^7$, or $R^8$;

$R^5$ is hydrogen (H), $C_{1-8}$alkyl (e.g., methyl, ethyl, propyl, isobutyl, isopropyl, isopentyl), halogen substituted $C_{1-8}$alkoxy (e.g., $OCF_3$), hydroxyl$C_{1-8}$alkyl (e.g., hydroxylbutyl), $C_{3-10}$cycloalkyl (e.g., phenyl), or any one of $R^1$, $R^2$, $R^3$, $R^4$, $R^6$, $R^7$, or $R^8$;

$R^6$, $R^7$, or $R^8$ is nothing, hydrogen (H), $C_{1-8}$alkyl (e.g., methyl, isopropyl, isopentyl), halogen substituted $C_{1-8}$alkoxy (e.g., $OCF_3$), hydroxyl$C_{1-8}$alkyl (e.g., hydroxylbutyl), or any one of $R^1$, $R^2$, $R^3$, $R^4$, or $R^5$; and Q is carbon (C), cyano (—C≡N—), $C_{1-8}$alkyl, C—$R^6$, C—$R^7$, C—$R^8$, $C_{1-8}$alkyl-substituted $C_{1-8}$alkyl (e.g., methyl-substituted $C_2$ alkyl), N—$R^6$, N—$R^7$, N—$R^8$,

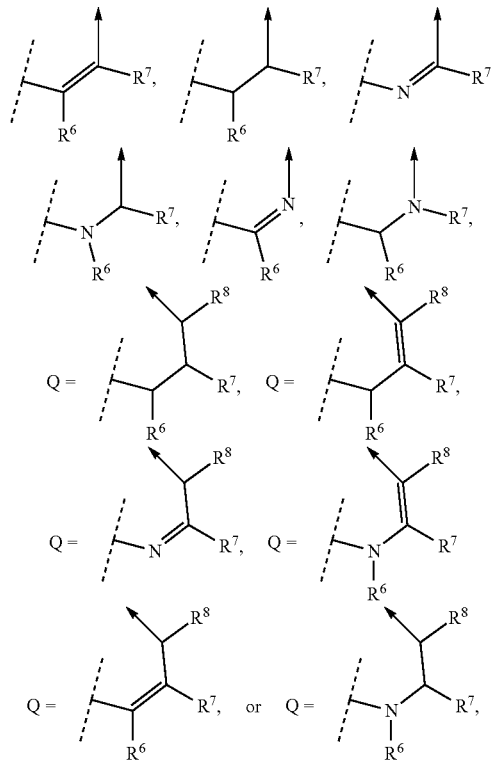

wherein the dashed line is bound to the phenyl ring of formula (I) or formula (II).

In another aspect of the present disclosure, the autophagy modulating agent can be

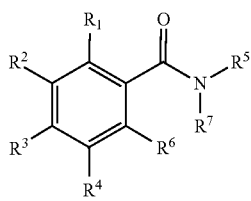

(III)

or a pharmaceutically acceptable salt thereof, including all tautomers and stereoisomers, and substituted analogs thereof wherein $R^1$, $R^2$, $R^3$, $R^4$, or $R^6$ is hydrogen (H), amino, acetamide, cyano, halo (e.g., Cl, F), $C_{1-8}$alkyl (e.g., methyl, ethyl, butyl, propyl, isopropyl, isopentyl), $C_{1-8}$alkoxy (e.g., methoxy), alkylamino (e.g., dimethylamino), $C_{3-10}$cycloamino, $C_{3-10}$heterocycloamino (e.g., pyridinylamino), halogen substituted $C_{1-8}$alkyl (e.g., trifluoromethyl), halogen substituted $C_{1-8}$alkoxy (e.g., $OCF_3$), $C_{3-10}$cycloalkyl (e.g., phenyl), $C_{1-10}$carbonyl, $C_{3-10}$cycloalkoxy (e.g., cyclopropoxy, alkylphenoxy, chlorophenoxy, benzyloxy), $C_{3-10}$heterocyclyloxy (e.g., piperidinyloxy, cyclopentylpiperidinyloxy), 2, 3, or 4-halocycloalkyl (e.g., chlorophenyl), hydroxyl$C_{1-8}$alkyl (e.g., hydroxylbutyl), amino$C_{1-8}$alkylsulphonyl (e.g., aminomethylsulfonyl), $C_{1-8}$alkylsulphonyl (e.g., methyl sulfonyl), aminosulfonyl (e.g., sulfonamide), sulfonaminyl (e.g., sulfonamide), $C_{1-8}$alkylsulfonaminyl (e.g., methylsulfonamide), $C_{3-10}$cycloalkylacetamide (e.g., phenylacetamide), $C_{3-10}$cycloalkylsulfonaminyl (e.g., benzenesulfonamide, benzylsulfonamide, N-methylbenzenesulfonamide), heterocyclyl, anilinyl, $C_{1-8}$alkylanilinyl (e.g., methylanilinyl), imidazolyl (e.g., imidazol-1, 2, 3, or 4-yl), pyridyl (e.g., pyridin-1, 2, 3, or 4-yl), piperidinyl (e.g., piperidin-1, 2, 3, or 4-yl), $C_{3-10}$cycloalkylpiperidinyl (e.g., phenylpiperidin-1, 2, 3, or 4-yl), piperidinylcarbonyl (e.g., piperidin-1, 2, 3, 4-ylcarbonyl), pyrrolidyl (e.g., pyrrolidin-1, 2, or 3-yl), pyrazolyl (e.g., pyrazol-1, 2, 3, 4, or 5-yl), $C_{3-10}$cycloalkylpyrrolidinyl (e.g., 2, 3, or 4-phenylpyrrolidin-1, 2, or 3-yl), pyrimidinyl (e.g., pyrimidin-2, 4, or 5-yl), azaspiroheptanyl (optionally substituted with N, O, or S) (e.g., oxaazaspiroheptanyl), oxazolyl (e.g., oxa-2, 3, 4, or 5-yl), or any one of $R^5$, $R^6$, or $R^7$; and $R^5$ or $R^7$ is hydrogen (H), $C_{1-8}$alkyl (e.g., methyl, ethyl, propyl, isobutyl, isopropyl, isopentyl), halogen substituted $C_{1-8}$alkoxy (e.g., $OCF_3$), hydroxyl$C_{1-8}$alkyl (e.g., hydroxylbutyl), $C_{3-10}$cycloalkyl (e.g., phenyl), or any one of $R^1$, $R^2$, $R^3$, $R^4$, or $R^6$;

wherein $R^6$ and $R^7$ can form a bond.

Each of formula (I), formula (II), formula (III), $R^1$, $R^2$, $R^3$, $R^4$, $R^5$, $R^6$, or $R^7$ can be functionalized with, can comprise a linker group of, or can be substituted by, one or more groups selected from the group consisting of hydroxyl; $C_{1-10}$alkyl hydroxyl; aminyl; $C_{1-10}$carboxylic acid; $C_{1-10}$carbonyl, $C_{1-10}$carboxyl; straight chain or branched $C_{1-10}$alkyl, optionally containing unsaturation; a $C_{2-10}$cycloalkyl optionally containing unsaturation or one oxygen or nitrogen atom; straight chain or branched $C_{1-10}$alkyl amine; heterocyclyl; heterocyclic amine; aryl; phenyl; heteroaryl containing from 1 to 4 N, O, or S atoms; unsubstituted phenyl ring; substituted phenyl ring; unsubstituted heterocyclyl; or substituted heterocyclyl, wherein the unsubstituted phenyl ring or substituted phenyl ring can be optionally substituted with one or more groups independently selected from the group consisting of hydroxyl; $C_{1-10}$alkyl hydroxyl; amine; $C_{1-10}$carboxylic acid; $C_{1-10}$carboxyl; straight chain or branched $C_{1-10}$alkyl, optionally containing unsaturation; straight chain or branched $C_{1-10}$alkyl amine, optionally containing unsaturation; a $C_{2-10}$cycloalkyl optionally containing unsaturation or one oxygen or nitrogen atom; straight chain or branched $C_{1-10}$alkyl amine; heterocyclyl; heterocyclic amine; aryl comprising a phenyl; or heteroaryl containing from 1 to 4 N, O, or S atoms; and the unsubstituted heterocyclyl or substituted heterocyclyl can be optionally substituted with one or more groups independently selected from the group consisting of hydroxyl; $C_{1-10}$alkyl hydroxyl; amine; $C_{1-10}$carboxylic acid; $C_{1-10}$carboxyl; straight chain or branched $C_{1-10}$alkyl, optionally containing unsaturation; straight chain or branched $C_{1-10}$alkyl amine, optionally containing unsaturation; a $C_{2-10}$cycloalkyl optionally containing unsaturation or one oxygen or nitrogen atom; heterocyclyl; straight chain or branched $C_{1-10}$alkyl amine; heterocyclic amine; aryl comprising a phenyl; or heteroaryl containing from 1 to 4 N, O, or S atoms; or combinations thereof. Any of the above can be further functionalized or substituted.

Active G2, G2-19 and Analogs and Derivatives Thereof

As described herein, G2 and G2-19 were discovered to be active autophagy enhancing agent. Derivatives and analogs of G2 and G2-19 were designed and tested for autophagy activity.

G2

In some embodiments, the autophagy modulating agent can be G2 (5-chloro-2-methoxybenzamide),

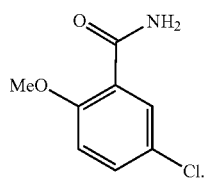 [SMILES: COc1ccc(Cl)cc1C(N)=O]

G2-3

In some embodiments, the autophagy modulating agent can be a methyl substituted G2, G2-3 (5-chloro-2-methoxy-N-methylbenzamide),

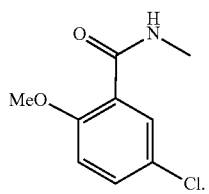

G2-12

In some embodiments, the autophagy modulating agent can be a cyclopropoxy substituted G2-3, G2-12 (5-chloro-2-cyclopropoxy-N-methylbenzamide),

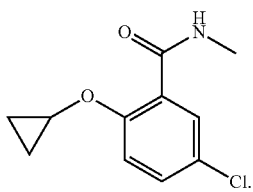

G2-13

In some embodiments, the autophagy modulating agent can be a methyl substituted G2-3, G2-13 (5-chloro-2-methoxy-N,N-dimethylbenzamide),

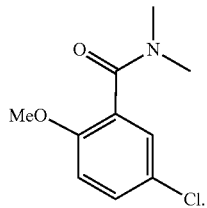

G2-19

In some embodiments, the autophagy modulating agent can be G2-19 (6-chloro-2-methylisoquinolin-1 (2H)-one),

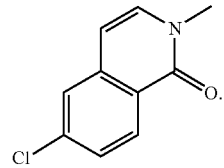

G2-22

As another example, the autophagy modulating agent can be a structural isomer of G2-19. For example, the structural isomer can be G2-22 (5-chloro-2-methylisoquinolin-1 (2H)-one),

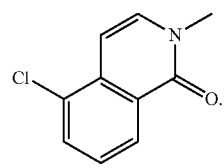

G2-25

In some embodiments, the autophagy modulating agent can be a N-demethylated or 3,4-dihydro analog of G2-19. For example, the autophagy modulating agent can be G2-25 (6-chloroisoquinolin-1 (2H)-one),

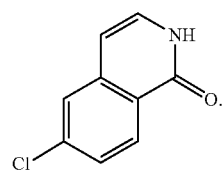 [SMILES: O=c1[nH]ccc2cc(Cl)ccc12]

G2-28

In some embodiments, the autophagy modulating agent can be a pyrrole substituted analog of G2-19. For example, the pyrrole substituted analog of G2-19 can be G2-28 (5-chloro-2-methylisoindolin-1-one),

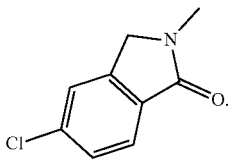

G2-29

In some embodiments, the autophagy modulating agent can be a 6-substituted analog of G2-19. For example, the autophagy modulating agent comprising a 6-substituted analog of G2-19 can be G2-29 (2-methyl-6-(methylsulfonyl) isoquinolin-1 (2H)-one),

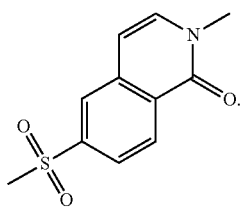

G2-30

As another example, the autophagy modulating agent comprising a 6-substituted analog of G2-19 can be G2-30 (6-methoxy-2-methylisoquinolin-1(2H)-one),

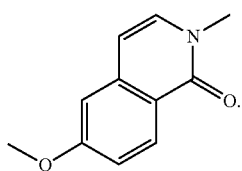

G2-37

In some embodiments, the autophagy modulating agent can be a constitutional or structural isomer of G2-19 or constitutional or structural isomer of a G2-19 analog as described herein. For example, the autophagy modulating agent comprising a structural isomer of G2-19 can be G2-37 (6-chloro-1-methylquinolin-2 (1H)-one),

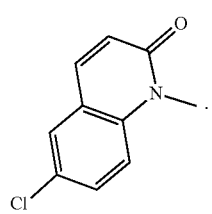

G2-41

As another example, the autophagy modulating agent comprising a 6-substituted analog of G2-19 can be G2-41 (2-methyl-6-phenylisoquinolin-1 (2H)-one),

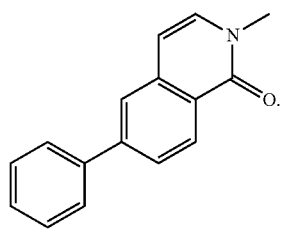 [SMILES: Cn1ccc2cc(-c3ccccc3)ccc2c1=O]

G2-42

Another example of a 6-substituted analog of G2-19 can be G2-42 (2-methyl-6-(pyridin-4-yl) isoquinolin-1 (2H)-one),

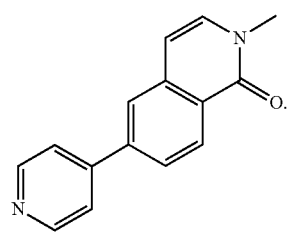 [SMILES: Cn1ccc2cc(-c3ccncc3)ccc2c1=O]

G2-45

Another example of a 6-substituted analog of G2-19 can be G2-45 (2-methyl-6-(pyrrolidin-1-yl) isoquinolin-1 (2H)-one),

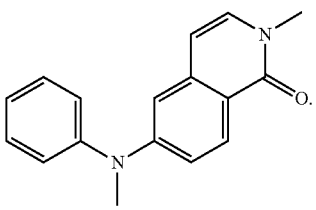 [SMILES: CN(c1ccccc1)c1ccc2c(=O)n(C)ccc2c1]

G2-48

Another example of a 6-substituted analog of G2-19 can be G2-48 (2-methyl-6-(methyl(phenyl)amino) isoquinolin-1 (2H)-one),

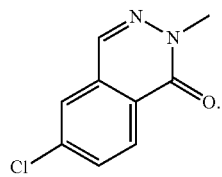

G2-51

In some embodiment, the autophagy modulating agent can be a nitrogen substituted analog of G2-19. For example, the nitrogen substituted analog of G2-19 can be G2-51 (6-chloro-2-methylphthalazin-1 (2H)-one),

G2-54

As another example, the autophagy modulating agent comprising a structural isomer of G2-19 can be G2-54 (7-chloro-1-methylquinolin-2 (1H)-one),

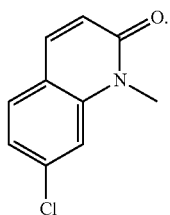

G2-69

As another example, the autophagy modulating agent comprising a demethylated structural isomer of G2-19 can be G2-69 (7-chloroquinolin-2 (1H)-one),

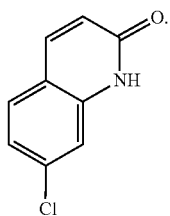 [SMILES: O=c1ccc2ccc(Cl)cc2[nH]1]

G2-115

As another example, the autophagy modulating agent comprising a demethylated, chlorine-substituted structural isomer of G2-19 can be G2-115 (5,7-dichloroquinolin-2 (1H)-one),

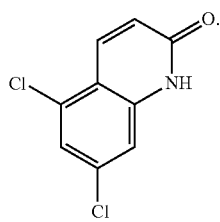 [SMILES: O=c1ccc2c(Cl)cc(Cl)cc2[nH]1]

G2-218

As another example, the autophagy modulating agent comprising a demethylated, alkoxy-substituted isomer of G2-19 can be G2-218 (7-chloro-5-(hexyloxy) quinolin-2 (1H)-one),

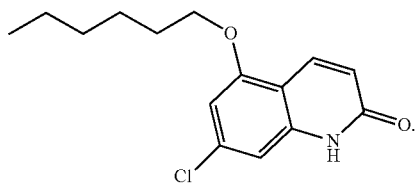 [SMILES: CCCCCCOc1cc(Cl)cc2[nH]c(=O)ccc12]

G2-237

As another example, the autophagy modulating agent comprising a demethylated, piperidinylcarbonyl-substituted isomer of G2-19 can be G2-237 (5-chloro-7-(piperidine-1-carbonyl) quinolin-2 (1H)-one),

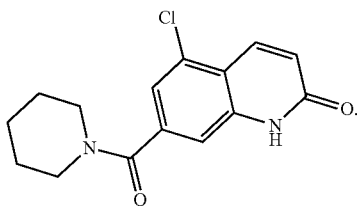 [SMILES: O=C(c1cc(Cl)c2ccc(=O)[nH]c2c1)N1CCCCC1]

Exemplary embodiments of autophagy modulating agents can be any one of the formulas in TABLE 1 or analogs thereof (see Example 2).

Compositions used for the methods of modulating autophagy in a subject (e.g., a human subject) can be or can be made by any of the methods described in US 2014/0302987 having autophagy modulating activity which is incorporated by reference in its entirety.

The term "imine" or "imino", as used herein, unless otherwise indicated, can include a functional group or chemical compound containing a carbon-nitrogen double bond. The expression "imino compound", as used herein, unless otherwise indicated, refers to a compound that includes an "imine" or an "imino" group as defined herein. The "imine" or "imino" group can be optionally substituted.

The term "hydroxyl", as used herein, unless otherwise indicated, can include-OH. The "hydroxyl" can be optionally substituted.

The terms "halogen" and "halo", as used herein, unless otherwise indicated can be a chlorine, chloro, Cl; fluorine, fluoro, F; bromine, bromo, Br; or iodine, iodo, or I.

The term "acetamide", as used herein, is an organic compound with the formula $CH_3CONH_2$. The "acetamide" can be optionally substituted.

The term "aryl", as used herein, unless otherwise indicated, can be a carbocyclic aromatic group. Examples of aryl groups can be, but are not limited to, phenyl, benzyl, naphthyl, or anthracenyl. The "aryl" can be optionally substituted.

The terms "amine", "aminyl", and "amino", as used herein, unless otherwise indicated, can be a functional group that contains a nitrogen atom with a lone pair of electrons and wherein one or more hydrogen atoms have been replaced by a substituent such as, but not limited to, an alkyl group or an aryl group. The "amine", "aminyl", or "amino" group can be optionally substituted.

The term "alkyl", as used herein, unless otherwise indicated, can include saturated monovalent hydrocarbon radicals having straight or branched moieties, such as but not limited to, methyl, ethyl, propyl, butyl, pentyl, hexyl, octyl groups, etc. Representative straight-chain lower alkyl groups include, but are not limited to,-methyl,-ethyl,-n-propyl,-n-butyl,-n-pentyl,-n-hexyl,-n-heptyl and -n-octyl; while branched lower alkyl groups can include, but are not limited to,-isopropyl,-sec-butyl,-isobutyl,-tert-butyl,-isopentyl, 2-methylbutyl, 2-methylpentyl, 3-methylpentyl, 2,2-dimethylbutyl, 2,3-dimethylbutyl, 2,2-dimethylpentyl, 2,3-dimethylpentyl, 3,3-dimethylpentyl, 2,3,4-trimethylpentyl, 3-methylhexyl, 2,2-dimethylhexyl, 2,4-dimethylhexyl, 2,5-dimethylhexyl, 3,5-dimethylhexyl, 2,4-dimethylpentyl, 2-methylheptyl, 3-methylheptyl, unsaturated $C_{1-10}$ alkyls can include, but are not limited to,-vinyl,-allyl,-1-butenyl,-2-butenyl, -isobutylenyl,-1-pentenyl,-2-pentenyl,-3-methyl-1-butenyl,-2-methyl-2-butenyl, -2,3-dimethyl-2-butenyl, 1-hexyl, 2-hexyl, 3-hexyl,-acetylenyl,-propynyl,-1-butynyl,-2-butynyl,-1-pentynyl,-2-pentynyl, or -3-methyl-1 butynyl.

An alkyl can be saturated, partially saturated, or unsaturated. The "alkyl" can be optionally substituted.

The term "carboxyl", as used herein, unless otherwise indicated, can include a functional group consisting of a carbon atom double bonded to an oxygen atom and single bonded to a hydroxyl group (—COOH). The "carboxyl" can be optionally substituted.

The term "alkenyl", as used herein, unless otherwise indicated, can include alkyl moieties having at least one carbon-carbon double bond wherein alkyl is as defined above and including E and Z isomers of the alkenyl moiety. An alkenyl can be partially saturated or unsaturated. The "alkenyl" can be optionally substituted.

The term "alkynyl", as used herein, unless otherwise indicated, can include alkyl moieties having at least one carbon-carbon triple bond wherein alkyl is as defined above. An alkynyl can be partially saturated or unsaturated. The "alkynyl" can be optionally substituted.

The term "acyl", as used herein, unless otherwise indicated, can include a functional group derived from an aliphatic carboxylic acid, by removal of the hydroxyl (—OH) group. The "acyl" can be optionally substituted.

The term "alkoxyl", as used herein, unless otherwise indicated, can include O-alkyl groups wherein alkyl is as defined above and O represents oxygen. Representative alkoxyl groups can include, but are not limited to, —O-methyl, —O-ethyl, —O-n-propyl, —O-n-butyl, —O-n-pentyl, —O-n-hexyl, —O-n-heptyl, —O-n-octyl, —O-isopropyl, —O-sec-butyl, —O-isobutyl, —O-tert-butyl, —O-isopentyl, —O-2-methylbutyl, —O-2-methylpentyl, —O-3-methylpentyl, —O-2,2-dimethylbutyl, —O-2,3-dimethylbutyl, —O-2,2-dimethylpentyl, —O-2,3-dimethylpentyl, —O-3,3-dimethylpentyl, —O-2,3,4-trimethylpentyl, —O-3-methylhexyl, —O-2,2-dimethylhexyl, —O-2,4-dimethylhexyl, —O-2,5-dimethylhexyl, —O-3,5-dimethylhexyl, —O-2,4dimethylpentyl, —O-2-methylheptyl, —O-3-methylheptyl, —O-vinyl, —O-allyl, —O-1-butenyl, —O-2-butenyl, —O-isobutylenyl, —O-1-pentenyl, —O-2-pentenyl, —O-3-methyl-1-butenyl, —O-2-methyl-2-butenyl, —O-2,3-dimethyl-2-butenyl, —O-1-hexyl, —O-2-hexyl, —O-3-hexyl, —O-acetylenyl, —O-propynyl, —O-1-butynyl, —O-2-butynyl, —O-1-pentynyl, —O-2-pentynyl and —O-3-methyl-1-butynyl, —O-cyclopropyl, —O-cyclobutyl, —O-cyclopentyl, —O-cyclohexyl, —O-cycloheptyl, —O-cyclooctyl, —O-cyclononyl and —O-cyclodecyl, —O—CH$_2$-cyclopropyl, —O—CH$_2$-cyclobutyl, —O—CH$_2$-cyclopentyl, —O—CH$_2$-cyclohexyl, —O—CH$_2$-cycloheptyl, —O—CH$_2$-cyclooctyl, —O—CH$_2$-cyclononyl, —O—CH$_2$-cyclodecyl, —O—(CH$_2$) 2-cyclopropyl, —O—(CH$_2$) 2-cyclobutyl, —O—(CH$_2$) 2-cyclopentyl, —O—(CH$_2$) 2-cyclohexyl, —O—(CH$_2$) 2-cycloheptyl, —O—(CH$_2$) 2-cyclooctyl, —O—(CH$_2$) 2-cyclononyl, or —O—(CH$_2$) 2-cyclodecyl. An alkoxyl can be saturated, partially saturated, or unsaturated. The "alkoxyl" can be optionally substituted.

The term "cycloalkyl", as used herein, unless otherwise indicated, can include an aromatic, a non-aromatic, saturated, partially saturated, or unsaturated, monocyclic or fused, spiro or unfused bicyclic or tricyclic hydrocarbon referred to herein containing a total of from 1 to 10 carbon atoms (e.g., 1 or 2 carbon atoms if there are other heteroatoms in the ring), preferably 3 to 8 ring carbon atoms. Examples of cycloalkyls can include, but are not limited to, C$_{3-10}$cycloalkyl groups which can include, but are not limited to,-cyclopropyl,-cyclobutyl,-cyclopentyl,-cyclopentadienyl,-cyclohexyl,-cyclohexenyl,-1,3-cyclohexadienyl,-1,4-cyclohexadienyl,-cycloheptyl,-1,3-cycloheptadienyl,-1,3,5-cycloheptatrienyl,-cyclooctyl, or -cyclooctadienyl. The term "cycloalkyl" also can include-lower alkyl-cycloalkyl, wherein lower alkyl and cycloalkyl are as defined herein. Examples of -lower alkyl-cycloalkyl groups can include, but are not limited to, —CH$_2$-cyclopropyl, —CH$_2$-cyclobutyl, —CH$_2$-cyclopentyl, —CH$_2$-cyclopentadienyl, —CH$_2$-cyclohexyl, —CH$_2$-cycloheptyl, or —CH$_2$-cyclooctyl. The "cycloalkyl" can be optionally substituted. A "cycloheteroalkyl", as used herein, unless otherwise indicated, can include any of the above with a carbon substituted with a heteroatom (e.g., O, S, N).

The term "heterocyclic", "heterocyclyl", or "heteroaryl", as used herein, unless otherwise indicated, can include an aromatic or non-aromatic cycloalkyl in which one to four of the ring carbon atoms are independently replaced with a heteroatom from the group consisting of O, S and N. Representative examples of a heterocycle can include, but are not limited to, benzofuranyl, benzothiophene, indolyl, benzopyrazolyl, coumarinyl, isoquinolinyl, pyrrolyl, pyrrolidinyl, thiophenyl, furanyl, thiazolyl, imidazolyl, pyrazolyl, triazolyl, quinolinyl, pyrimidinyl, pyridinyl, pyridonyl, pyrazinyl, pyridazinyl, isothiazolyl, isoxazolyl, (1,4)-dioxane, (1,3)-dioxolane, 4,5-dihydro-1H-imidazolyl, or tetrazolyl. Heterocycles can be substituted or unsubstituted. Heterocycles can also be bonded at any ring atom (i.e., at any carbon atom or heteroatom of the heterocyclic ring). A heterocyclic can be saturated, partially saturated, or unsaturated. The "heterocyclic", "heterocyclyl", or "heteroaryl" can be optionally substituted.

The term "indole", as used herein, is an aromatic heterocyclic organic compound with formula C$_8$H$_7$N. It has a bicyclic structure, consisting of a six-membered benzene ring fused to a five-membered nitrogen-containing pyrrole ring. The "indole" can be optionally substituted.

The term "cyano", as used herein, unless otherwise indicated, can include a —CN group. The "cyano" can be optionally substituted.

The term "alcohol", as used herein, unless otherwise indicated, can include a compound in which the hydroxyl functional group (—OH) is bound to a carbon atom. In particular, this carbon center should be saturated, having single bonds to three other atoms. The "alcohol" can be optionally substituted.

The term "solvate" is intended to mean a solvate form of a specified compound that retains the effectiveness of such compound. Examples of solvates can include compounds of the invention in combination with, for example: water, isopropanol, ethanol, methanol, dimethylsulfoxide (DMSO), ethyl acetate, acetic acid, or ethanolamine.

The term "mmol", as used herein, is intended to mean millimole. The term "equiv", as used herein, is intended to mean equivalent. The term "mL", as used herein, is intended to mean milliliter. The term "g", as used herein, is intended to mean gram. The term "kg", as used herein, is intended to mean kilogram. The term "µg", as used herein, is intended to mean micrograms. The term "h", as used herein, is intended to mean hour. The term "min", as used herein, is intended to mean minute. The term "M", as used herein, is intended to mean molar. The term "µL", as used herein, is intended to mean microliter. The term "µM", as used herein, is intended to mean micromolar. The term "nM", as used herein, is intended to mean nanomolar. The term "N", as used herein, is intended to mean normal. The term "amu", as used herein, is intended to mean atomic mass unit. The term "° C.", as used herein, is intended to mean degree Celsius. The term "wt/wt", as used herein, is intended to mean weight/weight. The term "v/v", as used herein, is intended to mean volume/volume. The term "MS", as used herein, is intended to mean mass spectroscopy. The term "HPLC", as used herein, is intended to mean high performance liquid chromatograph. The term "RT", as used herein, is intended to mean room temperature. The term "e.g.", as used herein, is intended to mean example. The term "N/A", as used herein, is intended to mean not tested.

As used herein, the expression "pharmaceutically acceptable salt" refers to pharmaceutically acceptable organic or inorganic salts of a compound of the invention. Preferred salts include, but are not limited, to sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate, or pamoate (i.e., 1,1'-methylene-bis-(2-hydroxy-3-naphthoate)) salts. A pharmaceutically acceptable salt may involve the inclusion of another molecule such as an acetate ion, a succinate ion, or other counterion. The counterion may be any organic or inorganic moiety that stabilizes the charge on the parent compound. Furthermore, a pharmaceutically acceptable salt may have more than one charged atom in its structure. Instances where multiple charged atoms are part of the pharmaceutically acceptable salt can have multiple counterions. Hence, a pharmaceutically acceptable salt can have one or more charged atoms and/or one or more counterion. As used herein, the expression "pharmaceutically acceptable solvate" refers to an association of one or more solvent molecules and a compound of the invention. Examples of solvents that form pharmaceutically acceptable solvates include, but are not limited to, water, isopropanol, ethanol, methanol, DMSO, ethyl acetate, acetic acid, and ethanolamine. As used herein, the expression "pharmaceutically acceptable hydrate" refers to a compound of the invention, or a salt thereof, which further can include a stoichiometric or non-stoichiometric amount of water bound by non-covalent intermolecular forces.

The term "imine" or "imino", as used herein, unless otherwise indicated, can include a functional group or chemical compound containing a carbon-nitrogen double bond. The expression "imino compound", as used herein, unless otherwise indicated, refers to a compound that includes an "imine" or an "imino" group as defined herein. The "imine" or "imino" group can be optionally substituted.

The term "hydroxyl", as used herein, unless otherwise indicated, can include —OH. The "hydroxyl" can be optionally substituted.

The terms "halogen" and "halo", as used herein, unless otherwise indicated, include a chlorine, chloro, Cl; fluorine, fluoro, F; bromine, bromo, Br; or iodine, iodo, or I.

The term "acetamide", as used herein, is an organic compound with the formula $CH_3CONH_2$. The "acetamide" can be optionally substituted.

The term "aryl", as used herein, unless otherwise indicated, include a carbocyclic aromatic group. Examples of aryl groups include, but are not limited to, phenyl, benzyl, naphthyl, or anthracenyl. The "aryl" can be optionally substituted.

The terms "amine" and "amino", as used herein, unless otherwise indicated, include a functional group that contains a nitrogen atom with a lone pair of electrons and wherein one or more hydrogen atoms have been replaced by a substituent such as, but not limited to, an alkyl group or an aryl group. The "amine" or "amino" group can be optionally substituted.

The term "alkyl", as used herein, unless otherwise indicated, can include saturated monovalent hydrocarbon radicals having straight or branched moieties, such as but not limited to, methyl, ethyl, propyl, butyl, pentyl, hexyl, octyl groups, etc. Representative straight-chain lower alkyl groups include, but are not limited to,-methyl,-ethyl,-n-propyl,-n-butyl,-n-pentyl,-n-hexyl,-n-heptyl and -n-octyl; while branched lower alkyl groups include, but are not limited to,-isopropyl,-sec-butyl,-isobutyl,-tert-butyl,-isopentyl, 2-methylbutyl, 2-methylpentyl, 3-methylpentyl, 2,2-dimethylbutyl, 2,3-dimethylbutyl, 2,2-dimethylpentyl, 2,3-dimethylpentyl, 3,3-dimethylpentyl, 2,3,4-trimethylpentyl, 3-methylhexyl, 2,2-dimethylhexyl, 2,4-dimethylhexyl, 2,5-dimethylhexyl, 3,5-dimethylhexyl, 2,4-dimethylpentyl, 2-methylheptyl, 3-methylheptyl, unsaturated $C_{1-10}$ alkyls include, but are not limited to,-vinyl,-allyl,-1-butenyl,-2-butenyl,-isobutylenyl,-1-pentenyl,-2-pentenyl,-3-methyl-1-butenyl,-2-methyl-2-butenyl,-2,3-dimethyl-2-butenyl, 1-hexyl, 2-hexyl, 3-hexyl,-acetylenyl,-propynyl,-1-butynyl,-2-butynyl,-1-pentynyl,-2-pentynyl, or -3-methyl-1 butynyl. An alkyl can be saturated, partially saturated, or unsaturated. The "alkyl" can be optionally substituted.

The term "carboxyl", as used herein, unless otherwise indicated, can include a functional group consisting of a carbon atom double bonded to an oxygen atom and single bonded to a hydroxyl group (—COOH). The "carboxyl" can be optionally substituted.

The term "carbonyl", as used herein, unless otherwise indicated, can include a functional group consisting of a carbon atom double-bonded to an oxygen atom (C=O). The "carbonyl" can be optionally substituted.

The term "alkenyl", as used herein, unless otherwise indicated, can include alkyl moieties having at least one carbon-carbon double bond wherein alkyl is as defined above and including E and Z isomers of said alkenyl moiety. An alkenyl can be partially saturated or unsaturated. The "alkenyl" can be optionally substituted.

The term "alkynyl", as used herein, unless otherwise indicated, can include alkyl moieties having at least one carbon-carbon triple bond wherein alkyl is as defined above. An alkynyl can be partially saturated or unsaturated. The "alkynyl" can be optionally substituted.

The term "acyl", as used herein, unless otherwise indicated, can include a functional group derived from an aliphatic carboxylic acid, by removal of the hydroxyl (—OH) group. The "acyl" can be optionally substituted.

The term "alkoxyl", as used herein, unless otherwise indicated, can include O-alkyl groups wherein alkyl is as defined above and O represents oxygen. Representative alkoxyl groups include, but are not limited to, —O-methyl, —O-ethyl, —O-n-propyl, —O-n-butyl, —O-n-pentyl, —O-n-hexyl, —O-n-heptyl, —O-n-octyl, —O-isopropyl, —O-sec-butyl, —O-isobutyl, —O-tert-butyl, —O-isopentyl, —O-2-methylbutyl, —O-2-methylpentyl, —O-3-methylpentyl, —O-2,2-dimethylbutyl, —O-2,3-dimethylbutyl, —O-2,2-dimethylpentyl, —O-2,3-dimethylpentyl, —O-3,3-dimethylpentyl, —O-2,3,4-trimethylpentyl, —O-3-methylhexyl, —O-2,2-dimethylhexyl, —O-2,4-dimethylhexyl, —O-2,5-dimethylhexyl, —O-3,5-dimethylhexyl, —O-2,4dimethylpentyl, —O-2-methylheptyl, —O-3-methylheptyl, —O-vinyl, —O-allyl, —O-1-butenyl, —O-2-butenyl, —O-isobutylenyl, —O-1-pentenyl, —O-2-pentenyl, —O-3-methyl-1-butenyl, —O-2-methyl-2-butenyl, —O-2,3-dimethyl-2-butenyl, —O-1-hexyl, —O-2-hexyl, —O-3-hexyl, —O-acetylenyl, —O-propynyl, —O-1-butynyl, —O-2-butynyl, —O-1-pentynyl, —O-2-pentynyl and —O-3-methyl-1-butynyl, —O-cyclopropyl, —O-cyclobutyl, —O-cyclopentyl, —O-cyclohexyl, —O-cycloheptyl, —O-cyclooctyl, —O-cyclononyl and —O-cyclodecyl, —O—CH$_2$-cyclopropyl, —O—CH$_2$-cyclobutyl, —O—CH$_2$-cyclopentyl, —O—CH$_2$-cyclohexyl, —O—CH$_2$-cycloheptyl, —O—CH$_2$-cyclooctyl, —O—CH$_2$-cyclononyl, —O—CH$_2$-cyclodecyl, —O—(CH$_2$) 2-cyclopropyl, —O—(CH$_2$) 2-cyclobutyl, —O—(CH$_2$) 2-cyclopentyl, —O—(CH$_2$) 2-cyclohexyl, —O—(CH$_2$) 2-cycloheptyl, —O—(CH$_2$) 2-cyclooctyl, —O—(CH$_2$) 2-cyclononyl, or —O—(CH$_2$) 2-cyclodecyl. An alkoxyl can be saturated, partially saturated, or unsaturated. The "alkoxyl" can be optionally substituted.

The term "cycloalkyl", as used herein, unless otherwise indicated, can include an aromatic, a non-aromatic, saturated, partially saturated, or unsaturated, monocyclic or fused, spiro or unfused bicyclic or tricyclic hydrocarbon referred to herein containing a total of from 1 to 10 carbon atoms (e.g., 1 or 2 carbon atoms if there are other heteroatoms in the ring), preferably 3 to 8 ring carbon atoms. Examples of cycloalkyls include, but are not limited to, $C_{3-10}$ cycloalkyl groups include, but are not limited to,-cyclopropyl,-cyclobutyl,-cyclopentyl,-cyclopentadienyl,-cyclohexyl,-cyclohexenyl,-1,3-cyclohexadienyl, -1,4-cyclohexadienyl,-cycloheptyl,-1,3-cycloheptadienyl,-1,3,5-cycloheptatrienyl,-cyclooctyl, and -cyclooctadienyl. The term "cycloalkyl" also can include-lower alkyl-cycloalkyl, wherein lower alkyl and cycloalkyl are as defined herein. Examples of -lower alkyl-cycloalkyl groups include, but are not limited to, —CH$_2$-cyclopropyl, —CH$_2$-cyclobutyl, —CH$_2$-cyclopentyl, —CH$_2$-cyclopentadienyl, —CH$_2$-cyclohexyl, —CH$_2$-cycloheptyl, or —CH$_2$-cyclooctyl. The "cycloalkyl" can be optionally substituted. A "cycloheteroalkyl", as used herein, unless otherwise indicated, can include any of the above with a carbon substituted with a heteroatom (e.g., O, S, N).

The term "heterocyclic" or "heteroaryl", as used herein, unless otherwise indicated, can include an aromatic or non-aromatic cycloalkyl in which one to four of the ring carbon atoms are independently replaced with a heteroatom from the group consisting of O, S, and N. Representative examples of a heterocycle include, but are not limited to, benzofuranyl, benzothiophene, indolyl, benzopyrazolyl, coumarinyl, isoquinolinyl, pyrrolyl, pyrrolidinyl, thiophenyl, furanyl, thiazolyl, imidazolyl, pyrazolyl, triazolyl, quinolinyl, pyrimidinyl, pyridinyl, pyridonyl, pyrazinyl, pyridazinyl, isothiazolyl, isoxazolyl, (1,4)-dioxane, (1,3)-dioxolane, 4,5-dihydro-1H-imidazolyl, or tetrazolyl. Heterocycles can be substituted or unsubstituted. Heterocycles can also be bonded at any ring atom (i.e., at any carbon atom or heteroatom of the heterocyclic ring). A heterocyclic can be saturated, partially saturated, or unsaturated. The "heterocyclic" can be optionally substituted.

The term "indole", as used herein, is an aromatic heterocyclic organic compound with formula $C_8H_7N$. It has a bicyclic structure, consisting of a six-membered benzene ring fused to a five-membered nitrogen-containing pyrrole ring. The "indole" can be optionally substituted.

The term "cyano", as used herein, unless otherwise indicated, can include a —CN group. The "cyano" can be optionally substituted.

The term "alcohol", as used herein, unless otherwise indicated, can include a compound in which the hydroxyl functional group (—OH) is bound to a carbon atom. In particular, this carbon center should be saturated, having single bonds to three other atoms. The "alcohol" can be optionally substituted.

The term "solvate" is intended to mean a solvate form of a specified compound that retains the effectiveness of such compound. Examples of solvates include compounds of the invention in combination with, for example, water, isopropanol, ethanol, methanol, dimethylsulfoxide (DMSO), ethyl acetate, acetic acid, or ethanolamine.

The term "mmol", as used herein, is intended to mean millimole. The term "equiv", as used herein, is intended to mean equivalent. The term "mL", as used herein, is intended to mean milliliter. The term "g", as used herein, is intended to mean gram. The term "kg", as used herein, is intended to mean kilogram. The term "µg", as used herein, is intended to mean micrograms. The term "h", as used herein, is intended to mean hour. The term "min", as used herein, is intended to mean minute. The term "M", as used herein, is intended to mean molar. The term "µL", as used herein, is intended to mean microliter. The term "µM", as used herein, is intended to mean micromolar. The term "nM", as used herein, is intended to mean nanomolar. The term "N", as used herein, is intended to mean normal. The term "amu", as used herein, is intended to mean atomic mass unit. The term "° C.", as used herein, is intended to mean degree Celsius. The term "wt/wt", as used herein, is intended to mean weight/weight. The term "v/v", as used herein, is intended to mean volume/volume. The term "MS", as used herein, is intended to mean mass spectroscopy. The term "HPLC", as used herein, is intended to mean high performance liquid chromatograph. The term "RT", as used herein, is intended to mean room temperature. The term "e.g.", as used herein, is intended to mean example. The term "N/A", as used herein, is intended to mean not tested.

As used herein, the expression "pharmaceutically acceptable salt" refers to pharmaceutically acceptable organic or inorganic salts of a compound of the invention. Preferred salts include, but are not limited, to sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate, or pamoate (i.e., 1,1'-methylene-bis-(2-hydroxy-3-naphthoate)) salts. A pharmaceutically acceptable salt may involve the inclusion of another molecule such as an acetate ion, a succinate ion, or another counterion. The counterion may be any organic or inorganic moiety that stabilizes the charge on the parent compound. Furthermore, a pharmaceutically acceptable salt may have more than one charged atom in its structure. In instances where multiple charged atoms are part of the pharmaceutically acceptable salt, the pharmaceutically acceptable salt can have multiple counterions. Hence, a pharmaceutically acceptable salt can have one or more charged atoms and/or one or more counterion. As used herein, the expression "pharmaceutically acceptable solvate" refers to an association of one or more solvent molecules and a compound of the invention. Examples of solvents that form pharmaceutically acceptable solvates include, but are not limited to, water, isopropanol, ethanol, methanol, DMSO, ethyl acetate, acetic acid, and ethanolamine. As used herein, the expression "pharmaceutically acceptable hydrate" refers to a compound of the invention, or a salt thereof, that further can include a stoichiometric or non-stoichiometric amount of water bound by non-covalent intermolecular forces.

Autophagy Modulating Agent Activity

An autophagy modulating agent can be an agent having autophagy modulating activity. As an example, the autophagy modulating agent can be an active autophagy enhancing agent having enhanced autophagic degradation activity. Enhanced autophagic degradation (autophagy activity) of ATZ can be measured in a number of ways, but here, it was shown most definitively, by showing that the drug effect was blocked when the autophagy gene ATG14 was deleted in a mammalian cell line model of ATD. As an example, the measurement of decreased hepatic ATZ load together with increased LC3-II conversion and decreased p62 levels in the liver of the PiZ mouse model of ATD can be used as markers of increased autophagic activity.

As another example, an "active" autophagy enhancing agent can be an agent, when administered to a pre-clinical model (e.g., a mammalian cell line, C. elegans model of ATD using human ATZ, a PiZ mouse model) or a subject, can reduce the accumulation of misfolded, aggregated ATZ, reduce hepatic ATZ load, reduce p62 levels, increase LC3-II conversion, or reduce neuronal death when compared to a control or pre-clinical model or subject when administered a control or when there was no administration of the drug.

Measurements of autophagy-associated markers can be performed using an assay such as immunoblotting (e.g., Western Blot) or immunostaining (e.g., immunohistochemistry) (see e.g., Example 2). An "active" autophagy enhancing agent can be an agent, when administered to striatal neurons from a Huntington's patient, reduces neuronal cell death compared to a control.

As such, an "active" autophagy enhancing agent can be an agent that, after administration to a cell or subject, results in reduced accumulation of misfolded, aggregated ATZ, reduced hepatic ATZ load, or reduced neuronal cell death compared to the administration of a control or no administration of an autophagy enhancing agent.

Activity can also be evaluated in comparison to GB activity or other G2 analogs.

Methods for measuring autophagy activity are well known; see e.g. Yoshii and Mizushima 2017 Int J Mol Sci. 18 (9) 1865. Except as otherwise noted herein, therefore, the process of the present disclosure can be carried out in accordance with such processes.

Formulation

The agents and compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of a biologically active agent described herein, which can be in purified form, together with a suitable amount of carrier so as to provide the form for proper administration to the subject.

The term "formulation" refers to preparing a drug in a form suitable for administration to a subject, such as a human. Thus, a "formulation" can include pharmaceutically acceptable excipients, including diluents or carriers.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutically active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years.

The formulation should suit the mode of administration. The agents of use with the current disclosure can be formulated by known methods for administration to a subject using several routes which include, but are not limited to, parenteral, pulmonary, oral, topical, intradermal, intratumoral, intranasal, inhalation (e.g., in an aerosol), implanted, intramuscular, intraperitoneal, intravenous, intrathecal, intracranial, intracerebroventricular, subcutaneous, intranasal, epidural, intrathecal, ophthalmic, transdermal, buccal, and rectal. The individual agents may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic, or other physical forces.

Controlled-release (or sustained-release) preparations may be formulated to extend the activity of the agent(s) and reduce dosage frequency. Controlled-release preparations can also be used to affect the time of onset of action or other characteristics, such as blood levels of the agent, and consequently affect the occurrence of side effects. Controlled-release preparations may be designed to initially release an amount of an agent(s) that produces the desired therapeutic effect, and gradually and continually release other amounts of the agent to maintain the level of therapeutic effect over an extended period of time. In order to maintain a near-constant level of an agent in the body, the agent can be released from the dosage form at a rate that will replace the amount of agent being metabolized or excreted from the body. The controlled-release of an agent may be stimulated by various inducers, e.g., change in pH, change in temperature, enzymes, water, or other physiological conditions or molecules.

Agents or compositions described herein can also be used in combination with other therapeutic modalities, as described further below. Thus, in addition to the therapies described herein, one may also provide to the subject other therapies known to be efficacious for treatment of the disease, disorder, or condition.

Therapeutic Methods

Also provided is a process of treating or preventing an autophagy-associated disease, disorder, or condition in a subject in need of administration of a therapeutically effective amount of an autophagy modulating agent, or combinations thereof, so as to modulate autophagy. The experiments using G2-19 in the PiZ mouse model and in the striatal neurons, not only provide evidence for treatment, but also represent evidence of prevention in pre-clinical models. Modulation of autophagy can result in a reduction of proteotoxicity, liver damage, hepatic ATZ load, and liver fibrosis and improvement in neuronal survival.

Methods described herein are generally performed on a subject in need thereof. A subject in need of the therapeutic methods described herein can be a subject having, diagnosed with, suspected of having, or at risk for developing an autophagy-associated disease. A determination of the need for treatment will typically be assessed by a history, physical exam, or diagnostic tests consistent with the disease or condition at issue. Diagnosis of the various conditions treatable by the methods described herein is within the skill of the art. The subject can be an animal subject, including a mammal, such as horses, cows, dogs, cats, sheep, pigs, mice, rats, monkeys, hamsters, guinea pigs, and humans. For example, the subject can be a human subject.

Generally, a safe and effective amount of an autophagy modulating agent is, for example, that amount that would cause the desired therapeutic effect in a subject while minimizing undesired side effects. In various embodiments, an effective amount of an autophagy modulating agent, described herein can substantially inhibit an autophagy-associated disease, slow the progress of an autophagy-associated disease, or limit the development of an autophagy-associated disease According to the methods described herein, administration can be parenteral, pulmonary, oral, topical, intradermal, intratumoral, intranasal, inhalation (e.g., in an aerosol), implanted, intramuscular, intraperitoneal, intravenous, intrathecal, intracranial, intracerebroventricular, subcutaneous, intranasal, epidural, intrathecal, ophthalmic, transdermal, buccal, and rectal administration.

When used in the treatments described herein, a therapeutically effective amount of an autophagy modulating agent can be employed in pure form or, where such forms exist, in pharmaceutically acceptable salt form and with or without a pharmaceutically acceptable excipient. For example, the compounds of the present disclosure can be administered, at a reasonable benefit/risk ratio applicable to any medical treatment, in a sufficient amount to modulate autophagy.

The amount of a composition described herein that can be combined with a pharmaceutically acceptable carrier to produce a single dosage form will vary depending upon the host treated and the particular mode of administration. It will be appreciated by those skilled in the art that the unit content of agent contained in an individual dose of each dosage form need not in itself constitute a therapeutically effective amount, as the necessary therapeutically effective amount could be reached by administration of a number of individual doses.

Toxicity and therapeutic efficacy of compositions described herein can be determined by standard pharmaceutical procedures in cell cultures or experimental animals for determining the $LD_{50}$ (the dose lethal to 50% of the population) and the $ED_{50}$, (the dose therapeutically effective in 50% of the population). The dose ratio between toxic and therapeutic effects is the therapeutic index that can be expressed as the ratio $LD_{50}/ED_{50}$, where larger therapeutic indices are generally understood in the art to be optimal.

The specific therapeutically effective dose level for any particular subject will depend upon a variety of factors including the disorder being treated and the severity of the disorder; activity of the specific compound employed; the specific composition employed; the age, body weight, general health, sex and diet of the subject; the time of administration; the route of administration; the rate of excretion of the composition employed; the duration of the treatment; drugs used in combination or coincidental with the specific compound employed; and like factors well known in the medical arts (see e.g., Koda-Kimble et al. (2004) Applied Therapeutics: The Clinical Use of Drugs, Lippincott Williams & Wilkins, ISBN 0781748453; Winter (2003) Basic Clinical Pharmacokinetics, 4th ed., Lippincott Williams & Wilkins, ISBN 0781741475; Sharqel (2004) Applied Biopharmaceutics & Pharmacokinetics, McGraw-Hill/Appleton & Lange, ISBN 0071375503). For example, it is well within the skill of the art to start doses of the composition at levels lower than those required to achieve the desired therapeutic effect and to gradually increase the dosage until the desired effect is achieved. If desired, the effective daily dose may be divided into multiple doses for purposes of administration. Consequently, single dose compositions may contain such amounts or submultiples thereof to make up the daily dose. It will be understood, however, that the total daily usage of the compounds and compositions of the present disclosure will be decided by an attending physician within the scope of sound medical judgment.

Again, each of the states, diseases, disorders, and conditions, described herein, as well as others, can benefit from compositions and methods described herein. Generally, treating a state, disease, disorder, or condition includes preventing or delaying the appearance of clinical symptoms in a mammal that may be afflicted with or predisposed to the state, disease, disorder, or condition but does not yet experience or display clinical or subclinical symptoms thereof. Treating can also include inhibiting the state, disease, disorder, or condition, e.g., arresting or reducing the development of the disease or at least one clinical or subclinical symptom thereof. Furthermore, treating can include relieving the disease, e.g., causing regression of the state, disease, disorder, or condition or at least one of its clinical or subclinical symptoms. A benefit to a subject to be treated can be either statistically significant or at least perceptible to the subject or a physician.

Administration of an autophagy modulating agent can occur as a single event or over a time course of treatment. For example, an autophagy modulating agent can be administered daily, weekly, bi-weekly, or monthly. For treatment of acute conditions, the time course of treatment will usually be at least several days. Certain conditions could extend treatment from several days to several weeks. For example, treatment could extend over one week, two weeks, or three weeks. For more chronic conditions, treatment could extend from several weeks to several months or even a year or more.

Treatment in accord with the methods described herein can be performed prior to, concurrent with, or after conventional treatment modalities for autophagy-associated disease.

An autophagy modulating agent can be administered simultaneously or sequentially with another agent, such as an antibiotic, an anti-inflammatory, or another agent. For example, an autophagy modulating agent can be administered simultaneously with another agent, such as an antibiotic or an anti-inflammatory. Simultaneous administration can occur through administration of separate compositions, each containing one or more of an autophagy modulating agent, an antibiotic, an anti-inflammatory, or another agent. Simultaneous administration can occur through administration of one composition containing two or more of an autophagy modulating agent, an antibiotic, an anti-inflammatory, or another agent. An autophagy modulating agent can be administered sequentially with an antibiotic, an anti-inflammatory, or another agent. For example, an autophagy modulating agent can be administered before or after administration of an antibiotic, an anti-inflammatory, or another agent.

Active compounds are administered at a therapeutically effective dosage sufficient to treat a condition associated with a condition in a patient. For example, the efficacy of a compound can be evaluated in an animal model system that may be predictive of efficacy in treating the disease in a human or another animal, such as the model systems shown in the examples and drawings.

An effective dose range of a therapeutic can be extrapolated from effective doses determined in animal studies for a variety of different animals. In general, a human equivalent dose (HED) in mg/kg can be calculated in accordance with the following formula (see e.g., Reagan-Shaw et al., *FASEB J.*, 22 (3): 659-661, 2008, which is incorporated herein by reference):

$$HED(mg/kg) = \text{Animal dose}(mg/kg) \times (\text{Animal } K_m/\text{Human } K_m)$$

Use of the $K_m$ factors in conversion results in more accurate HED values, which are based on body surface area (BSA) rather than only on body mass. $K_m$ values for humans and various animals are well known. For example, the $K_m$ for an average 60 kg human (with a BSA of 1.6 m$^2$) is 37, whereas a 20 kg child (BSA 0.8 m$^2$) would have a $K_m$ of 25. $K_m$ for some relevant animal models are also well known, including: mice $K_m$ of 3 (given a weight of 0.02 kg and BSA of 0.007); hamster $K_m$ of 5 (given a weight of 0.08 kg and BSA of 0.02); rat $K_m$ of 6 (given a weight of 0.15 kg and BSA of 0.025) and monkey $K_m$ of 12 (given a weight of 3 kg and BSA of 0.24).

Precise amounts of the therapeutic composition depend on the judgment of the practitioner and are peculiar to each individual. Nonetheless, a calculated HED dose provides a general guide. Other factors affecting the dose include the physical and clinical state of the patient, the route of administration, the intended goal of treatment, and the potency, stability, and toxicity of the particular therapeutic formulation.

The actual dosage amount of a compound of the present disclosure or composition comprising a compound of the present disclosure administered to a subject may be determined by physical and physiological factors such as type of animal treated, age, sex, body weight, severity of condition, the type of disease being treated, previous or concurrent therapeutic interventions, idiopathy of the subject and on the route of administration. These factors may be determined by a skilled artisan. The practitioner responsible for administration will typically determine the concentration of active ingredient(s) in a composition and appropriate dose(s) for the individual subject. The dosage may be adjusted by the individual physician in the event of any complication.

In some embodiments, an autophagy modulating agent may be administered in an amount from about 1 mg/kg to about 100 mg/kg, or about 1 mg/kg to about 50 mg/kg, or about 1 mg/kg to about 25 mg/kg, or about 1 mg/kg to about 15 mg/kg, or about 1 mg/kg to about 10 mg/kg, or about 1 mg/kg to about 5 mg/kg, or about 3 mg/kg. In some embodiments, an autophagy modulating agent such as a compound described herein may be administered in a range of about 1 mg/kg to about 200 mg/kg, or about 50 mg/kg to about 200 mg/kg, or about 50 mg/kg to about 100 mg/kg, or about 75 mg/kg to about 100 mg/kg, or about 100 mg/kg.

The effective amount may be less than 1 mg/kg/day, less than 500 mg/kg/day, less than 250 mg/kg/day, less than 100 mg/kg/day, less than 50 mg/kg/day, less than 25 mg/kg/day or less than 10 mg/kg/day. It may alternatively be in the range of 1 mg/kg/day to 200 mg/kg/day.

In other non-limiting examples, a dose may also comprise from about 1 microgram/kg/body weight, about 5 microgram/kg/body weight, about 10 microgram/kg/body weight, about 50 microgram/kg/body weight, about 100 microgram/kg/body weight, about 200 microgram/kg/body weight, about 350 microgram/kg/body weight, about 500 microgram/kg/body weight, about 1 milligram/kg/body weight, about 5 milligram/kg/body weight, about 10 milligram/kg/body weight, about 50 milligram/kg/body weight, about 100 milligram/kg/body weight, about 200 milligram/kg/body weight, about 350 milligram/kg/body weight, about 500 milligram/kg/body weight, to about 1000 mg/kg/body weight or more per administration, and any range derivable therein. In non-limiting examples of a derivable range from the numbers listed herein, a range of about 5 mg/kg/body weight to about 100 mg/kg/body weight, about 5 microgram/kg/body weight to about 500 milligram/kg/body weight, etc., can be administered, based on the numbers described above.

Administration

Agents and compositions described herein can be administered according to methods described herein in a variety of means known to the art. The agents and composition can be used therapeutically either as exogenous materials or as endogenous materials. Exogenous agents are those produced or manufactured outside of the body and administered to the body. Endogenous agents are those produced or manufactured inside the body by some type of device (biologic or other) for delivery within or to other organs in the body.

As discussed above, administration can be parenteral, pulmonary, oral, topical, intradermal, intratumoral, intranasal, inhalation (e.g., in an aerosol), implanted, intramuscular, intraperitoneal, intravenous, intrathecal, intracranial, intracerebroventricular, subcutaneous, intranasal, epidural, intrathecal, ophthalmic, transdermal, buccal, and rectal.

Agents and compositions described herein can be administered in a variety of methods well known in the arts. Administration can include, for example, methods involving oral ingestion, direct injection (e.g., systemic or stereotactic), implantation of cells engineered to secrete the factor of interest, drug-releasing biomaterials, polymer matrices, gels, permeable membranes, osmotic systems, multilayer coatings, microparticles, implantable matrix devices, mini-osmotic pumps, implantable pumps, injectable gels and hydrogels, liposomes, micelles (e.g., up to 30 μm), nanospheres (e.g., less than 1 μm), microspheres (e.g., 1-100 μm), reservoir devices, a combination of any of the above, or other suitable delivery vehicles to provide the desired release profile in varying proportions. Other methods of controlled-release delivery of agents or compositions will be known to the skilled artisan and are within the scope of the present disclosure.

Delivery systems may include, for example, an infusion pump which may be used to administer the agent or composition in a manner similar to that used for delivering insulin or chemotherapy to specific organs or tumors. Typically, using such a system, an agent or composition can be administered in combination with a biodegradable, biocompatible polymeric implant that releases the agent over a controlled period of time at a selected site. Examples of polymeric materials include polyanhydrides, polyorthoesters, polyglycolic acid, polylactic acid, polyethylene vinyl acetate, and copolymers and combinations thereof. In addition, a controlled release system can be placed in proximity of a therapeutic target, thus requiring only a fraction of a systemic dosage.

Agents can be encapsulated and administered in a variety of carrier delivery systems. Examples of carrier delivery systems include microspheres, hydrogels, polymeric implants, smart polymeric carriers, and liposomes (see generally, Uchegbu and Schatzlein, eds. (2006) Polymers in Drug Delivery, CRC, ISBN-10:0849325331). Carrier-based systems for molecular or biomolecular agent delivery can: provide for intracellular delivery; tailor biomolecule/agent release rates; increase the proportion of biomolecule that reaches its site of action; improve the transport of the drug to its site of action; allow colocalized deposition with other agents or excipients; improve the stability of the agent in vivo; prolong the residence time of the agent at its site of action by reducing clearance; decrease the nonspecific delivery of the agent to nontarget tissues; decrease irritation caused by the agent; decrease toxicity due to high initial doses of the agent; alter the immunogenicity of the agent; decrease dosage frequency, improve taste of the product; or improve shelf life of the product.

Screening

Also provided are methods for drug screening or genetic screening for autophagy modulators.

A C. elegans model of ATD using human ATZ or and a PiZ mouse model can be used. A compound or genetic information can be introduced to the model and the value of ATZ accumulation or reduction can be measured.

The subject methods find use in the screening of a variety of different candidate molecules (e.g., potentially therapeutic candidate molecules). Candidate substances for screening according to the methods described herein include, but are not limited to, fractions of tissues or cells, nucleic acids, polypeptides, siRNAs, antisense molecules, aptamers, ribozymes, triple helix compounds, antibodies, and small (e.g., less than about 2000 MW, or less than about 1000 MW, or less than about 800 MW) organic molecules or inorganic molecules including but not limited to salts or metals.

Candidate molecules encompass numerous chemical classes, for example, organic molecules, such as small organic compounds having a molecular weight of more than 50 and less than about 2,500 Daltons. Candidate molecules can comprise functional groups necessary for structural interaction with proteins, particularly hydrogen bonding, and typically include at least an amine, carbonyl, hydroxyl, or carboxyl group, and usually at least two of the functional chemical groups. The candidate molecules can comprise cyclical carbon or heterocyclic structures and/or aromatic or polyaromatic structures substituted with one or more of the above functional groups.

A candidate molecule can be a compound in a library database of compounds. One of skill in the art will be generally familiar with, for example, numerous databases for commercially available compounds for screening (see e.g., ZINC database, UCSF, with 2.7 million compounds over 12 distinct subsets of molecules; Irwin and Shoichet (2005) J Chem Inf Model 45, 177-182). One of skill in the art will also be familiar with a variety of search engines to identify commercial sources or desirable compounds and classes of compounds for further testing (see e.g., ZINC database; eMolecules.com; and electronic libraries of commercial compounds provided by vendors, for example, ChemBridge, Princeton BioMolecular, Ambinter SARL, Enamine, ASDI, Life Chemicals, etc.).

Candidate molecules for screening according to the methods described herein include both lead-like compounds and drug-like compounds. A lead-like compound is generally understood to have a relatively smaller scaffold-like structure (e.g., a molecular weight of about 150 to about 350 kD) with relatively fewer features (e.g., less than about 3 hydrogen donors and/or less than about 6 hydrogen acceptors; hydrophobicity character xlogP of about-2 to about 4) (see e.g., Angewante (1999) Chemie Int. ed. Engl. 24, 3943-3948). In contrast, a drug-like compound is generally understood to have a relatively larger scaffold (e.g., a molecular weight of about 150 to about 500 kD) with relatively more numerous features (e.g., less than about 10 hydrogen acceptors and/or less than about 8 rotatable bonds; hydrophobicity character xlogP of less than about 5) (see e.g., Lipinski (2000) J. Pharm. Tox. Methods 44, 235-249). Initial screening can be performed with lead-like compounds.

When designing a lead from spatial orientation data, it can be useful to understand that certain molecular structures are characterized as being "drug-like". Such characterization can be based on a set of empirically recognized qualities derived by comparing similarities across the breadth of known drugs within the pharmacopoeia. While it is not required for drugs to meet all, or even any, of these characterizations, it is far more likely for a drug candidate to meet with clinical success if it is drug-like.

Several of these "drug-like" characteristics have been summarized into the four rules of Lipinski (generally known as the "rules of fives" because of the prevalence of the number 5 among them). While these rules generally relate to oral absorption and are used to predict bioavailability of a compound during lead optimization, they can serve as effective guidelines for constructing a lead molecule during rational drug design efforts such as may be accomplished by using the methods of the present disclosure.

The four "rules of five" state that a candidate drug-like compound should have at least three of the following characteristics: (i) a weight less than 500 Daltons; (ii) a log of P less than 5; (iii) no more than 5 hydrogen bond donors (expressed as the sum of OH and NH groups); and (iv) no more than 10 hydrogen bond acceptors (the sum of N and O atoms). Also, drug-like molecules typically have a span (breadth) of between about 8 Å to about 15 Å.

Compositions and methods described herein utilizing molecular biology protocols can be according to a variety of standard techniques known to the art (see e.g., Sambrook and Russel (2006) Condensed Protocols from Molecular Cloning: A Laboratory Manual, Cold Spring Harbor Laboratory Press, ISBN-10:0879697717; Ausubel et al. (2002) Short Protocols in Molecular Biology, 5th ed., Current Protocols, ISBN-10:0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754; Studier (2005) Protein Expr Purif. 41 (1), 207-234; Gellissen, ed. (2005) Production of Recombinant Proteins: Novel Microbial and Eukaryotic Expression Systems, Wiley-VCH, ISBN-10:3527310363; Baneyx (2004) Protein Expression Technologies, Taylor & Francis, ISBN-10: 0954523253).

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Glyburide and G2 Enhance Autophagy, Reduce ATZ Aggregation, and Improve Liver Pathology in Alpha-1 Antitrypsin Deficiency (ATD) Models This example describes a method of enhancing autophagy, reducing ATZ protein aggregation, and improving liver pathology in *C. elegans* and mouse models of ATD, comprising administering glyburide (GB) or a glyburide structural analog G2.

The formula for glibenclamide/glyburide (GB) (5-chloro-N-(4-(N-(cyclohexylcarbamoyl) sulfamoyl) phenethyl)-2-methoxybenzamide) is

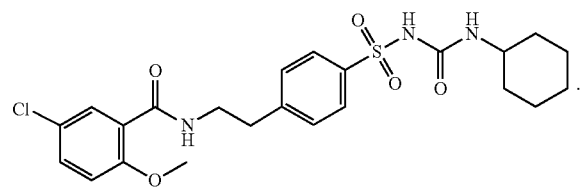 [SMILES: COc1ccc(Cl)cc1C(=O)NCCc1ccc(S(=O)(=O)NC(=O)NC2CCCCC2)cc1]

Neonatal cirrhosis is a severe disease that can be idiopathic or caused by infections, extrahepatic biliary atresia, drugs and toxins, cystic fibrosis, or alpha-1 antitrypsin deficiency (ATD).

Liver disease caused by ATD has a peak age of onset from 50-65 years of age, with particularly rare or severe forms of the disease starting in infancy, childhood, or adolescence. A single alteration in the alpha-1 antitrypsin protein (referred to as ATZ) causes the protein to misfold and accumulate in cells. Accumulation of ATZ in liver cells is sufficient to cause proteotoxicity and liver damage. The presence of liver damage implies that the accumulation of ATZ has exceeded the capacities of the cell to degrade it or adapt to it (e.g., the cell is not performing sufficient proteostasis or autophagy).

Liver cells in patients with ATD exhibit significant pathology, as can be observed by immunohistology (see e.g., FIG. 1). The ATD liver cells show significant accumulation of ATZ aggregates compared to normal liver cells.

Figure 2:
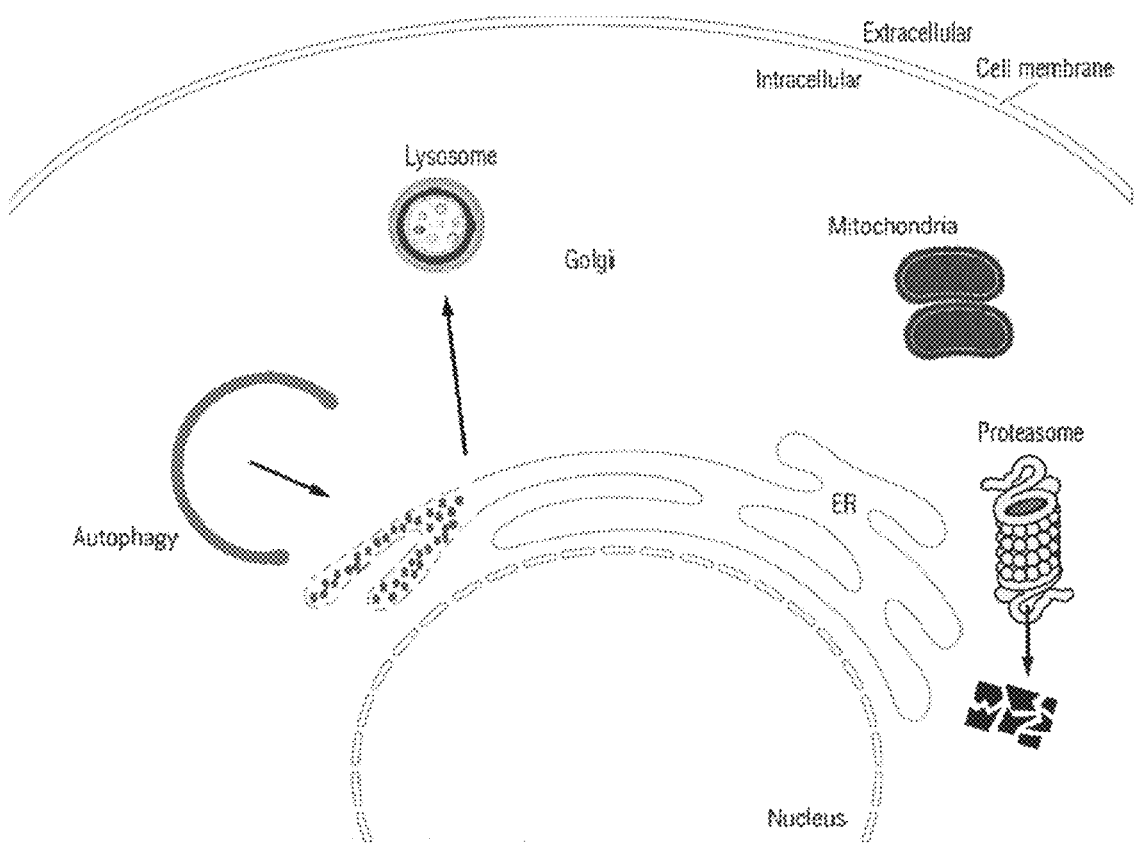
FIG. 2 is a schematic depicting the autophagy process.

Normally, the autophagosome is responsible for pinching off protein aggregates within the endoplasmic reticulum so that they can be broken down (see e.g., FIG. 2).

Figure 3:
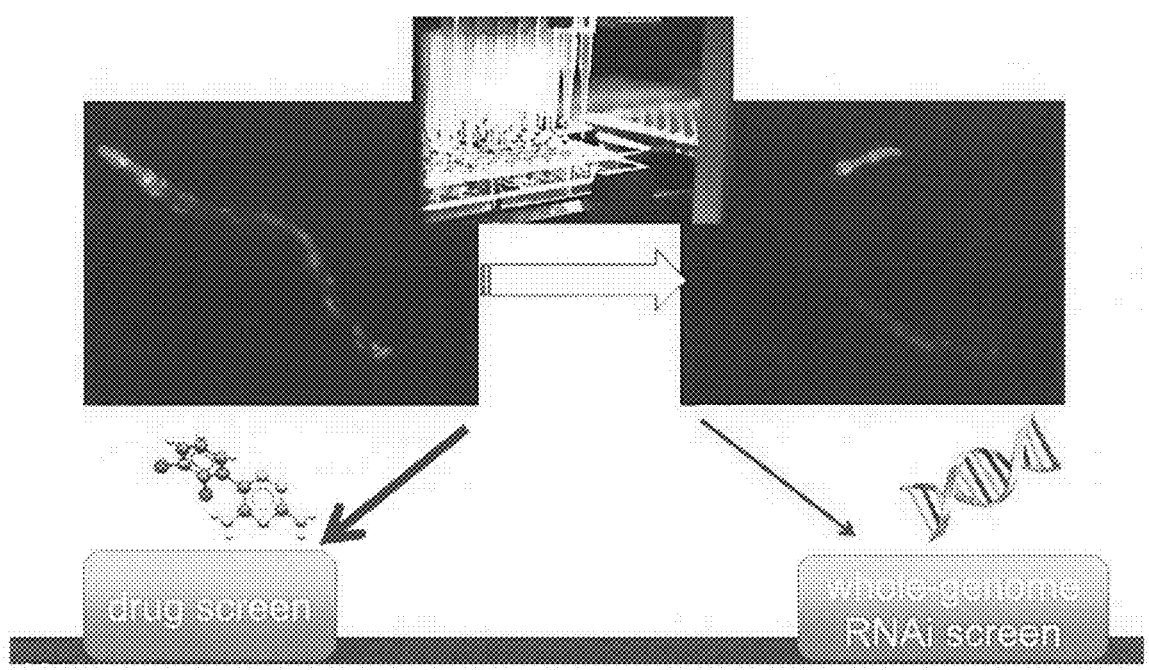
FIG. 3 is a schematic depicting a screening method to identify drugs for treatment of ATD in a transgenic C. elegans model.

Currently, liver transplantation is the only available treatment for ATD, and new drugs to treat ATD are needed. A transgenic model in *C. elegans* (e.g., 'Z worm') expressing ATZ tagged with green fluorescent protein (GFP) was created to model ATD and facilitate drug discovery (see e.g., FIG. 3). The ATD *C. elegans* model was determined to recapitulate the pathologic characteristics of the human disease and could be adapted to a platform for high-throughput drug and genetic screening.

Glibenclamide was identified using a systems pharmacology approach following a whole genome RNAi screen using the *C. elegans* model. More specifically, an automated, high-throughput RNAi screening was utilized to identify genes that modify the intracellular accumulation of ATZ and a novel computational pipeline was developed to make high confidence predictions on repurposable drugs. This approach identified glibenclamide (GB) (see e.g., Wang et al. 2019 PLOS ONE 14 (1): e0209748).

GB is an FDA-approved drug for the treatment of type II diabetes. The drug is known to increase insulin secretion through action on the sulfonylurea receptor, SUR1. It was discovered that administering GB to the ATD *C. elegans* model resulted in reduced accumulation of misfolded, aggregated ATZ and that this effect was mediated by enhanced autophagy. In other words, GB was found to be an autophagy enhancing agent.

Figure 4:
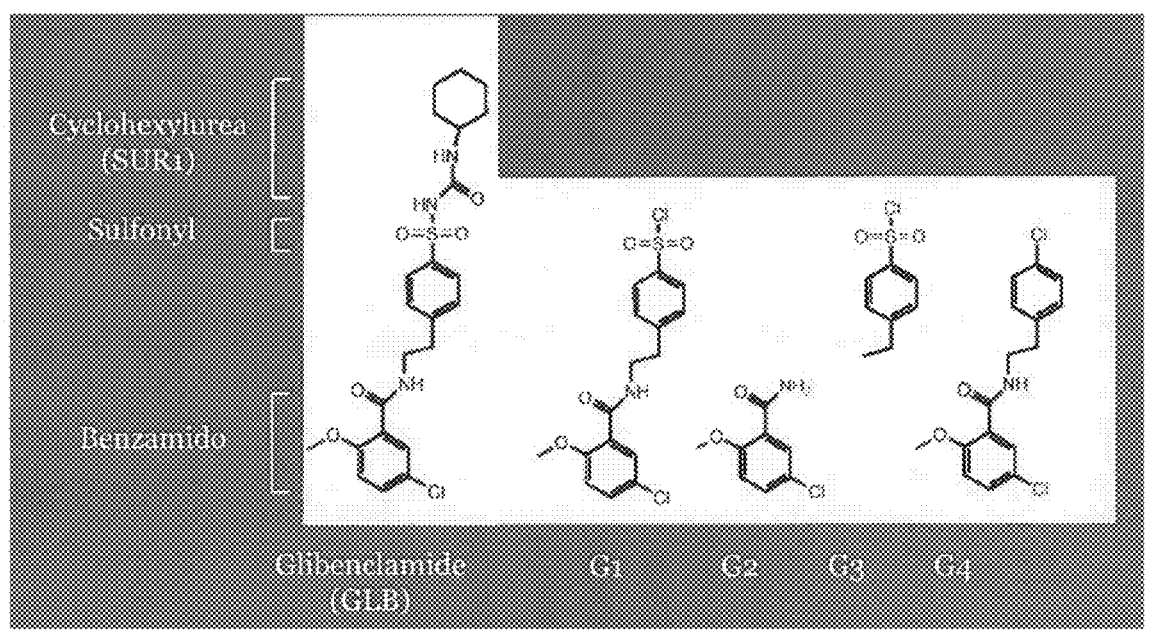
FIG. 4 depicts the glibenclamide/glyburide (GB), G1, G2, G3, and G4 structures.

The structure of GB comprises a cyclohexylurea (SUR1), a sulfonyl, and a benzamido. Multiple analogs of GB were created, including G1, G2, G3, and G4 (see e.g., FIG. 4).

Figure 5A:
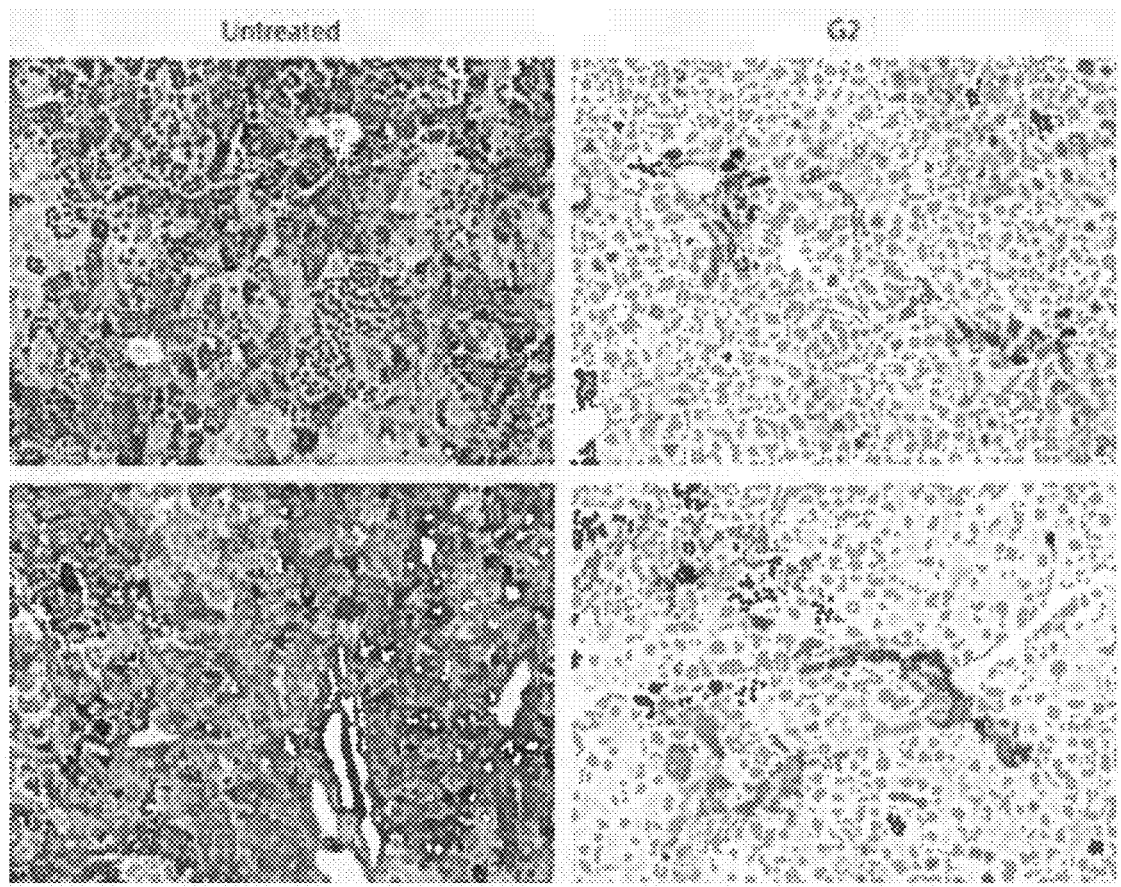
Figure 6A:
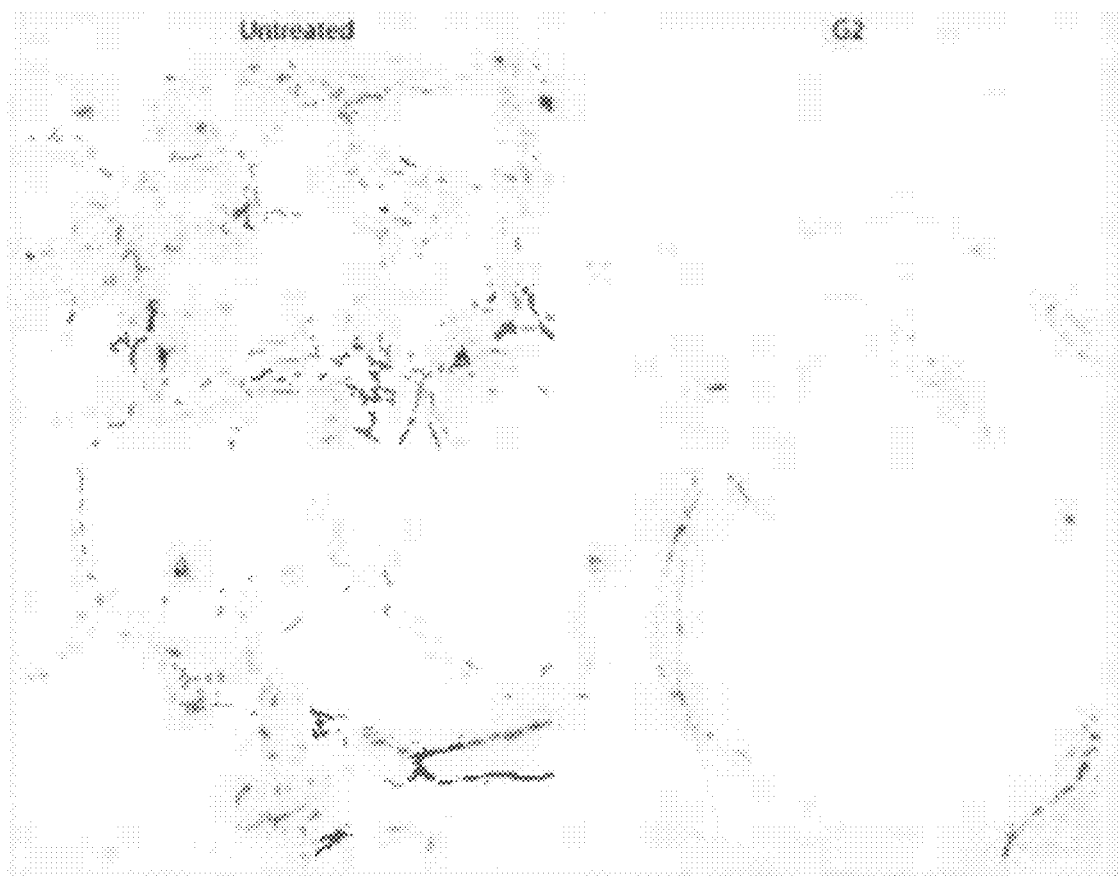
FIG. 6A-FIG. 6B shows (A) Sirius Red staining of liver tissue in an ATD mouse model either untreated or treated with G2 and (B) quantification of fibrosis in the treated and untreated liver tissue. Mice treated with G2 showed reduced liver fibrosis.
Figure 6B:
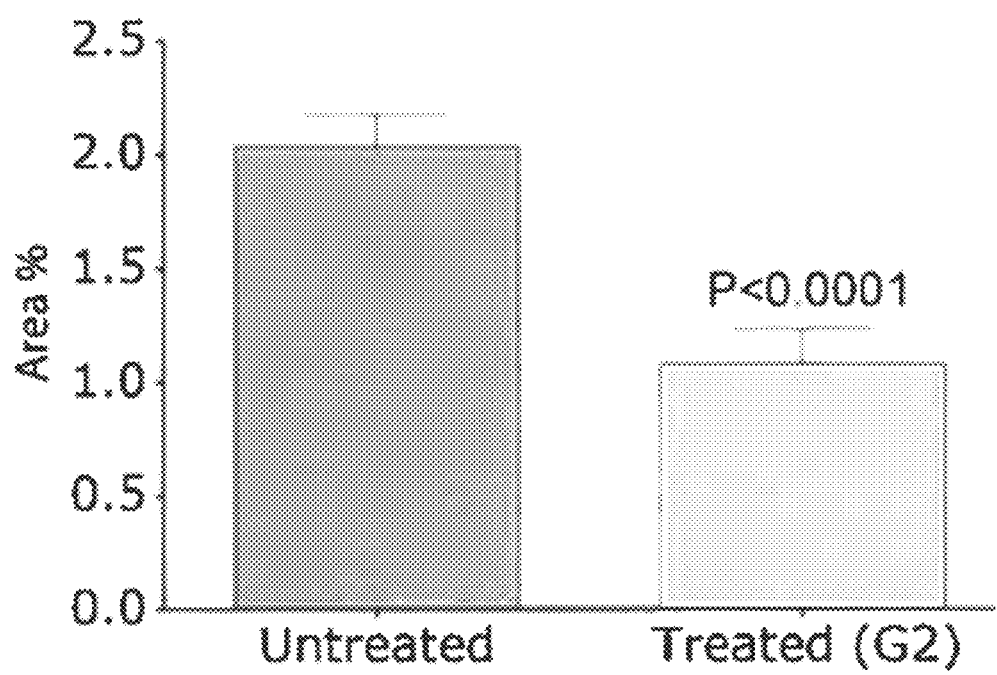

One of the GB analogs, G2, was tested on a mouse model of ATD (PiZ mouse). Administration of G2 to the ATD mouse model resulted in significant reduction of hepatic ATZ load (see e.g., FIG. 5A and FIG. 5B) and liver fibrosis (see e.g., FIG. 6A and FIG. 6B).

(G2).

Figure 7:
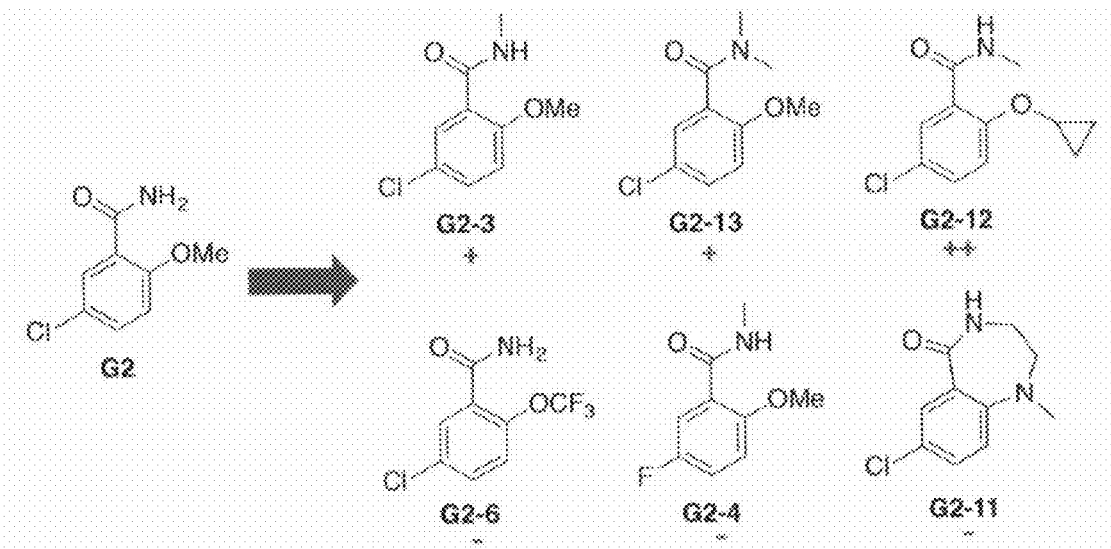
FIG. 7 depicts the structures of G2 and G2 structural analogs, G2-3, G2-4, G2-5, G2-11, G2-12, and G2-13.

The potency of G2 can be improved by modulating the amide nitrogen and methoxy functional groups to generate structural analogs such as G2-3, G2-4, G2-6, G2-11, G2-12, and G2-13 (see e.g., FIG. 7).

G2-3, G2-12, and G2-13 were found to be active.

In conclusion, G2 was found to reverse liver damage in a mouse model of ATD. The G2 compound enhances autophagy without affecting insulin secretion and is derived from a drug with an acceptable safety profile. Therefore, G2 could represent a lead candidate for treatment and prevention of liver disease in ATD or age-dependent degenerative diseases.

Example 2: G2-19 Reduces Liver Fibrosis and ATZ Aggregation in Alpha1-Antitrypsin Deficiency (ATD) and Improves Neuronal Survival In Huntington'S Disease This example describes a method of reducing liver fibrosis and ATZ protein aggregation in mouse and *C. elegans* models of ATD comprising administration of G2-19. This example also describes the improvement of neuronal survival in neurons derived from patients with Huntington's disease (HD) upon G2-19 treatment. A compound is considered to have positive activity if it was shown to have any activity. Some compounds are more active than others, but this has not yet been quantified.

Materials and Methods

Cell Line and Drug Treatment

HTO/Z is a human epidermal HeLa cell line (Clontech #631156) with doxycycline (dox)-regulated expression of ATZ mutant protein, as previously described. For experiments with G2 analogs, Tet-off inducible cell lines were cultured in absence of doxycycline for at least 12 days to ensure expression of alpha-1 trypsin or its variants. The cells were then sub-cultured into separate monolayers in fresh complete growth medium and incubated for 48 hours in the absence or presence of G2 analog. The structures of the analogs tested are shown in TABLE 1, among others. TABLE 1 shows the structures of G2 and G2 analogs. All compounds available commercially were purchased except for G2-22, which was synthesized with routine chemistry.

Some of these structures are known substances reported in the literature or commercial databases. Except for G2-22, the compounds were either purchased commercially or synthesized with routine chemical procedures (see below for G2-22). In each case, the analogs were prepared as a stock solution in DMSO at 50 mM.

Preparation of G2-22

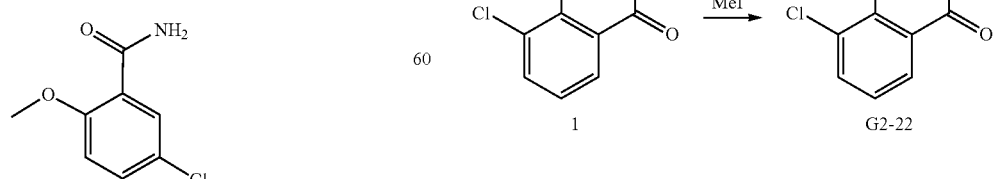

Methyl iodide (0.15 mmol) and cesium carbonate (0.15 mmol) were added to a solution of 5-chloro-isoquinolinone 1 (CAS No. 21188-73-6; 0.180 mg; 1 mmol) in dimethylformamide (1 mL). The reaction mixture was heated to 50° C. in an oil bath for 3 hours. The reaction mixture was cooled to ambient temperature and then was diluted with ethyl acetate (EtOAc; 5 mL). The organic layer was washed with water (2×10 mL), dried over anhydrous sodium sulfate, and filtered. The solvent was removed under reduced pressure. The resulting residue was purified by column chromatography (silica gel, 80:20 petroleum ether/EtOAc) to give the N-methyl-5-chloro-isoquinolinone (G2-22) as a white solid (85% yield). MS: m/z=194.0 (M+H)$^+$. 1H NMR: 400 MHZ CDCl$_3$δ: 8.35 (d, 1H), 7.67 (d, 1H), 7.35 (t, 1H), 7.15 (d, 1H), 6.82 (d, 1H), 3.61 (s, 3H).

Transgenic Mice

The PiZ mouse model has been described previously (Hidvegi 2010 Science 329 (5988): 229-232). For experiments involving drug administration in mice in vivo, doses of 5-50 mg/kg/day for the G2 analog were given for 3 weeks, and then liver histological and biochemical characteristics were assessed exactly as previously described (Hidvegi 2005J Biol Chem 280 (47): 39002-39015). Each experimental group contained 4-6 four- to six-month old male mice randomly chosen from littermates. G2 analogs were delivered by oral gavage. Control mice were littermates given DMSO by gavage. The outcome was determined by evaluating 1) the hepatic ATZ load by immunoblotting with anti-AT, immunostaining with PAS/D; 2) hepatic fibrosis using Sirius Red staining; 3) autophagy by immunoblotting with anti-LC3 and anti-p62, and imaging for GFP+autophagosomes; 4) monitoring blood glucose levels by glucometer and blood insulin levels by ELISA Wide Range Assay (CrystalChem). For immunostaining, liver samples were fixed in 10% Formalin, followed by staining with PAS after diastase and Sirius Red using standard techniques. Quantitative evaluation of immunostaining and histochemical staining was carried out by a member of the team that was blinded to group allocation. Blood glucose and insulin levels were quantified as previously described (Wang 2019 PLOS One 14: e0209748).

Immunoblots

Cells were lysed in NP40 buffer and then separated into insoluble and soluble fractions according to a previously established technique. Samples were subjected to immunoblot analysis for AT and GAPDH. For immmunoblot analysis to detect AT or GAPDH, cells were lysed in 50 mM Tris-HCl, 150 mM NaCl, 1% NP-40, pH 8.0. Protein concentrations were determined by BCA protein assay (Pierce Biotechnology, Rockford, IL). Samples (10-40 µg) were boiled for 5 min and electrophoresed on a 10% or 16% (LC-3 only) Tris-glycine gel and transferred to PVDF membranes. The membranes were blocked in 5% milk and then incubated overnight at 4° C. with primary antibody for AT (1:1000, Diasorin), LC3 (1:2000, Sigma), p62 (1:1000, Cell signaling, Danvers, MA), ATG5 (1:1000, Cell signaling), mTOR substrate sampler (1:1000 for all antibodies, Cell signaling). Donkey anti-goat Ig (Jackson Labs, Bar Harbor, ME), goat anti-rabbit lg (1:50,000), or goat anti-mouse Ig (1:50,000) were used as secondary antibodies in TBST at RT, 1 hour. Blots were visualized with ECL or West Femto from Pierce. Membranes were re-probed with GAPDH (1:5000, Sigma) as loading control. Insoluble samples were stained with Gel Code Blue as loading control.

For immunoblot analysis of proteins in liver, the liver was snap frozen in liquid nitrogen and stored at −80° C. Liver was homogenized in 50 mM Tris-HCl pH 8.0, 150 mM NaCl, 2 mM KCl, 2 mM MgCl2, 0.5% Triton X-100, 0.5% deoxycholic acid containing 0.1 mM phenylmethylsulfonic acid and Complete protease inhibitor cocktail from Roche. Total protein concentration was measured by BCA assay (Pierce) and followed by western blotting as described previously.

Quantification of ATZ Accumulation in C. Elegans Model of ATD

The C. elegans strain VK1882 (vkls1882 [nhx-2p::sGFP::ATZ; myo-2p::mCherry) was routinely cultured at 20° C. on nematode growth medium plates seeded with E. coli strain OP50. Quantitative analysis of ATZ accumulation was carried out by detection of fluorescence using the Thermofisher CellInsight CX-7 high content imager as previously described. L4 stage animals were placed into wells of 384-well plates (30 per well) containing G2 analogs or an equivalent volume of DMSO. Following incubation at 20° C. for 24 hours, sodium azide was added to a final concentration of 50 µM to anesthetize the animals and then each well was imaged on the CX-7 high content imager for quantification.

Quantification of Cell Death in Human Striatal Neurons

Striatal neurons from Huntington's patient GM 04198 and control 2171WT were prepared as previously described. Cells, at 24 days after induction, were incubated with G2 analog or an equivalent volume of DMSO for 14 days (drug/DMSO added with medium change every 4 days) and then cell death was determined by SytoX assay as previously described.

Results

G2-19 Mediates a Reduction in Cellular ATZ Levels in Mammalian Cell Line Models

Figure 8:
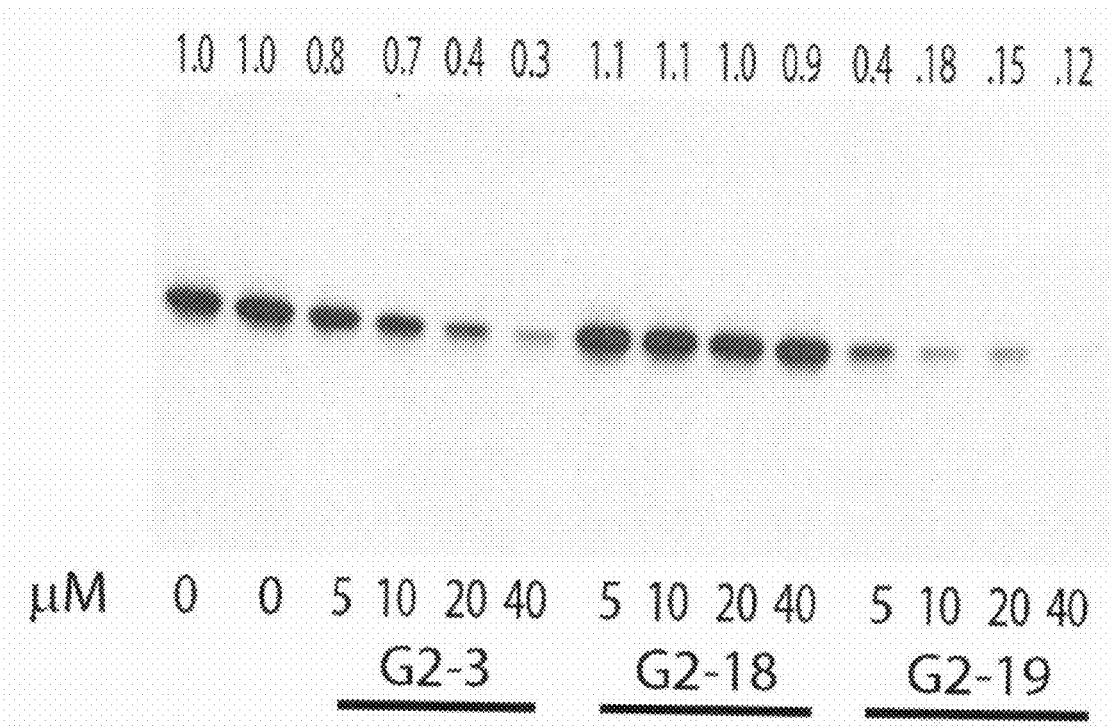
FIG. 8 is an immunoblot showing the effect of G2 analogs on steady state levels of ATZ. ATZ was detected in a HTO/Z cell line in the absence (0) or presence of G2 analogs. Doses in μM are shown at the bottom of the panel. Densitometric results are shown at the top of the panel.

The HTO/Z cell line was incubated for 48 hrs in the absence or presence of several G2 analogs and then cellular ATZ levels were assayed. The results in FIG. 8 show that G2-19 reduces ATZ levels in a dose-dependent manner with a 60% reduction at a dose of 5 µM. G2-19 was more potent than G2-3. G2-18 had no effect.

G2-19 Mediates a Reduction in Cellular ATZ Levels in C. Elegans Model

Figure 9:
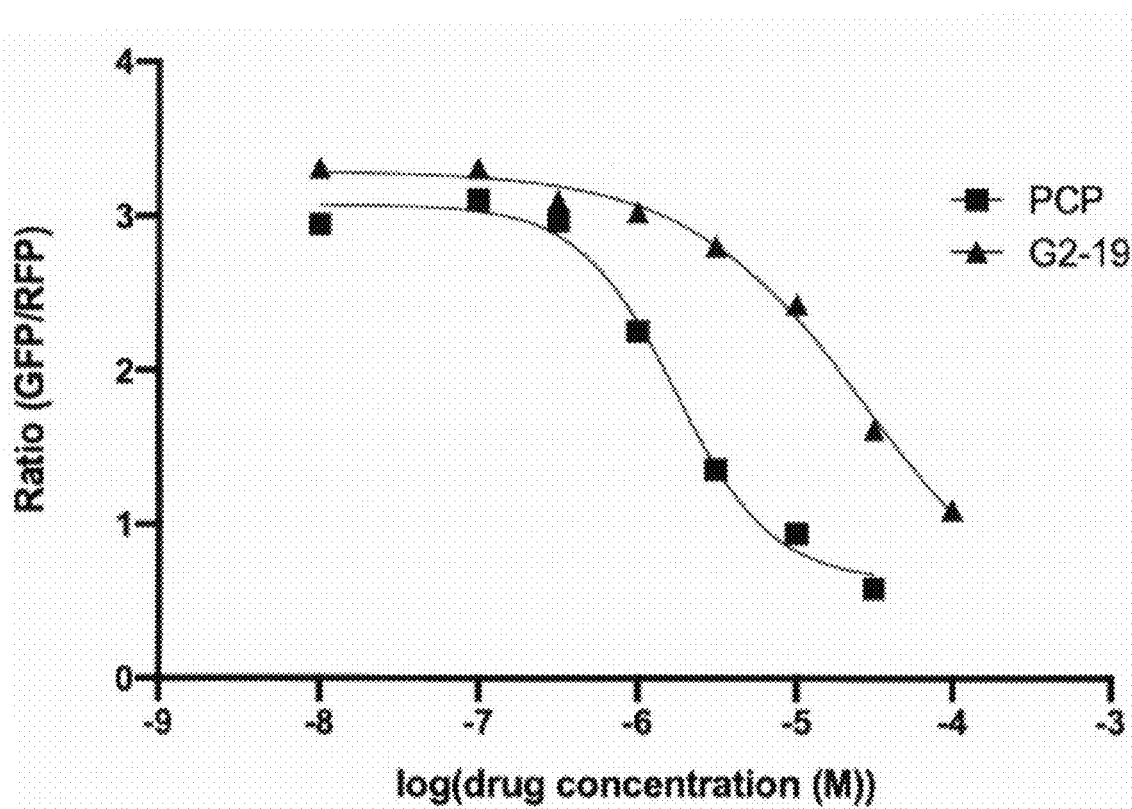
FIG. 9 is a dose response curve showing the effect of G2-19 on cellular load of ATZ (ATZ accumulation) in a C. elegans model of ATD (in Z worm model). Fluorescence intensity is shown on the vertical axis as ratio of GFP/RFP (GFP for ATZ and RFP for head marker as normalization) and drug concentration (log M) is shown on the horizontal axis. The positive control is prochlorperazine (PCP). Animals treated with G2-19 showed reduced accumulation of ATZ aggregation similar to the positive control.

After 24-incubation, G2-19 mediated a dose-dependent decrease in ATZ levels in the intestinal cells of the ATZ worm as exemplified by reduced fluorescence (see e.g., FIG. 9). The reduction reached ~50% at 40 UM. The effect was not as potent as positive control prochlorperazine (PCP).

G2-19 Reduces Hepatic Fibrosis in the PiZ Mouse Model

Figure 10:
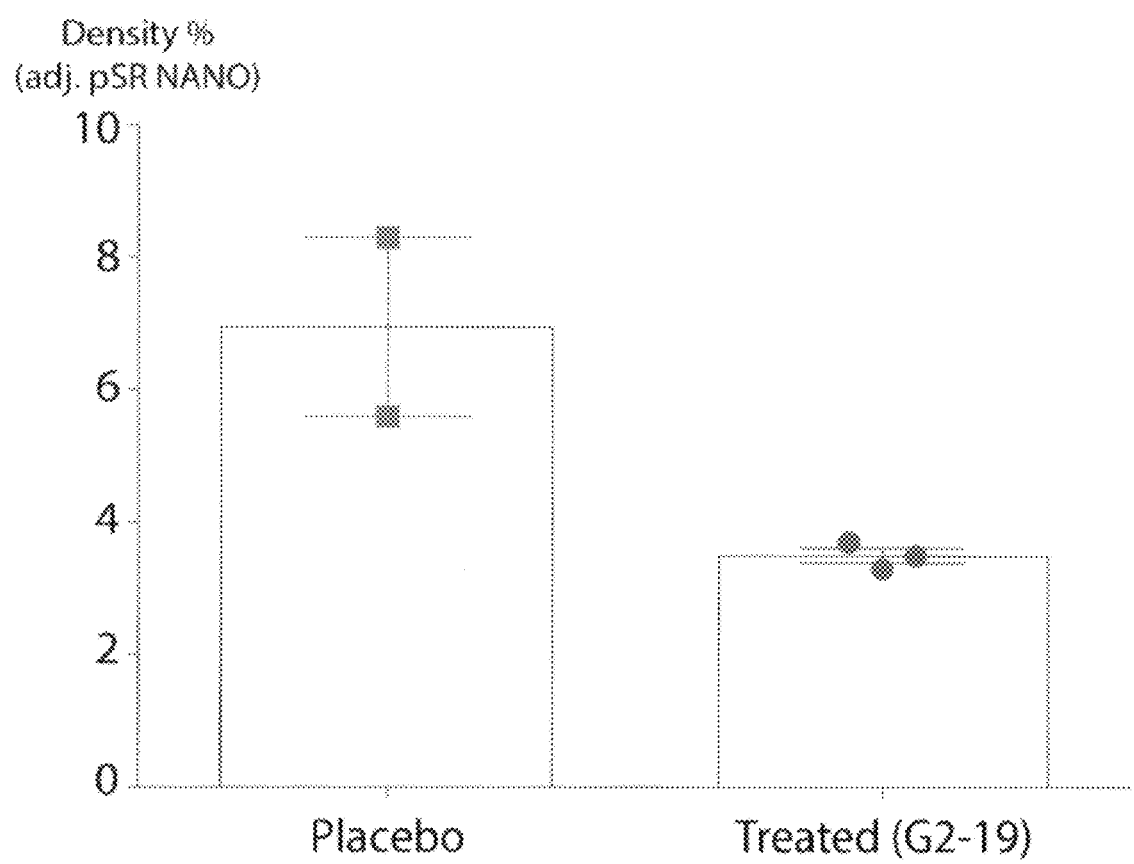
FIG. 10 is a bar chart showing the effect on hepatic fibrosis in a PiZ mouse model treated with G2-19. Sirius Red staining described as density % on the vertical axis is shown for mice given placebo as compared to G2-19. Results are mean+/−SD and the p value is shown at the right. Mice treated with G2-19 showed reduced liver fibrosis.

Sirius Red staining for fibrosis tissue demonstrated a marked and statistically significant decrease after 3 weeks of treatment with G2-19 as compared to placebo (see e.g., FIG. 10).

G2-19 Reduces Cell Death in Neurons Derived from Huntington's Patient

Figure 11:
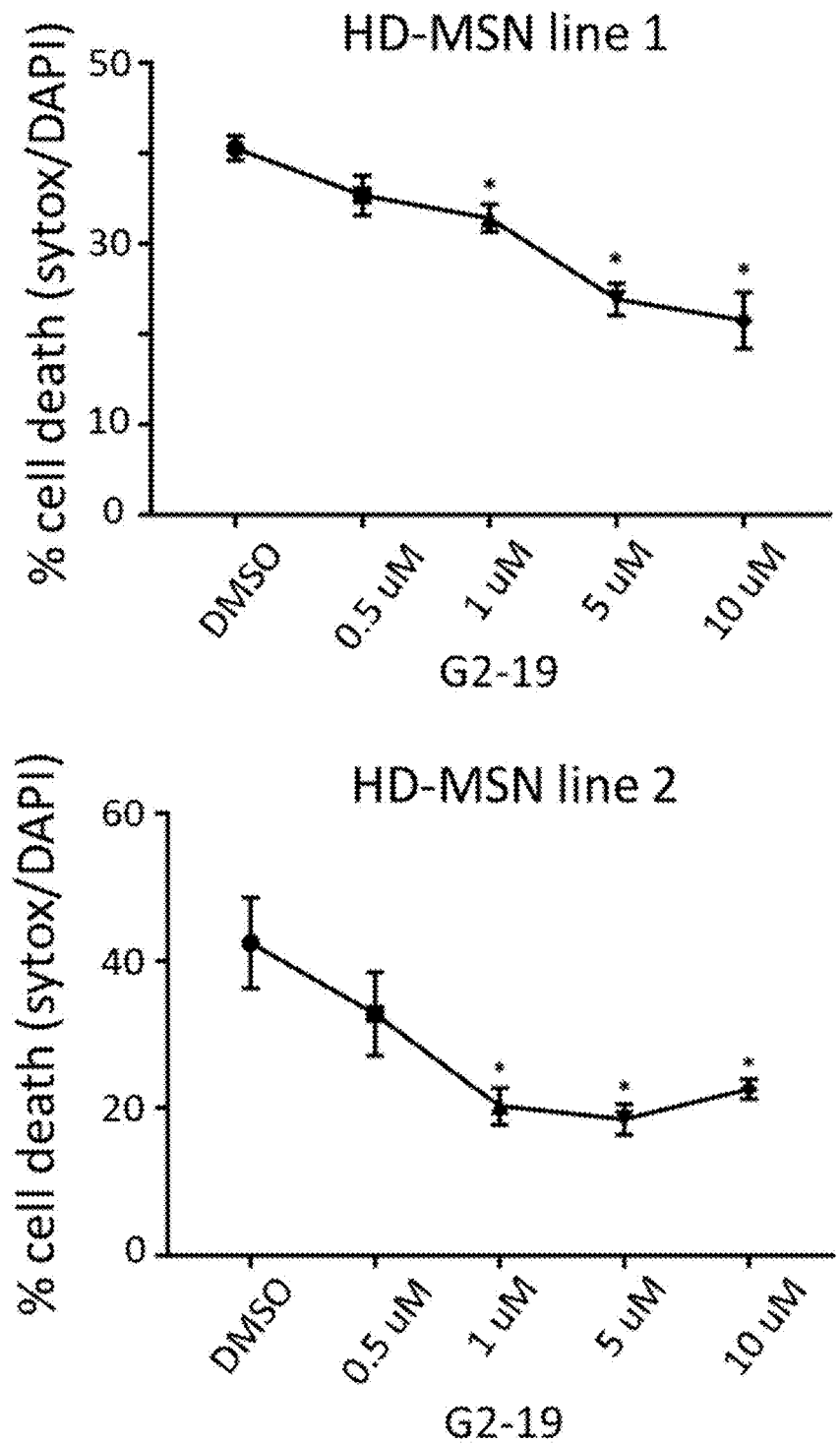
FIG. 11 is a series of charts showing the effect of G2-19 on cell death in striatal neurons from a Huntington's patient. It shows the G2 analog ameliorates cell death in two cell lines of HD-MSNs. Results for control (DMSO) and G2-19 in several doses are shown as percent SYTOX positive cells on the vertical axis. Neurons showed reduced cell death when treated with G2-19. GM 04198 converted MSNs treated with G2 compound, then (PID 40 days) performed Syto X assay.
Figure 12:
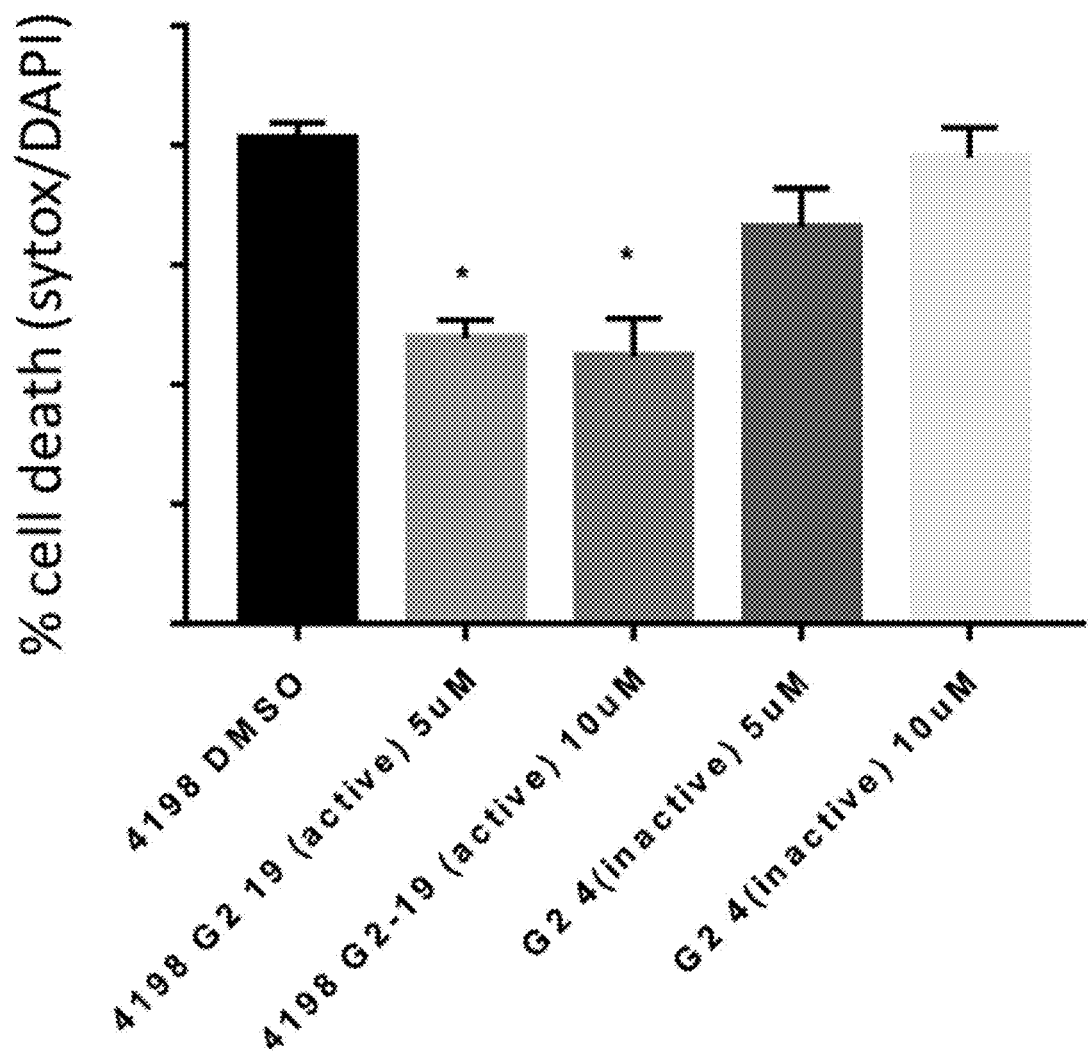
FIG. 12 is a bar chart showing the effect of G2-19 on cell death in striatal neurons from a Huntington's patient (GM 04198) compared to unaffected control (2171 WT). It shows the G2 analog ameliorates cell death in HD-MSNs. Results for control (DMSO) and G2-19 at doses of 5 and 10 μM are shown as percent SYTOX positive cells on the vertical axis. Neurons from patients with Huntington's disease showed reduced cell death when treated with G2-19. No difference was observed in wild-type neurons (data not shown).
Figure 13:
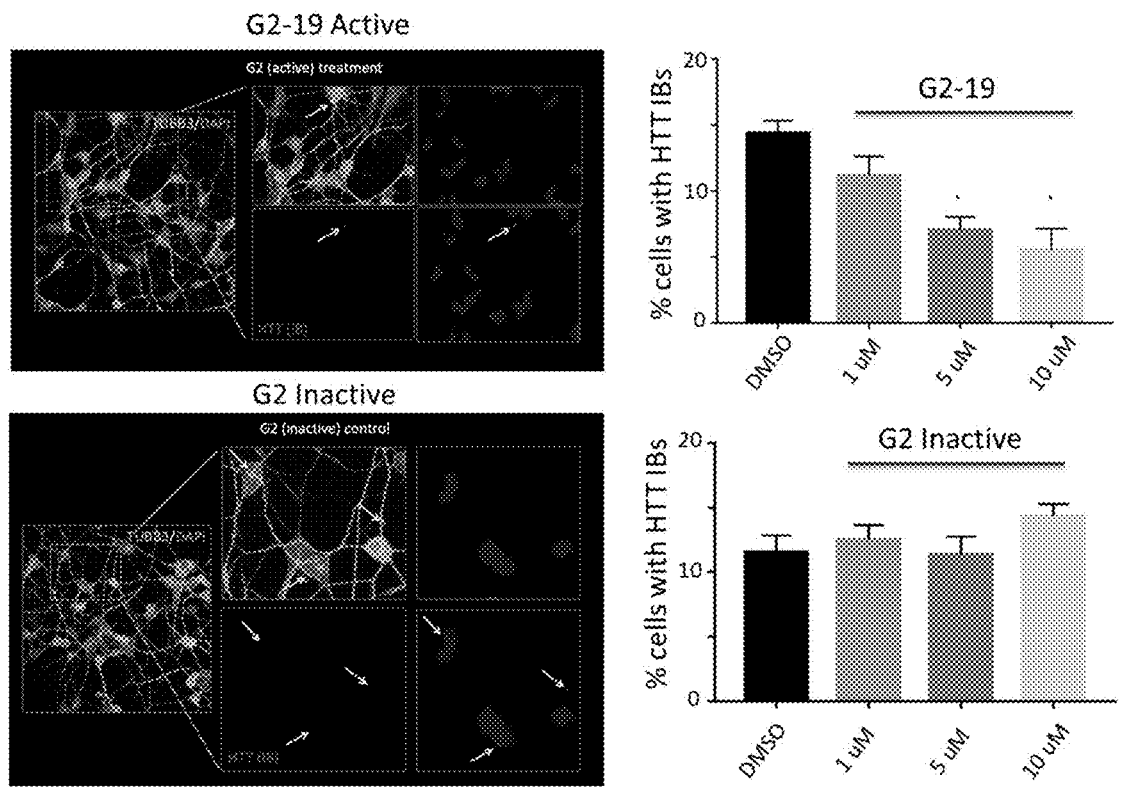
FIG. 13 is a series of images and graphs showing G2-19 lowers HTT inclusion body (IB) in HD-MSNs in contrast to the inactive form.

In FIG. 11, the results show that G2-19 reduces cell death in neurons derived from a Huntington's disease patient. The effect is dose-dependent between 0.5 and 10 µM. In a second experiment, shown in FIG. 12, G2-19 reduced neuronal death in neurons from the patient with Huntington's disease at doses of 5 and 10 µM but had no effect on neurons from the control individual (data not shown). FIG. 13 shows that G2-19 lowers HTT inclusion body (IB) in HD-MSNs compared to the inactive form.

G2-218 and G2-237 Reduce ATZ Levels

Figure 14:
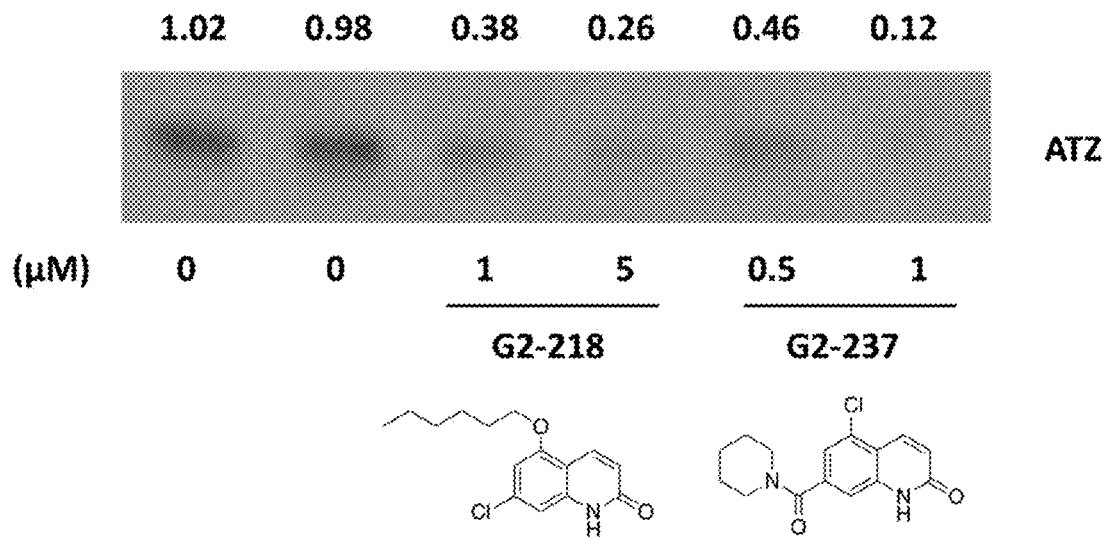
FIG. 14 is an immunoblot showing the effect of G2 analogs (G2-218 and G2-237) on steady state levels of ATZ. ATZ was detected in a HTO/Z cell line in the absence (0) or presence of G2 analogs. Doses in UM are shown at the bottom of the panel. Densitometric results are shown at the top of the panel.

The results in FIG. 14 show two G2 analogs, G2-218 and G2-237, reduce ATZ levels in a dose-dependent manner.

DISCUSSION

These results show that the G2-19 analog mediates reduced cellular load of ATZ in a mammalian cell line model as well as in animal models, including a *C. elegans* (Z worm) and mouse (PiZ mouse). In the mouse model, treatment with the analog reduced the hepatic proteotoxic effect of ATZ accumulation as evidenced by the reduction in hepatic fibrosis. Last, this analog specifically reduced cell death in neurons derived from a patient with Huntington's disease. This means that the drug influences the cellular fate of 2 entirely different misfolded proteins. ATZ is a mutant secretory protein that accumulates in the endoplasmic reticulum of liver cells and huntingtin is a mutant poly-Q protein that accumulates in the cytoplasm of neurons. Because it is known that the parent compound GB acts by enhancing autophagic degradation of ATZ, it is presently thought that the effects of the G2-19 analog on ATZ and huntingtin are likely due to autophagy enhancer properties. Because the decline in autophagy has been experimentally linked with age-dependent degeneration, it is presently thought that G2-19 and related analogs have potential for therapeutic intervention in a variety of age-dependent degenerative diseases.

TABLE 1

Exemplary structures of G2 and G2 analogs and activity, where applicable.

| Structure | Name | Ref No. | Activity |
|---|---|---|---|
|  | 5-chloro-2-methoxybenzamide (CAS Number 23068-80-6) | G2 | Active |
|  | 5-chloro-2-methoxy-N-methylbenzamide (CAS Number 148787-20-6) | G2-3 | Active |
|  | 5-fluoro-2-methoxy-N-methylbenzamide | G2-4 | Inactive |
|  | 5-fluoro-N-isopropyl-2-methoxybenzamide | G2-5 | Not yet tested |
|  | 5-chloro-2-(trifluoromethoxy)benzamide | G2-6 | Inactive |
|  | 5-chloro-N-methyl-2-(trifluoromethoxy)benzamide | G2-7 | Not yet tested |

TABLE 1-continued

Exemplary structures of G2 and G2 analogs and activity, where applicable.

| Structure | Name | Ref No. | Activity |
|---|---|---|---|
| | N-methyl-2-(trifluoromethoxy)benzamide | G2-8 | Not yet tested |
| | 7-chloro-3,4-dihydroisoquinolin-1(2H)-one | G2-9 | Not yet tested |
| | 8-chloro-2,3,4,5-tetrahydro-1H-benzo[c]azepin-1-one | G2-10 | Not yet tested |
| | 7-chloro-1-methyl-1,2,3,4-tetrahydro-5H-benzo[e][1,4]diazepin-5-one | G2-11 | Inactive |
| | 5-chloro-2-cyclopropoxy-N-methylbenzamide (CAS Number 1243282-27-0) | G2-12 | Active |
| | 5-chloro-2-((1-cyclopentylpiperidin-4-yl)oxy)-N-methylbenzamide | G2-12-2 | Inactive |
| | 2-(benzyloxy)-5-chloro-N-methylbenzamide | G2-12-3 | Inactive |

TABLE 1-continued

Exemplary structures of G2 and G2 analogs and activity, where applicable.

| Structure | Name | Ref No. | Activity |
|---|---|---|---|
|  | 5-chloro-2-methoxy-N,N-dimethylbenzamide (CAS Number 247163-54-8) | G2-13 | Active |
|  | 5-chloro-N-isobutyl-2-methoxybenzamide | G2-14 | Inactive |
|  | 5-chloro-N-(4-hydroxybutyl)-2-methoxybenzamide | G2-15 | Inactive |
|  | 5-chloro-2-(4-chlorophenoxy)-N-methylbenzamide | G2-16 | Inactive |
|  | 5-chloro-2-(isopentyloxy)-N-methylbenzamide | G2-17 | Inactive |
|  | 2-(4-chloro-2-methoxyphenyl)-4,5-dihydro-1H-imidazole (CAS Number 1379300-27-2) | G2-18 | Inactive |
|  | 6-chloro-2-methylisoquinolin-1(2H)-one (CAS Number 1417639-65-6) | G2-19 | Active (Highly Active) |
|  | 5-chloro-2-methylisoquinolin-1(2H)-one (new composition; No CAS number) | G2-22 | Active |

TABLE 1-continued

Exemplary structures of G2 and G2 analogs and activity, where applicable.

| Structure | Name | Ref No. | Activity |
|---|---|---|---|
|  | 7-chloro-2-methylisoquinolin-1(2H)-one | G2-23 | Inactive |
|  | 8-chloro-2-methylisoquinolin-1(2H)-one | G2-24 | Inactive |
|  | 6-chloroisoquinolin-1(2H)-one (CAS Number 131002-09-0) | G2-25 | Active |
|  | 6-chloro-2-methyl-3,4-dihydroisoquinolin-1(2H)-one | G2-26 | Inactive |
|  | 7-chloro-3-methylquinazolin-4(3H)-one | G2-27 | Inactive |
|  | 5-chloro-2-methylisoindolin-1-one (CAS Number 1378506-88-7) | G2-28 | Active |
|  | 2-methyl-6-(methylsulfonyl)isoquinolin-1(2H)-one | G2-29 | Active |
|  | 6-methoxy-2-methylisoquinolin-1(2H)-one | G2-30 | Active |

TABLE 1-continued

Exemplary structures of G2 and G2 analogs and activity, where applicable.

| Structure | Name | Ref No. | Activity |
|---|---|---|---|
| (2-methyl-1-oxo-1,2-dihydroisoquinoline-6-carbonitrile structure) | 2-methyl-1-oxo-1,2-dihydroisoquinoline-6-carbonitrile | G2-31 | Inactive |
| (6-amino-2-methylisoquinolin-1(2H)-one structure) | 6-amino-2-methylisoquinolin-1(2H)-one | G2-32 | Not yet tested |
| (N-(2-methyl-1-oxo-1,2-dihydroisoquinolin-6-yl)methanesulfonamide structure) | N-(2-methyl-1-oxo-1,2-dihydroisoquinolin-6-yl)methanesulfonamide | G2-33 | Not yet tested |
| (2-methylisoquinolin-1(2H)-one structure) | 2-methylisoquinolin-1(2H)-one | G2-34 | Inactive |
| (6-chloro-1-methylquinolin-2(1H)-one structure) | 6-chloro-1-methylquinolin-2(1H)-one | G2-37 | Active |
| (6-chloro-2,4-dimethylisoquinolin-1(2H)-one structure) | 6-chloro-2,4-dimethylisoquinolin-1(2H)-one | G2-38 | Inactive |
| (2-methyl-6-(pyridin-2-yl)isoquinolin-1(2H)-one structure) | 2-methyl-6-(pyridin-2-yl)isoquinolin-1(2H)-one | G2-39 | Inactive |
| (3-chloro-2-methoxy-N-methylbenzamide structure) | 3-chloro-2-methoxy-N-methylbenzamide | G2-40 | Inactive |

TABLE 1-continued

Exemplary structures of G2 and G2 analogs and activity, where applicable.

| Structure | Name | Ref No. | Activity |
|---|---|---|---|
|  | 2-methyl-6-phenylisoquinolin-1(2H)-one | G2-41 | Active |
|  | 2-methyl-6-(pyridin-4-yl)isoquinolin-1(2H)-one | G2-42 | Active |
|  | 2-methyl-6-(pyridin-3-yl)isoquinolin-1(2H)-one | G2-43 | Inactive |
|  | 6-(dimethylamino)-2-methylisoquinolin-1(2H)-one | G2-44 | Inactive |
|  | 2-methyl-6-(pyrrolidin-1-yl)isoquinolin-1(2H)-one | G2-45 | Active |
|  | 2-methyl-6-(2-oxa-6-azaspiro[3.3]heptan-6-yl)isoquinolin- | G2-46 | Inactive |

TABLE 1-continued

Exemplary structures of G2 and G2 analogs and activity, where applicable.

| Structure | Name | Ref No. | Activity |
|---|---|---|---|
| | 1(2H)-one 2-methyl-6-(phenylamino)isoquinolin-1(2H)-one | G2-47 | Inactive |
| | 2-methyl-6-(methyl(phenyl)amino)isoquinolin-1(2H)-one | G2-48 | Active |
| | 2-methyl-6-(pyridin-2-ylamino)isoquinolin-1(2H)-one | G2-49 | Inactive |
| | 6-chloro-2,3-dimethylisoquinolin-1(2H)-one | G2-50 | |
| | 6-chloro-2-methylphthalazin-1(2H)-one | G2-51 | Active |
| | 6-chloro-2-ethylisoquinolin-1(2H)-one | G2-52 | Inactive |
| | 6-chloro-2-phenylisoquinolin-1(2H)-one | G2-53 | Inactive |

TABLE 1-continued

Exemplary structures of G2 and G2 analogs and activity, where applicable.

| Structure | Name | Ref No. | Activity |
| --- | --- | --- | --- |
|  | 7-chloro-1-methylquinolin-2(1H)-one | G2-54 | Active (Highly Active) |
|  | 4-chloro-2-methoxy-N-methylbenzamide | G2-55 | Inactive |
|  | 6-chloro-1-methylquinolin-2(1H)-one | G2-58 | Inactive |
|  | 2-methyl-6-(pyrimidin-2-yl)isoquinolin-1(2H)-one | G2-59 | Inactive |
|  | 6-butyl-2-methylisoquinolin-1(2H)-one | G2-60 | Inactive |
|  | 2-methyl-6-(piperidin-1-yl)isoquinolin-1(2H)-one | G2-61 | Inactive |

TABLE 1-continued

Exemplary structures of G2 and G2 analogs and activity, where applicable.

| Structure | Name | Ref No. | Activity |
|---|---|---|---|
| | 2-methyl-6-(4-phenylpiperidin-1-yl)isoquinolin-1(2H)-one | G2-62 | Inactive |
| | 6-(4-chlorophenyl)-2-methylisoquinolin-1(2H)-one | G2-63 | Inactive |
| | 6-(1H-imidazol-4-yl)-2-methylisoquinolin-1(2H)-one | G2-64 | Not yet tested |
| | 2-methyl-6-(1H-pyrazol-5-yl)isoquinolin-1(2H)-one | G2-65 | Inactive |
| | 2-methyl-6-(oxazol-2-yl)isoquinolin-1(2H)-one | G2-66 | Not yet tested |
| | 2-methyl-1-oxo-1,2-dihydroisoquinoline-6-sulfonamide | G2-67 | Inactive |

TABLE 1-continued

Exemplary structures of G2 and G2 analogs and activity, where applicable.

| Structure | Name | Ref No. | Activity |
|---|---|---|---|
| | 6-chloroquinolin-2(1H)-one | G2-68 | Not yet tested |
| | 7-chloroquinolin-2(1H)-one | G2-69 | Active (Most Highly Active)(++) IC50 0.1-1.0 μM |
| | 6-chloro-1-methylquinazolin-2(1H)-one | G2-70 | Not yet tested |
| | 6-chloroquinazolin-2(1H)-one | G2-71 | Inactive |
| | N-(2-methyl-1-oxo-1,2-dihydroisoquinolin-6-yl)benzenesulfonamide | G2-72 | Not yet tested |
| | 1-methyl-6-phenylquinolin-2(1H)-one | G2-76 | Not yet tested |
| | 7-chloro-1-methylquinolin-2(1H)-one | G2-77 | Not yet tested |

TABLE 1-continued

Exemplary structures of G2 and G2 analogs and activity, where applicable.

| Structure | Name | Ref No. | Activity |
|---|---|---|---|
|  | 1-methyl-7-(trifluoromethyl)quinolin-2(1H)-one | G2-80 | Not yet tested |
|  | 7-chloro-1-isobutylquinolin-2(1H)-one | G2-81 | Not yet tested |
|  | 1-methyl-7-phenylquinolin-2(1H)-one | G2-82 | Not yet tested |
|  | 1-methyl-7-(pyridin-3-yl)quinolin-2(1H)-one | G2-83 | Inactive |
|  | 1-methyl-7-(pyridin-2-yl)quinolin-2(1H)-one | G2-84 | Not yet tested |

TABLE 1-continued

Exemplary structures of G2 and G2 analogs and activity, where applicable.

| Structure | Name | Ref No. | Activity |
|---|---|---|---|
| | 1-methyl-7-(pyridin-4-yl)quinolin-2(1H)-one | G2-85 | Not yet tested |
| | 1-methyl-7-(piperidin-1-yl)quinolin-2(1H)-one | G2-89 | Not yet tested |
| | 1-methyl-7-(phenylamino)quinolin-2(1H)-one | G2-90 | Not yet tested |
| | 1-methyl-7-(pyridin-2-ylamino)quinolin-2(1H)-one | G2-91 | Inactive |

TABLE 1-continued

Exemplary structures of G2 and G2 analogs and activity, where applicable.

| Structure | Name | Ref No. | Activity |
|---|---|---|---|
|  | N-(1-methyl-2-oxo-1,2-dihydroquinolin-7-yl)benzenesulfonamide | G2-92 | Not yet tested |
|  | N-methyl-N-(1-methyl-2-oxo-1,2-dihydroquinolin-7-yl)benzenesulfonamide | G2-93 | Not yet tested |
|  | N-(1-methyl-2-oxo-1,2-dihydroquinolin-7-yl)methanesulfonamide | G2-94 | Not yet tested |
|  | N-(1-methyl-2-oxo-1,2-dihydroquinolin-7-yl)-2-phenylacetamide | G2-95 | Not yet tested |

TABLE 1-continued

Exemplary structures of G2 and G2 analogs and activity, where applicable.

| Structure | Name | Ref No. | Activity |
|---|---|---|---|
| | 5,7-dichloroquinolin-2(1H)-one | G2-115 | Active (++) IC50 0.1-1.0 μM |
| | 7-fluoroquinolin-2(1H)-one | G2-124 | Active (+) IC50 1.0-10 μM |
| | 7-cyclopropylquinolin-2(1H)-one | G2-156 | Active (+) IC50 1.0-10 μM |
| | 7-chloro-5-(piperidin-1-yl)quinolin-2(1H)-one | G2-195 | Active (+) IC50 1.0-10 μM |
| | 7-chloro-5-phenylquinolin-2(1H)-one | G2-196 | Active (+) IC50 1.0-10 μM |
| | 7-chloro-5-(pyrimidin-2-yl)quinolin-2(1H)-one | G2-197 | Active (+) IC50 1.0-10 μM |

TABLE 1-continued

Exemplary structures of G2 and G2 analogs and activity, where applicable.

| Structure | Name | Ref No. | Activity |
|---|---|---|---|
| (structure) | 5-chloro-7-(hexyloxy)quinolin-2(1H)-one | G-211 | Active (+) IC50 1.0-10 μM |
| (structure) | 7-chloro-5-(hexyloxy)quinolin-2(1H)-one | G-218 | Active (++) IC50 0.1-1.0 μM |
| (structure) | 5-chloro-7-phenylquinolin-2(1H)-one | G2-233 | Active (+) IC50 1.0-10 μM |
| (structure) | 5-chloro-7-(piperidin-1-yl)quinolin-2(1H)-one | G2-235 | Active (+) IC50 1.0-10 μM |
| (structure) | 5-chloro-7-(piperidine-1-carbonyl)quinolin-2(1H)-one | G-237 | Active (++) IC50 0.1-1.0 μM |

Example 3: Age-Associated Decline in Autophagy Mediated by MIR-29B-3P Plays a Key Role in Neurodegeneration in Huntington'S Disease Patient-Derived Neurons Huntington's disease (HD) is an inherited disorder caused by CAG/polyglutamine expansion mutation in HTT characterized by massive degeneration of striatal medium spiny neurons (MSNs). The CAG repeat size of 40-50 that typifies most of the HD patient population leads to adult-onset clinical symptoms at middle ages. However, the process by which mutant HTT drives the onset of MSN degeneration with aging in patients remains poorly understood. As described herein, MSNs directly reprogrammed from fibroblasts of HD patients were implemented to model pre-symptomatic and symptomatic stages of HD pathology. Reprogrammed MSNs from symptomatic HD patients (HD-MSNs) exhibited a significantly higher level of apoptosis than MSNs from younger, pre-symptomatic patients (pre-HD MSNs). Dissecting the differential cellular state by transcriptome and chromatin accessibility analyses identified downregulated genes and chromatin accessibilities associated with autophagy pathways in HD-MSNs compared to pre-HD-MSNs. Accordingly, HD-MSNs displayed reduced autophagy compared to pre-HD-MSNs. Further, miR-29b-3p, a microRNA upregulated in aged human striatum, was identified as a microRNA associated with increased chromatin accessibility and expression in HD-MSNs compared to pre-HD-MSNs. Importantly, miR-29b-3p was found to be responsible for reduced autophagy and increased MSN death via direct targeting of STAT3. Inhibiting miR-29b-3p or overriding the autophagy deficiency in HD-MSNs by a small molecule G2-115, a glibenclamide analog, shifted the degenerative state of HD-MSNs towards pre-HD MSNs, demonstrating the beneficial effect of autophagy enhancement on HD-MSN degeneration. These findings reveal the intrinsic detriment of autophagic function as one of the determinants of MSN degeneration in HD and suggest potential approaches for enhancing autophagy and resilience of MSNs against neurodegeneration in HD.

Huntington's disease (HD) is an inherited neurodegenerative disorder characterized by clinical symptoms including motor deficits, psychiatric symptoms, and cognitive decline. The HD pathology results from a mutation that expands the polymorphic glutamine (CAG) tract within the HTT gene to more than 36 repeats, where the majority of the HD patients contain the CAG repeat size of 40-50 leading to the adult-onset of clinical symptoms. However, the molecular events that drive the onset of neurodegeneration in HD patients remain unclear. To model the adult-onset pathology of HD, direct neuronal reprogramming was previously employed to generate MSNs using neurogenic microRNAs (miRNAs), miR-9/9* and miR-124 (miR-9/9*-124) and subtype-defining transcription factors CTIP2, DLX1/2, and MYT1L (CDM) by directly converting patient fibroblasts to MSNs. The miRNA-mediated neuronal conversion occurs through miR-9/9*-124 first erasing the fibroblast identity and promoting the neuronal program in sequence through chromatin reconfigurations. Importantly, the age information of the donors stored in the starting fibroblasts propagates to directly converted neurons including the DNA methylation-based epigenetic age clock, and age-associated changes in transcriptome. These properties contrast neurons differentiated from induced pluripotent stem cells (iPSCs) where the induction of pluripotency reverts the cellular age to an embryonic state and neurons differentiated from iPSCs to represent a fetal stage. The age retention allows for recapitulating adult-onset HD hallmarks such as aggregation of mutant HTT (mHTT) and MSN degeneration. Moreover, MSNs derived from HD patients before the clinical onset (Pre-HD-MSNs) displayed significantly lower levels of cell death and DNA damage than MSNs from symptomatic HD patients (HD-MSNs), demonstrating the utility of patient-derived neurons as an experimental platform to dissect cell-intrinsic molecular events underlying MSN degeneration in HD. Here, by comparing the pre-symptomatic and symptomatic stages of HD through direct MSN reprogramming, the mechanisms that differentially dispose patient-derived MSNs to neurodegeneration were investigated at different disease stages and the hypothesis of modifying the resilience of HD-MSNs to neurodegeneration was tested.

Identification of Stage-Associated Gene Modules by Gene Co-Expression Analysis

Figure 15A:
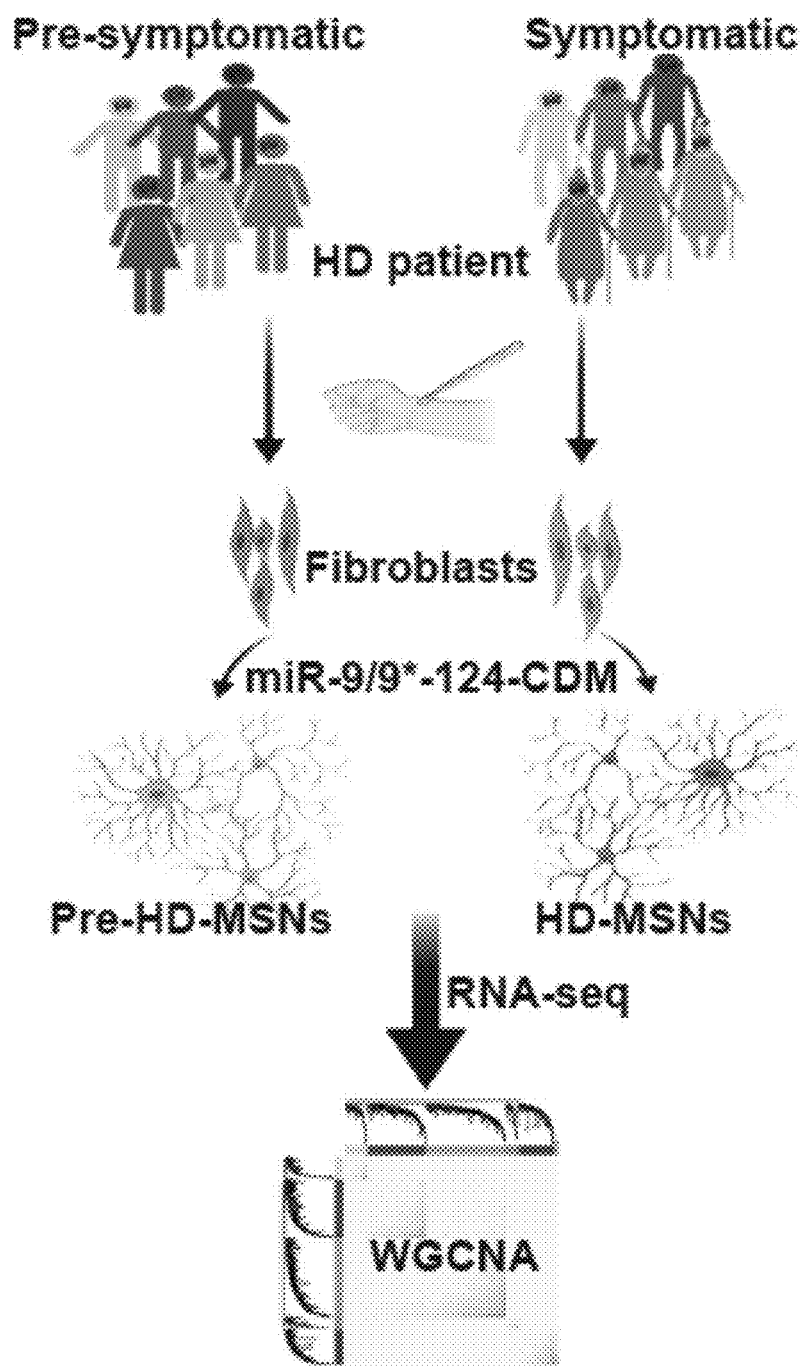
FIG. 15A-FIG. 15H. Identification of disease-relevant mRNA module by weighted gene coexpression network analysis (WGCNA). (A) Experimental scheme for studying genetic network in MSNs reprogrammed from twelve fibroblasts of both symptomatic and pre-symptomatic HD patients by miR-9/9*-124-CDM. (B) Reprogrammed cells immunostained for TUBB3 and MAP2 at PID 21, and TUBB3 and DARPP32 at PID 30. (C) The signed network of protein-coding genes. Modules with positive values indicate increased expression in HD-MSNs; modules with negative values indicate decreased expression in HD-MSNs. The red dotted lines indicate P=0.00001 for multiple comparisons. (D) Coexpression PPI network plot of the brown module. (E, F). Representative images (top) and quantification (bottom) of pre-HD- and HD-MSNs for neuronal apoptosis of four pre-HD-MSNs and three HD-MSNs at PID 26 using Caspase 3/7 reagents (E) and at PID 30 using Annexin V reagents (F) (n=9-12). (G) Representative images (left) and quantification by Fluorescence Microplate (right) of pre-HD- and HD-MSNs at PID 26 for autophagy measurement assayed with CYTO-ID green. (n=9-12). (H) Immunoblot analysis for p62 and GAPDH of three different pre-HD- and three different HD-MSNs at PID26. Normalized intensity (right) was calculated from immunoblot images. The sample size (n) corresponds to the number of biological replicates. Statistical significance was determined using unpaired t-test in FIG. 15E-FIG. 15H; ** p<0.0001, * p<0.001,  p<0.01. Scale bars in FIG. 15B and FIG. 15G: 20 μm.

To first reveal the differential cellular states associated with disease states, MSN-reprogramming was applied to the cohorts of patient fibroblast samples sampled before (pre-HD66 MSNs) or after the clinical onset (HD-MSNs), followed by comparative transcriptome analysis (see e.g., FIG. 15A). Fibroblasts from symptomatic patients ranged from 52 to 71 years of age whereas pre-onset HD fibroblasts were collected 13-17 years before the reported age of HD symptoms ranging from 13 to 44 years of age, all with CAG repeat expansions in 40s (see e.g., FIG. 15A and TABLE 2).

TABLE 2

The list of six pre-symptomatic HD patients and six HD patient fibroblasts.

| Line | Sample ID | | Gender |
| --- | --- | --- | --- |
| GM04831 | Pre-HD.43 | Pre-Onset HD | Male |
| GM04861 | Pre-HD.45 | Pre-Onset HD | Male |
| GM04855 | Pre-HD.47 | Pre-Onset HD | Male |
| GM04717 | Pre-HD.42 | Pre-Onset HD | Female |
| GM04829 | Pre-HD.47b | Pre-Onset HD | Female |
| GM04857 | Pre-HD.40/50 | Pre-Onset HD | Female |
| ND30013 | HD.43 | Post-Onset HD | Male |
| GM04230 | HD.45 | Post-Onset HD | Male |
| GM02147 | HD.1 | Post-Onset HD | Male |
| GM04198 | HD.47 | Post-Onset HD | Female |
| GM02173 | HD.44 | Post-Onset HD | Female |
| ND33947 | HD.40 | Post-Onset HD | Female |

Figure 15B:
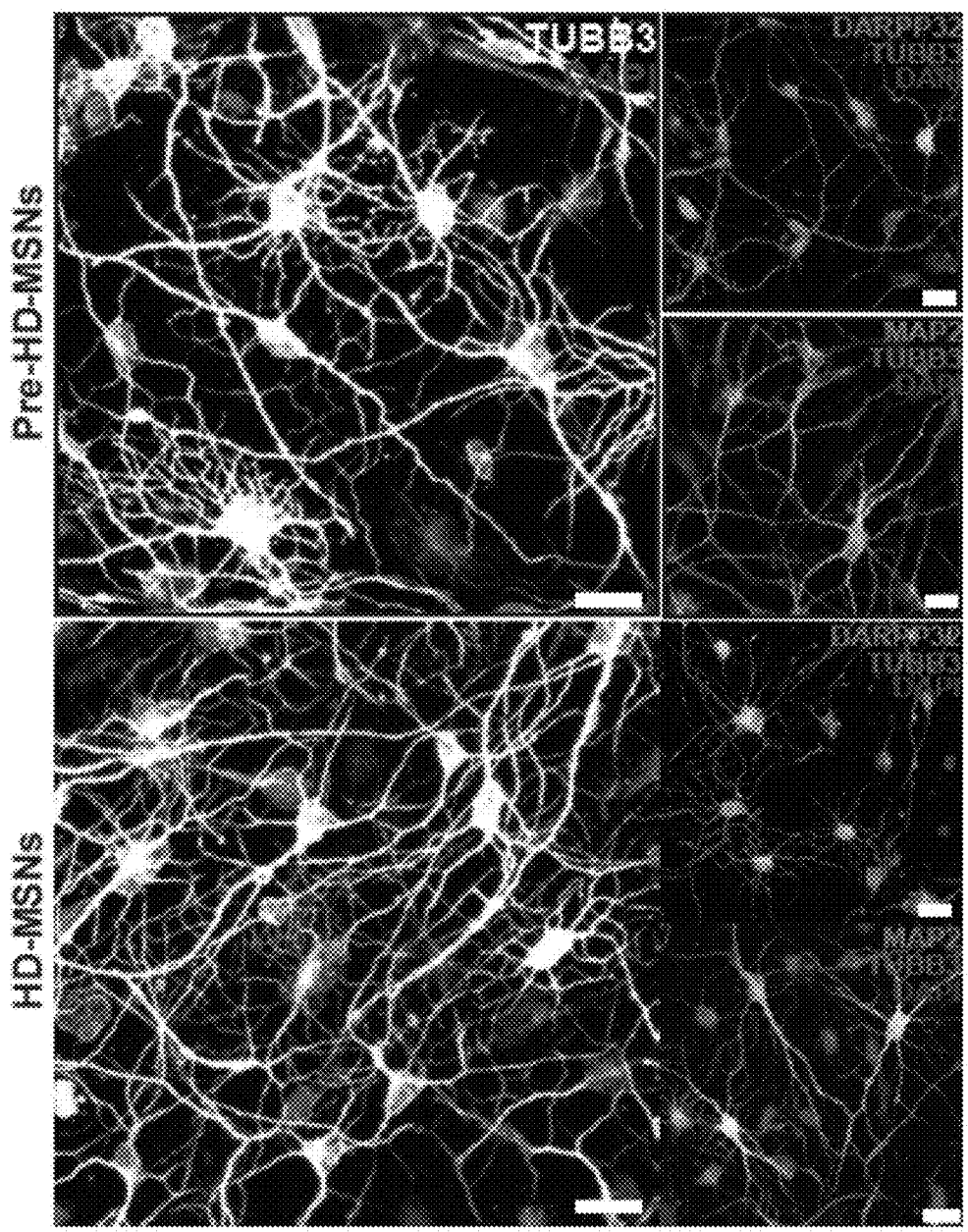
Figure 19A:
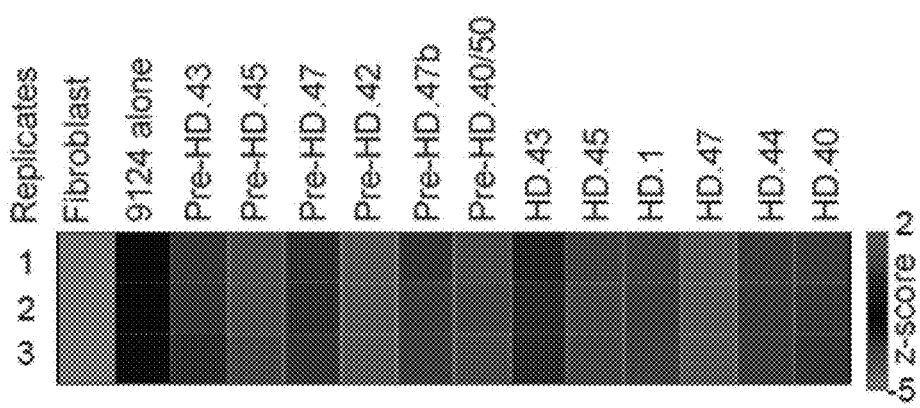
FIG. 19A-FIG. 19H. Genetic networks altered in HD-MSNs by WGCNA. (A) An expression heatmap of DARPP-32 determined by RT-qPCR at PID 21. Pre-HD-MSNs and HD-MSNs significantly expressed the MSN marker DARPP-32 compared to miR-9/9*-124 alone (Dunnett's multiple comparison test, p<0.0001). (B) Principle component analysis of gene expression data for 12 independent samples analyzed at PID 21. (n=3 biological replicates for each of six pre-HD-MSN and six HD-MSN samples). Principal component analysis indicated sample segregation based on the clinical symptoms (pre-HD vs. HD) as well as the sex of sample donors. (C) The average long gene expression (LGE), a transcriptomic feature of neuronal identity, in MSNs directly converted from HD- and pre-HD human adult fibroblasts. The long genes are over 100 kb from transcription start to end. The gray dotted line is the indicator for 100 kb of gene length. (D) An expression heatmap of our selected modules (blue, lightcyan1, brown, and greenyellow) from WGCNA. (E) Related four modules to clinical traits. (F) Gene number in four modules from WGCNA. (G) Enriched pathway of the brown module using 598 genes by GO analysis visualized using REVIGO. The circle diameter reflects the size indicating the frequency of the GO term in the underlying GOA database. (H) Predicted small molecules as an upstream regulator of the brown module by Ingenuity Pathway Analysis.
Figure 19B:
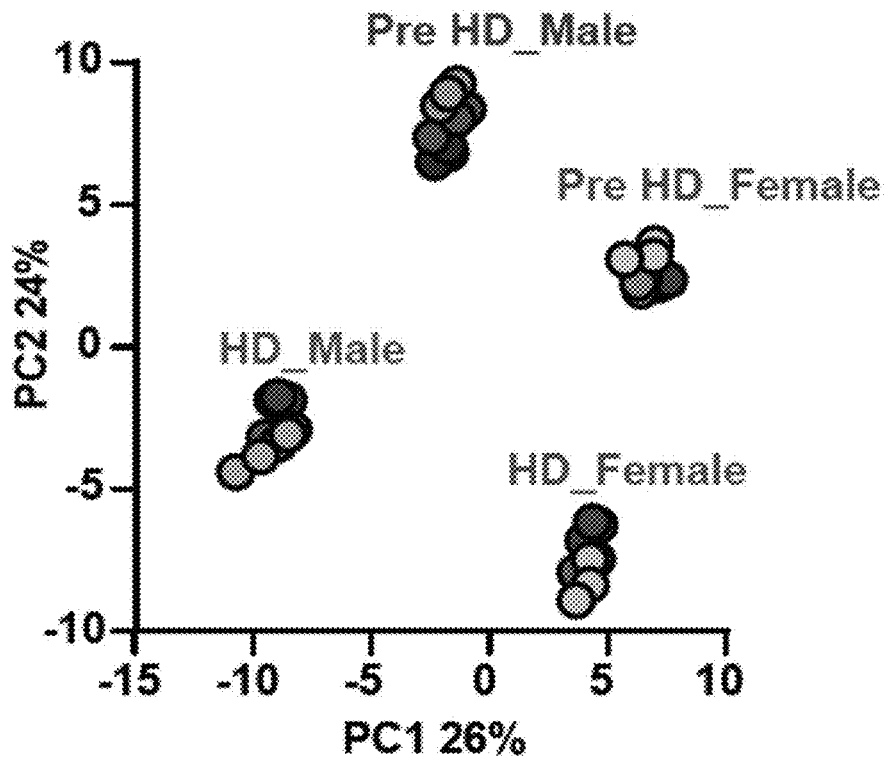
Figure 19C:
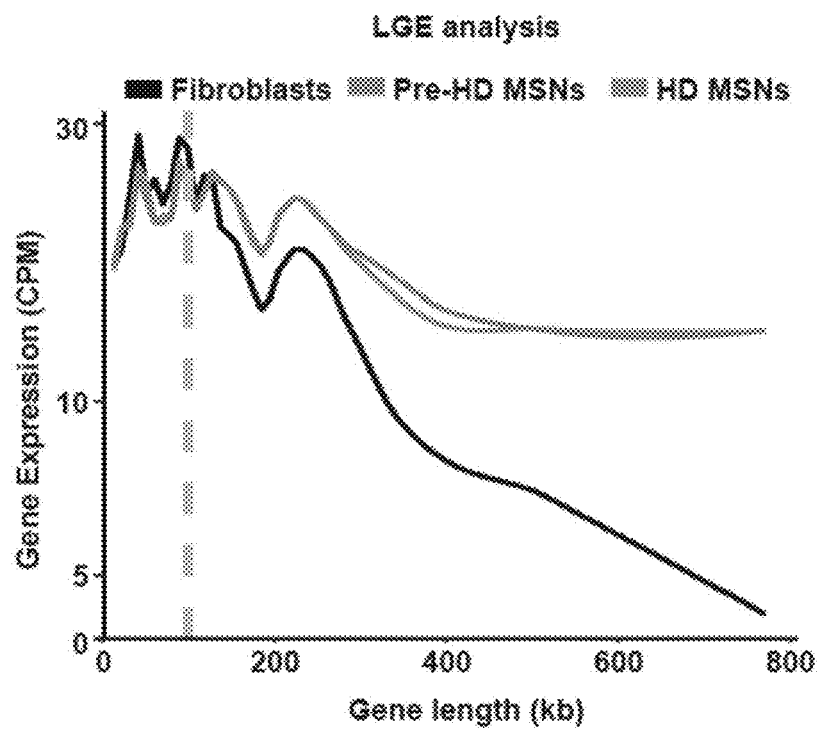

Six independent fibroblast lines from symptomatic and pre-clinical onset HD patients, respectively, reprogrammed with similar efficiency expressing pan-neuronal markers TUBB3 and MAP2 at post-induction day 21 (PID 21) (see e.g., FIG. 15B) and PPP1R1B (also known as DARPP-32), a marker of MSNs, at both protein (see e.g., FIG. 15B) and mRNA levels (see e.g., FIG. 19A). RNA-seq analysis was carried out between six independent gender-matched lines of pre-HD-MSNs and HD-MSNs. RNA samples were collected from three biological replicates of each MSN line after 21 days of reprogramming, a time point preceding the cell death of HD-MSNs. Principal component analysis indicated sample segregation based on the disease-onset condition (pre-MSNs vs HD-MSNs) as well as the sex of sample donors (see e.g., FIG. 19B). To further confirm the neuronal identity of reprogrammed cells, assessed long gene expression (LGE), a transcriptomic feature unique in neurons, was assessed. A dramatic increase in LGE was observed, contrasting the non-neuronal identity of fibroblasts and indicating successful neuronal conversion of all the samples used in the study (see e.g., FIG. 19C).

Figures 15C, 15D:
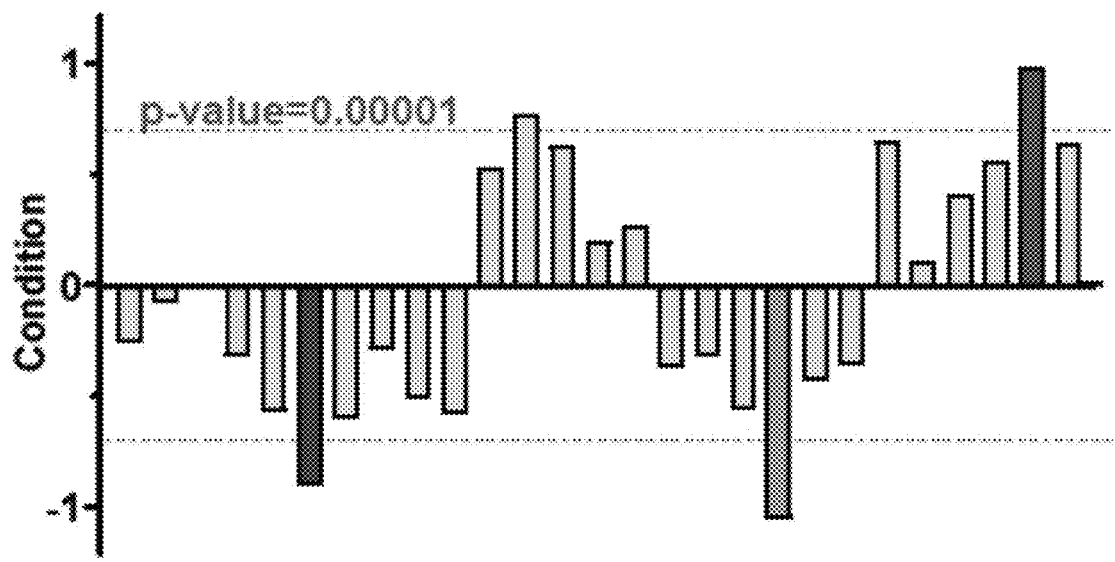
Figure 19D:
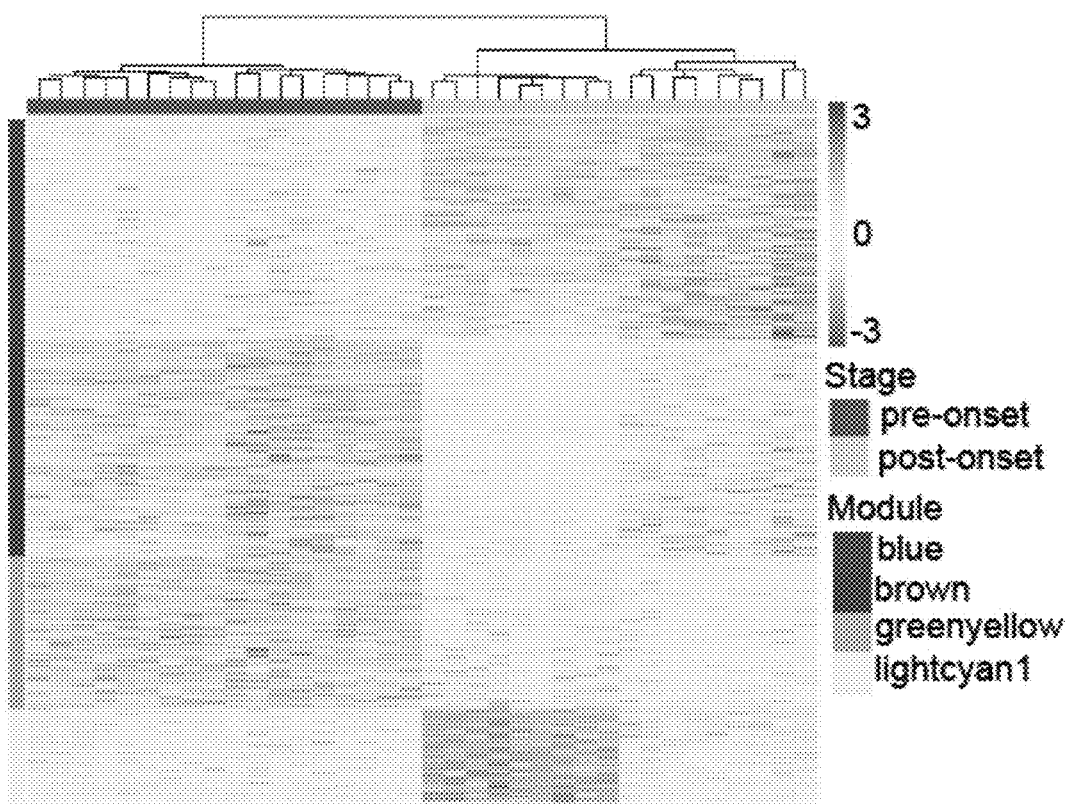
Figure 19E:
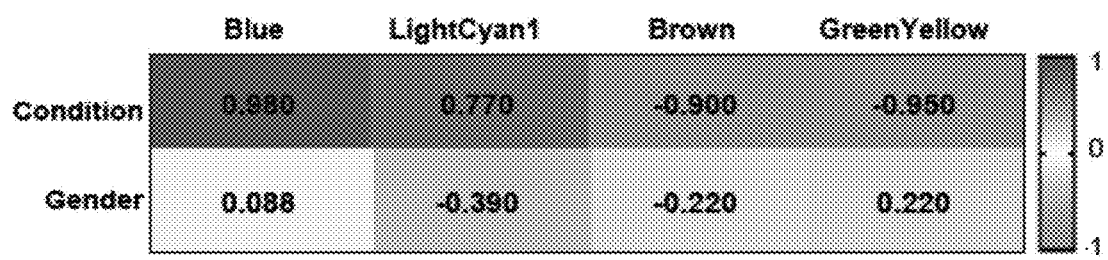
Figure 19F:
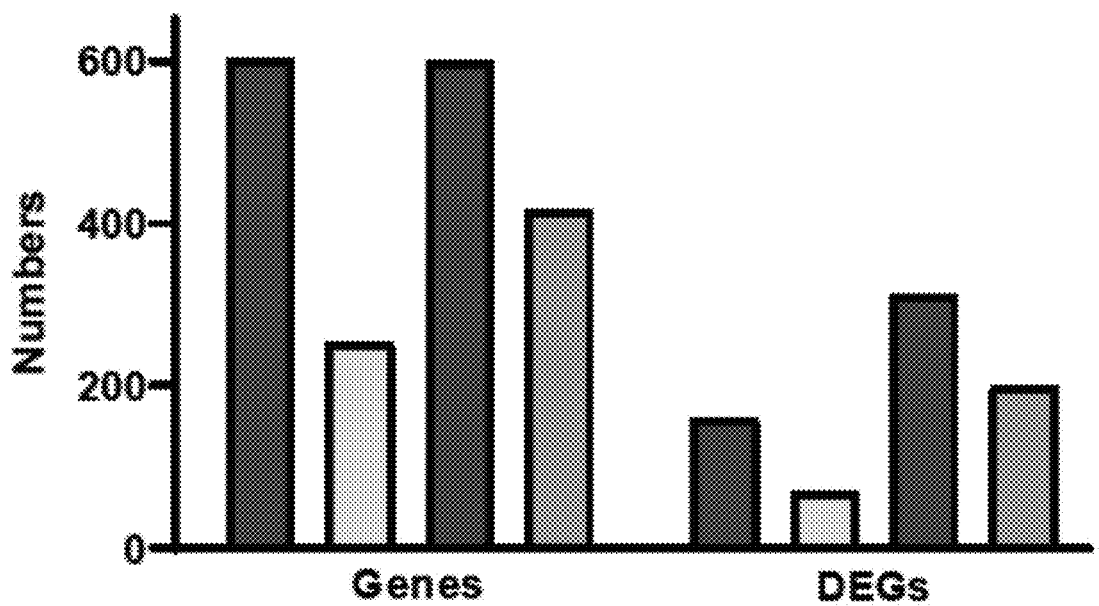
Figure 19G:
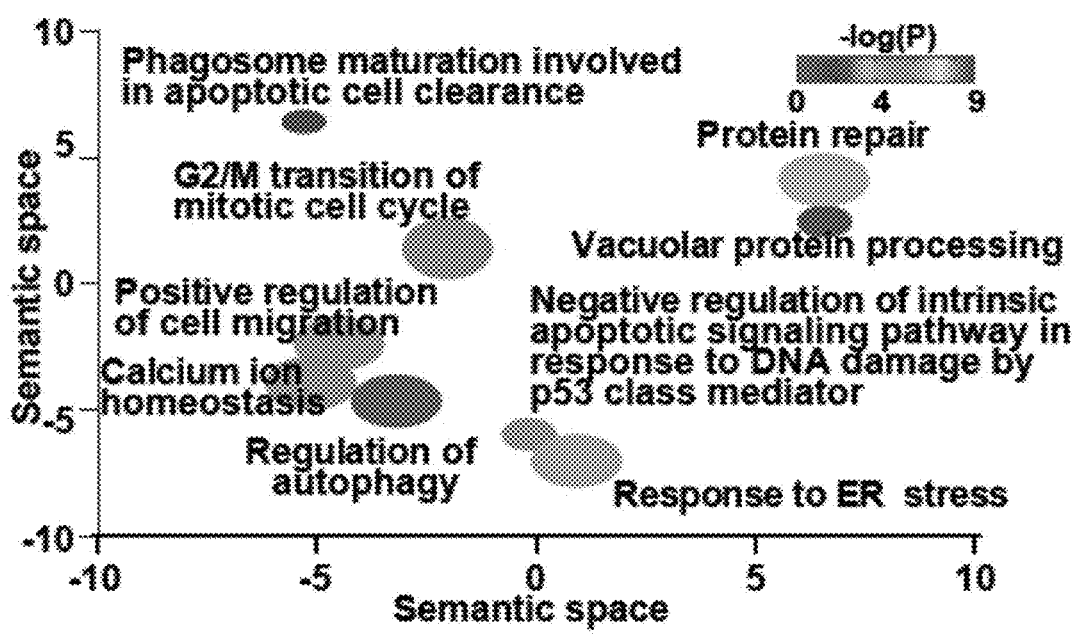

To infer genetic networks altered depending on the status of the disease, weighted gene co-expression network analysis (WGCNA) was performed from the RNA-seq datasets to identify genetic networks that were lost in HD-MSNs compared to pre-HD-MSNs. WGCNA identified gene modules associated with different conditions including the disease stage, age, or gender. Of these modules, four modules highly correlated with the disease-onset condition (p-value<0.00001) were identified (see e.g., FIG. 15C). Two modules showed a positive correlation with post onset HD, whereas two modules showed a negative correlation (see e.g., FIG. 19D and FIG. 19E). To focus on pathways commonly affected in both male and female samples, the module least affected by gender was selected. The brown module including 312 differentially expressed genes (DEGs) emerged as the primary module negatively affected the symptomatic condition (see e.g., FIG. 19E and FIG. 19F). Next, the coexpression dataset was integrated with protein-protein interactions (PPI) network based on experimental databases of human protein-protein interactions (STRING interaction network) (see e.g., FIG. 15D). One of the hubs in the brown module is signal transducers and activators of transcription 3 (STAT3) that regulates the balance between autophagy and cell death. Other hub proteins include RAB8A, RAC1, and PIK3R1 that play roles in regulating autophagy and cell death as well as CDKN1A and UBA52 that are cell cycle regulators (see e.g., FIG. 15D). Pathways enriched in the brown module such as phagosome maturation involved in apoptotic cell clearance, DNA damage response, and the regulation of autophagy were also identified (see e.g., FIG. 19G). Furthermore, functional annotation of the brown module with gene ontology confirmed its relation to apoptosis and autophagy (see e.g., FIG. 19G). IPA Upstream Regulator Analysis was also used to predict which molecules may dictate the cellular state of HD-MSNs in the brown module. This analysis predicted small molecules that are autophagy inhibitors as upstream regulators (see e.g., FIG. 19H), suggesting the cellular state of HD-MSNs is largely reflected by the reduction of autophagy.

Figure 15E:
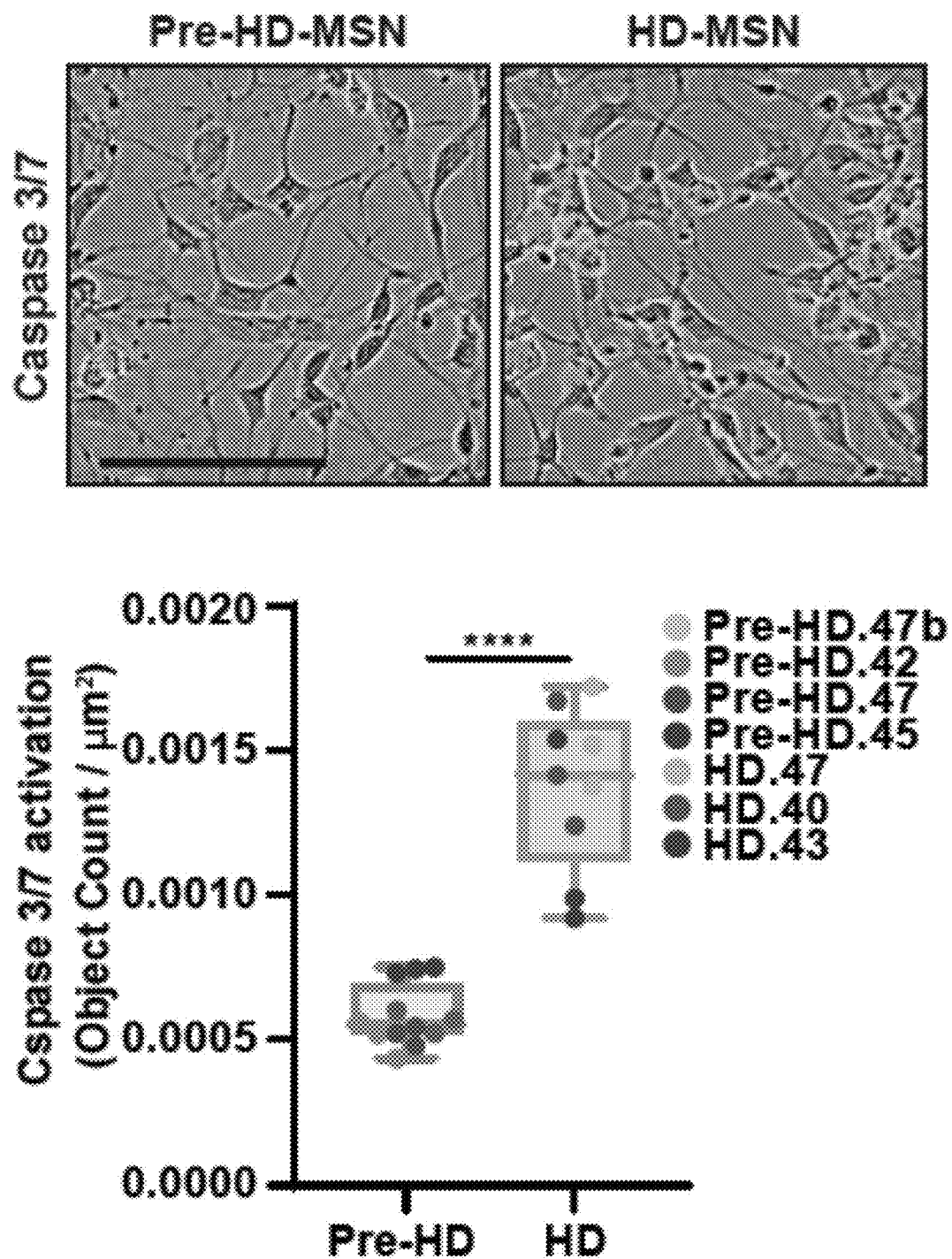
Figure 15F:
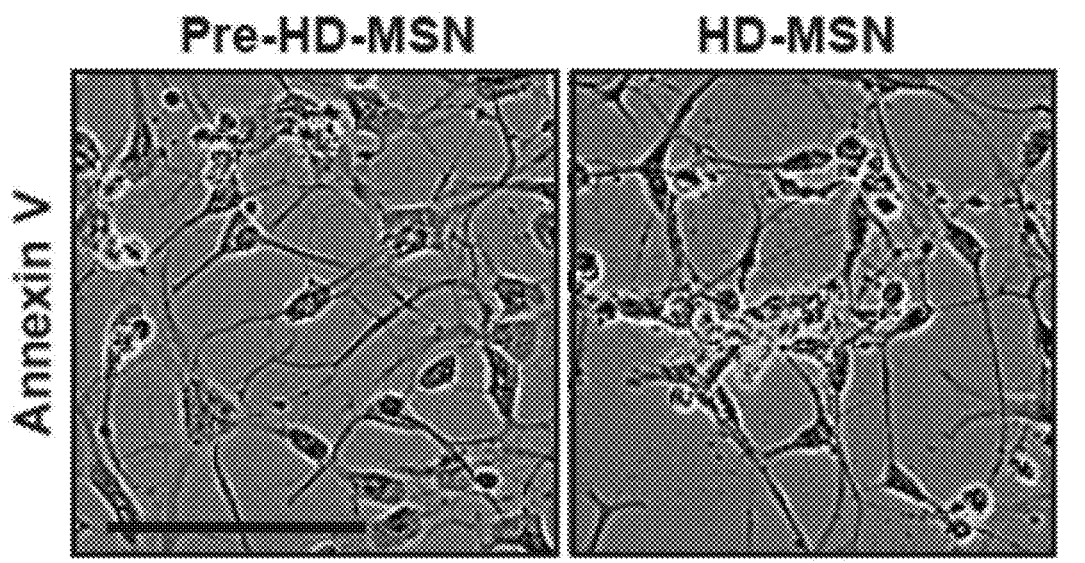
Figure 15F:
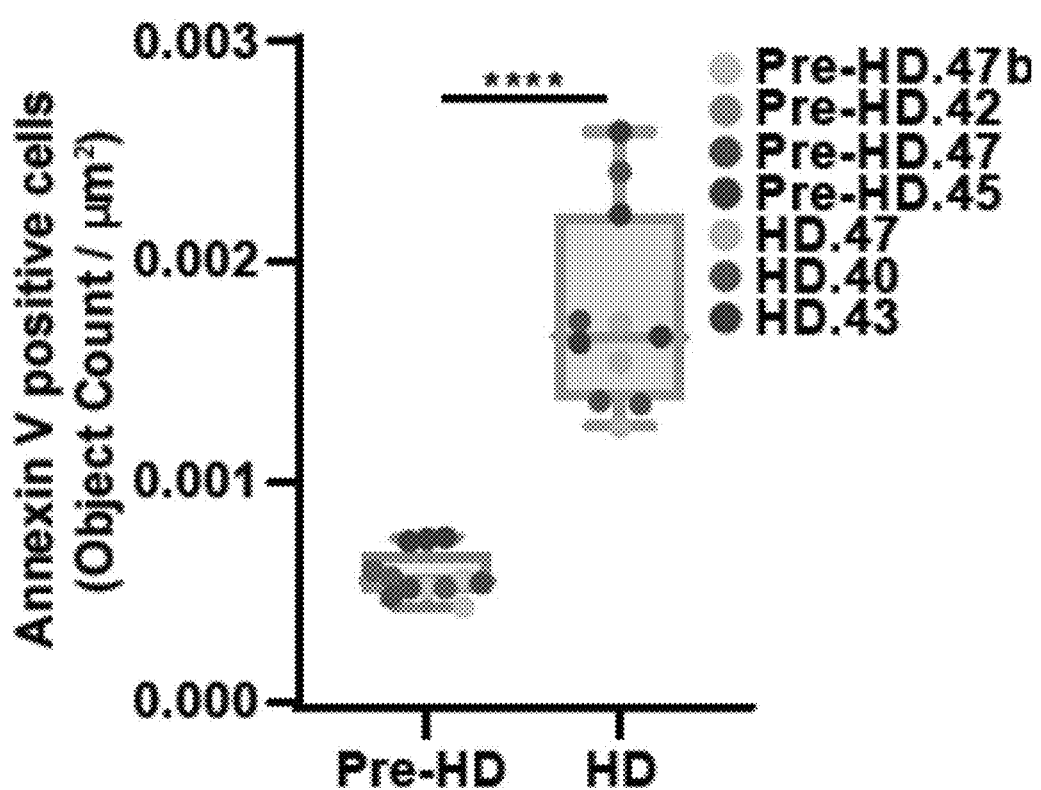

The phenotypic difference in cell deaths between pre-HD-MSNs and HD-MSNs was previously demonstrated by measuring the SYTOX-Green signal, a general cell death indicator. As the transcriptome analyses elucidated pathways enriched with apoptotic processes, HD-MSN degeneration was further investigated by comparing apoptosis levels between pre-HD-MSN and HD-MSNs. HD-MSNs exhibited increased levels of caspase-3/7 activation at post-induction date (PID) 26 measured by monitoring live cell staining of Caspase-3/7 Green Dye during reprogramming (see e.g., FIG. 15E) and Annexin V commonly used to detect apoptotic cells by its ability to bind to phosphatidylserine (PS), a marker of apoptosis when it is on the extracellular surface (see e.g., FIG. 15F).

Figure 15G:
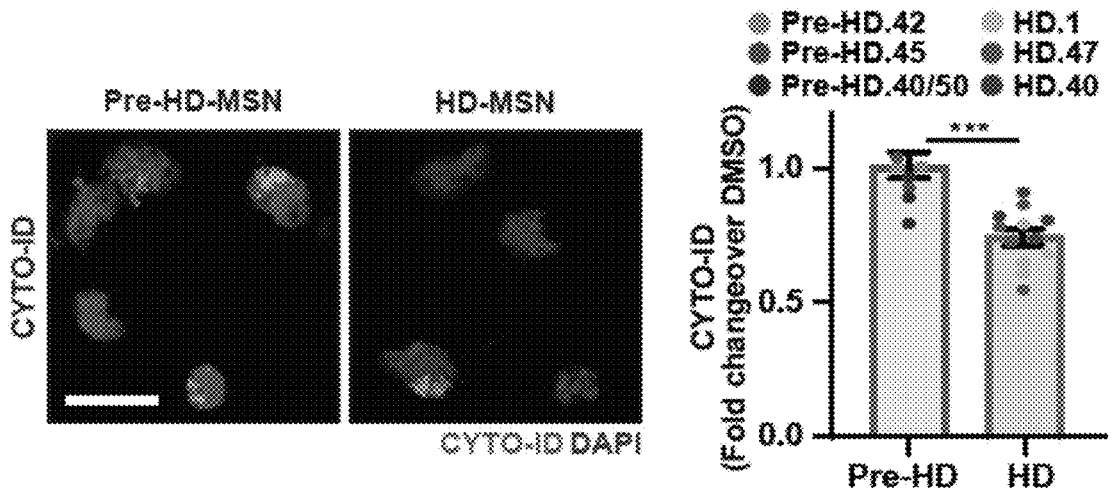
Figure 15H:
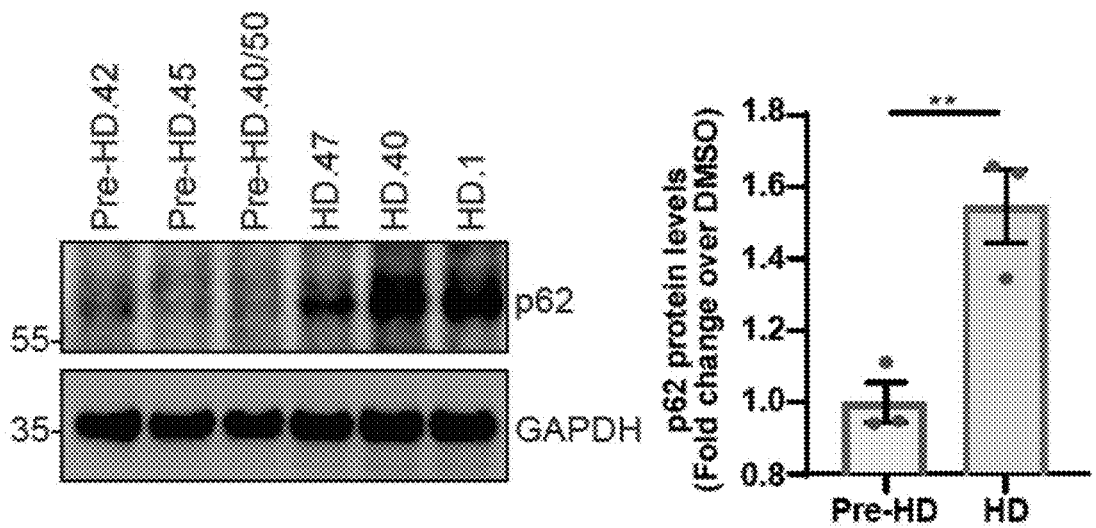

To test whether the differentially expressed genetic pathways between pre-HD-MSNs and HD-MSNs would be reflected at the cellular level, whether the autophagy activity would be different between pre-HD- and HD-MSNs was assessed. CYTO-ID assay, a fluorescence-based live-cell assay for accumulated autophagic vacuoles was performed as well as immunoblot for p62/SQSTM1 expression, a marker used to monitor autophagic activity due to its binding to LC3 and degradation by autophagy. HD-MSNs showed significantly lowered CYTO-ID signal compared to Pre-HD-MSNs (see e.g., FIG. 15G), which coincided with the increased level of p62/SQSTM1 in HD-MSNs (see e.g., FIG. 15H), demonstrating the overall lowering in autophagy in HD-MSNs.

Differential Chromatin Accessibilities Between Pre-HD-MSNs and HD-MSNs

Figure 16A:
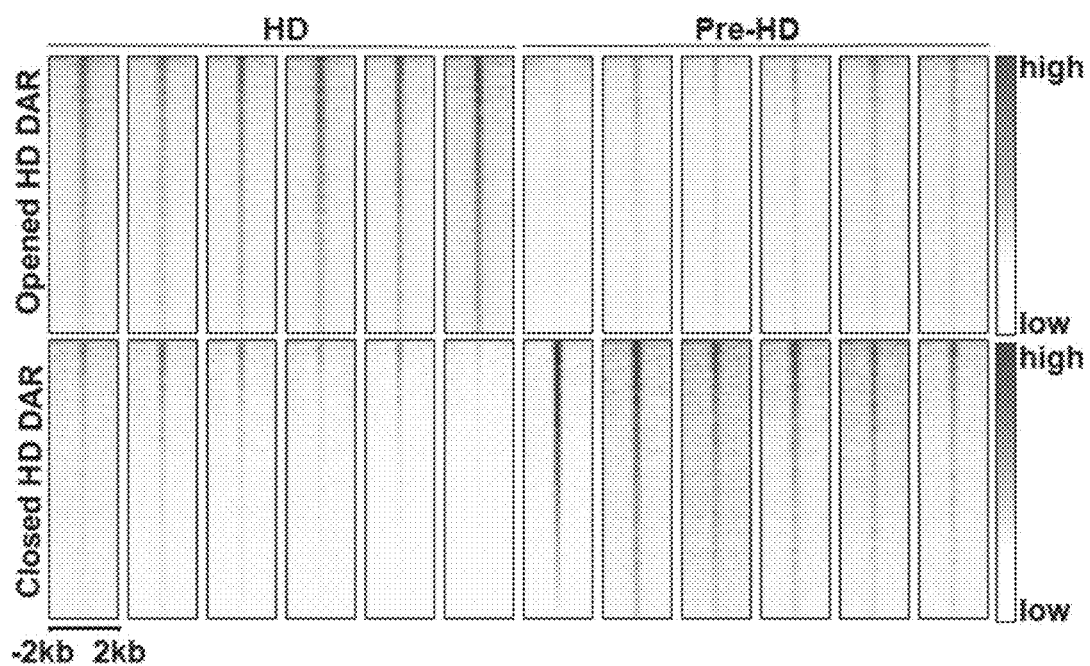
Figure 20A:
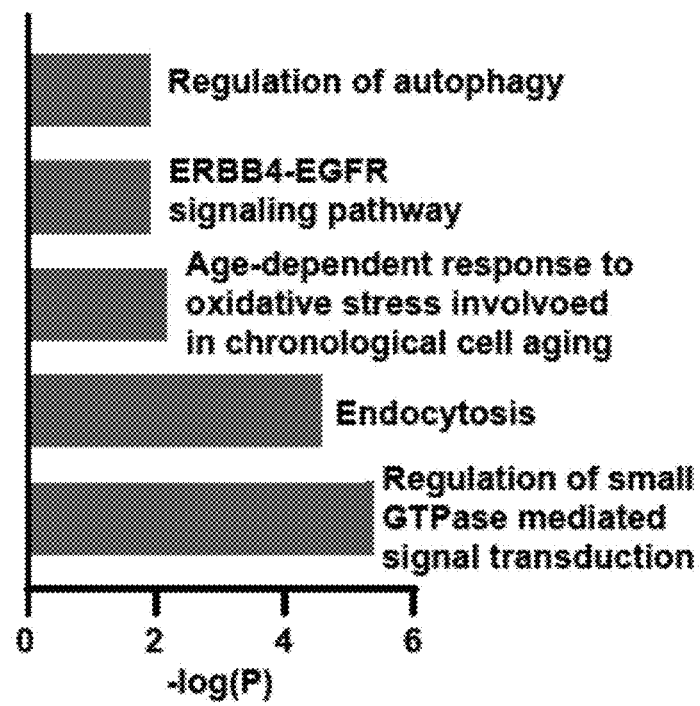
FIG. 20A-FIG. 20I. Pre-HD-MSNs and HD-MSNs display differential chromatin accessibilities. (A) Gene Ontology (GO) enrichment analysis for genes associated with DARs at promoters in pre-HD-MSNs and HD-MSNs at PID21 (adj. p<0.05). (B) Heatmaps showing gene expression levels for DEGs that positively correlated with ATAC-seq signal intensities in their promoter regions. Signal intensity is based on normalized CPM values. Data are shown as Z score normalized log 2CPM (adjusted p<0.05, log 2FC<−0.5 or log 2FC>0.5). (C, D) GO terms associated with DEGs that correlate with ATAC-seq signal intensity in promoter regions. C (red): opened and upregulated genes. D (blue): closed and downregulated genes. (E) Predicted microRNA as an upstream regulator of the brown module by Ingenuity Pathway Analysis. (F) RT-qPCR analysis for DARPP-32 in human young cortex and striatum aged 9, 11, and 19 years and human old cortex and striatum aged 83, 84, 85, 87, and 91 years (Individual data plotted; n=3-6 biological replicates for each; * p<0.05 by t-test; mean±SEM). (G) Pre-HD-MSNs with the overexpression of empty vector with RFP or RFP-miR-29b at PID 30 immunostained for RFP and DAPI. (Scale bars, 20 µm). (H) Mature miR-29-3p expression levels were analyzed by RT-qPCR in pre-HD-MSNs expressing control or miR-29b at PID26 (n=9 biological replicates for each; ** p<0.0001 by t-test; mean±SEM). (I) Mature miR-29-3p expression levels were analyzed by RT-qPCR in HD-MSNs with negative control or miR-29b-3p inhibitor at PID26 (n=4 biological replicates for each; * p<0.001 by t-test; mean±SEM).
Figure 20B:
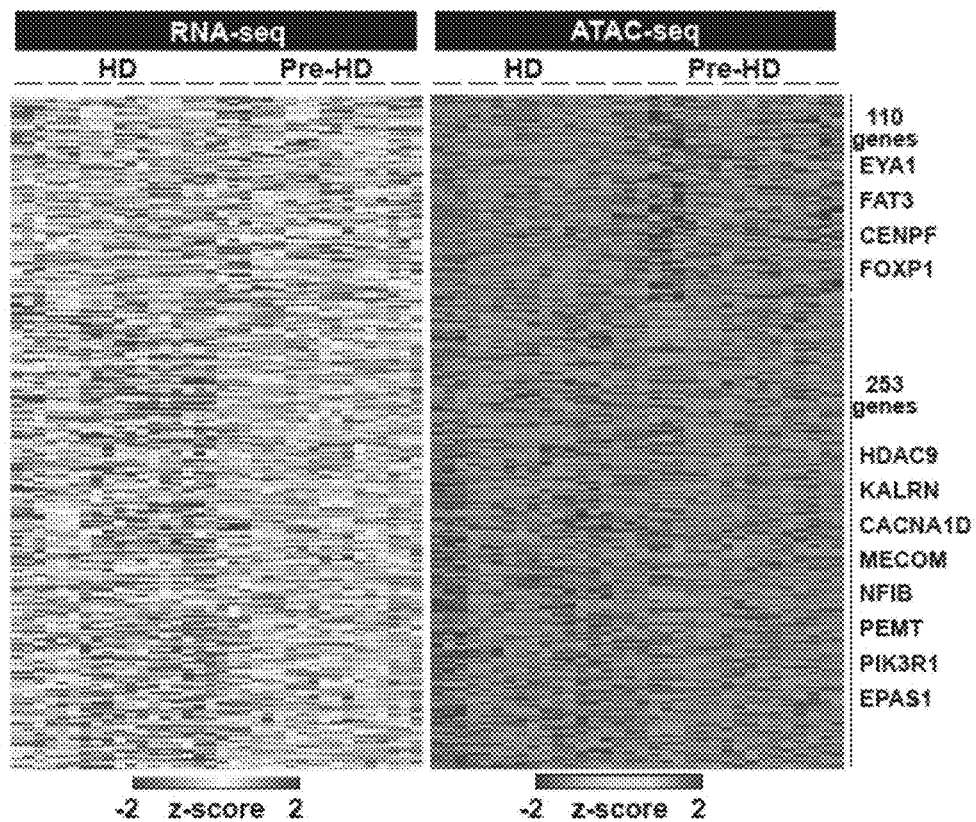
Figure 20C:
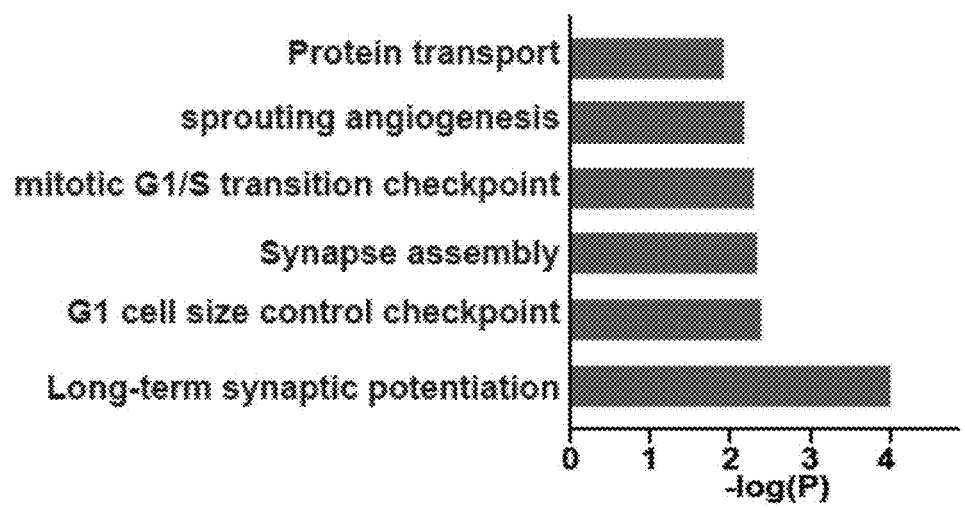
Figure 20D:
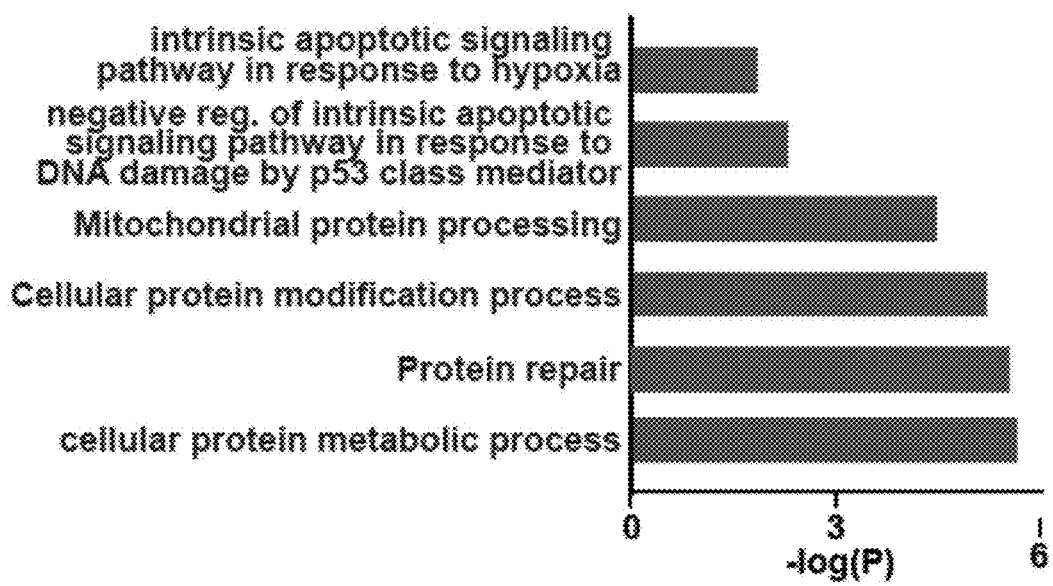

To gain further insights into differential gene expression, Omni-ATACseq was performed to measure chromatin accessibilities in pre-HD-MSNs and HD-MSNs. Six independent gender-matched lines of post-onset and pre-onset HD-MSNs were processed for omni-ATAC after 21 days of reprogramming. Out of 213,045 total peaks identified, 28,548 differentially accessible regions (DARs) emerged (adjusted p<0.05, |log 2FC|≥0.5) between pre-HD-MSNs and HD-MSNs accounting for approximately 13% of the total peaks. Of the total DARs, 14,673 DARs were associated with more accessible (opened) regions, and 13,875 peaks for closed regions in HD-MSNs. A gene enrichment analysis was performed on genes with DARs around the transcription start site (TSS)±2 kb. (see e.g., FIG. 16A). 476 genes with increases and 490 genes with decreases were identified in ATAC signals in HD-MSNs compared to pre-HD-MSNs (adjusted p<0.05, |log 2FC|>1). Gene Ontology (GO) enrichment analysis revealed that genes associated with closed DARs in HD-MSNs correlated with the regulation of autophagy, endocytosis, and aging pathways (see e.g., FIG. 20A). Next, the DEG list (adjusted p<0.05, |log 2FC|>0.05) was integrated with DARs around the promoter region. 110 upregulated and 253 downregulated genes were identified that coincided with open and closed regions at promoter region in HD MSNs, respectively (see e.g., FIG. 20B). Furthermore, GO enrichment analysis revealed that downregulated genes from closed regions were connected to terms related to apoptosis in contrast to upregulated genes from opened DARs (see e.g., FIG. 20C and FIG. 20D).

Identification of miR-29b-3p as an Upstream Regulator

Figure 16B:
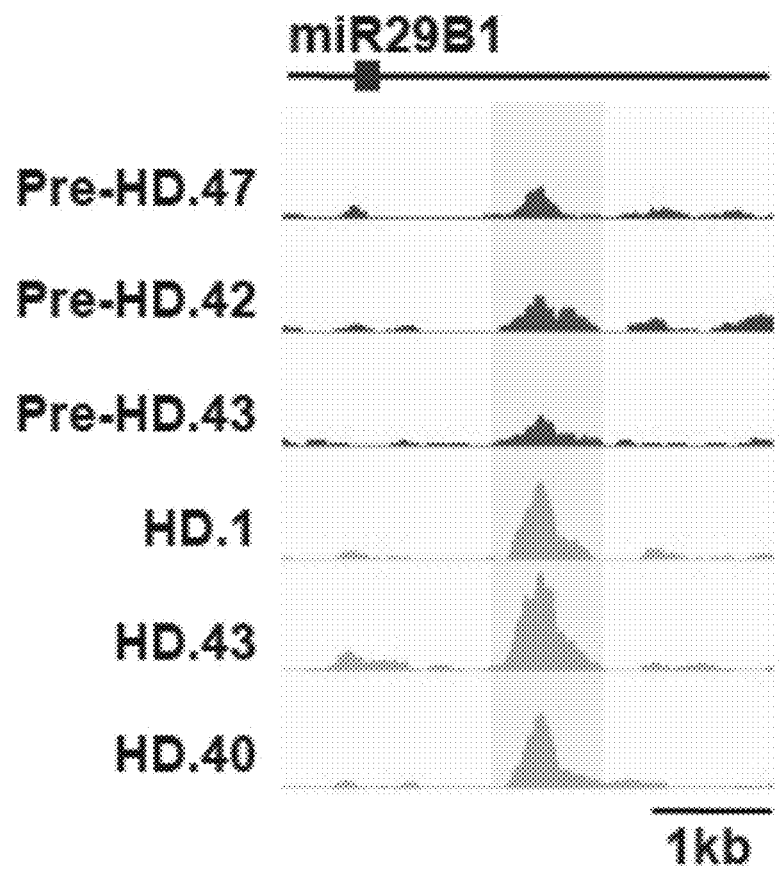
Figure 16C:
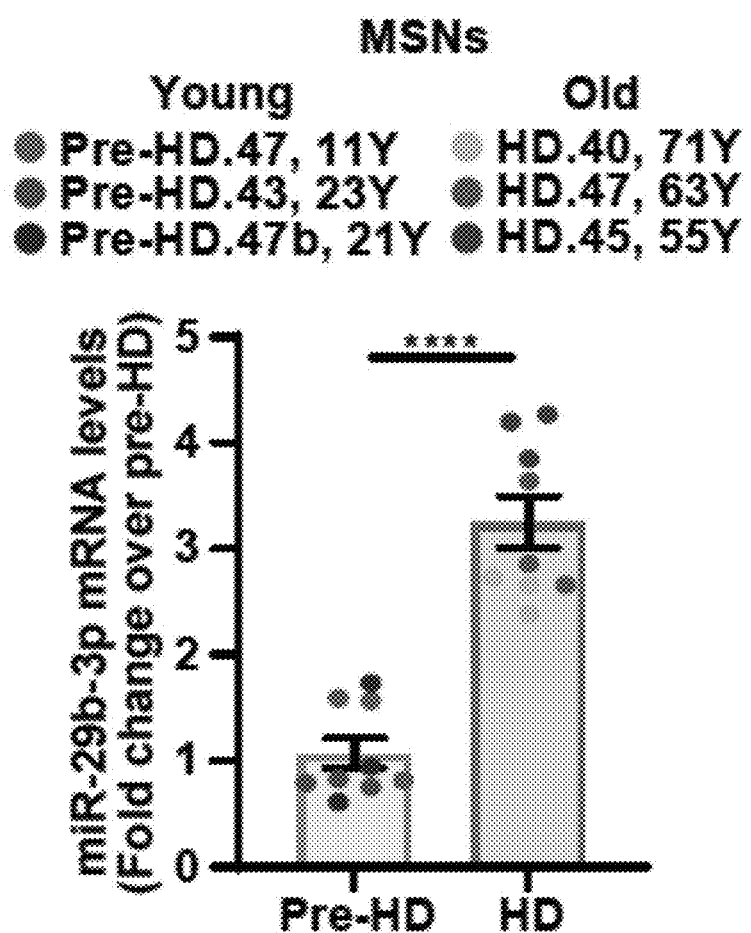
Figure 20E:
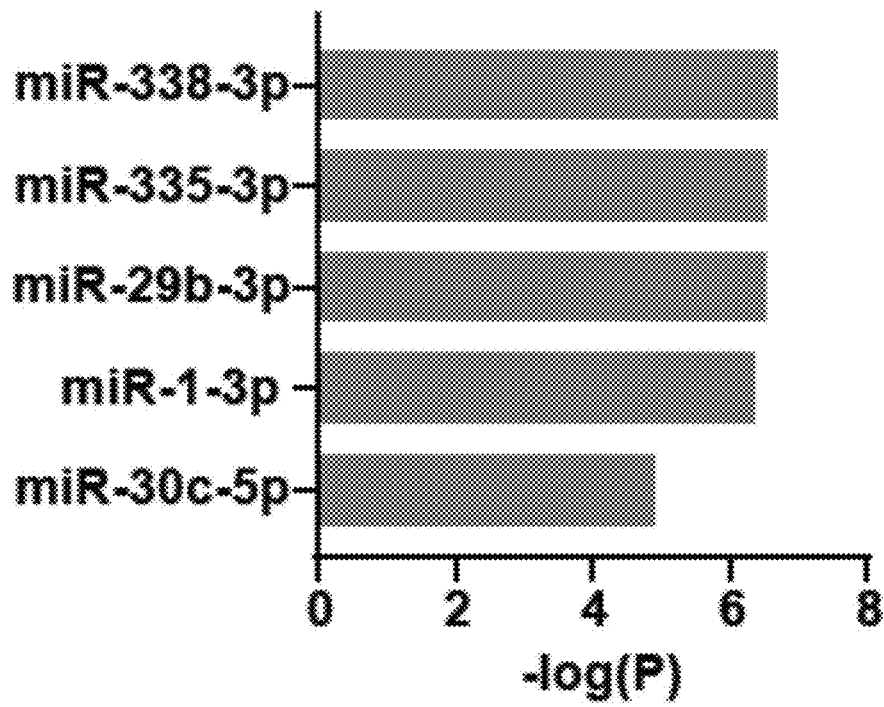
Figure 20F:
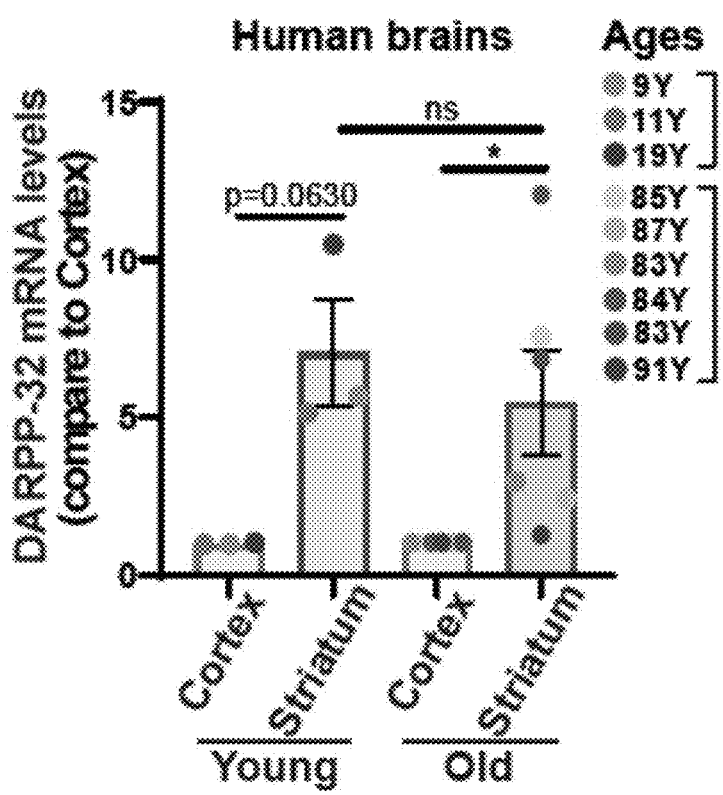

Next, how autophagy and neuronal cell death may be differentially regulated between pre-HD and HD-MSNs was investigated. To identify potential regulators that affect the autophagy-related gene expression in the brown module, upstream regulator analyses of the DARs in the brown module (QIAGEN Ingenuity Pathway Analysis) was performed and several microRNAs including miR-29b-3p were found in the brown module (see e.g., FIG. 20E). Interestingly, of the five predicted microRNAs as potential upstream regulators, miR29B1, RNA host gene of miR-29b, was found to be significantly associated with enhanced chromatin accessibility in HD-MSNs compared to pre-HD-MSNs (see e.g., FIG. 16B). When the expression of miR-29b-3p, the mature miRNA from miR29B1, was compared, the miR-29b-3p expression was significantly increased in HD-MSNs over pre-HD-MSNs (see e.g., FIG. 16C). Intriguingly, this increased level of miR-29b-3p was reflected in aged human brains as the expression level of miR-29b-3p was compared between the striatum of younger (9, 11, and 19 years) and elder cognitively normal individuals (83, 84, 85, 87, and 91 years) (see e.g., FIG. 16D). To confirm the presence of MSNs in the striatum sections, the expression of the MSN marker DARPP-32 was compared to the sections from the cortices (see e.g., FIG. 20F). These results demonstrate the age-associated increase in miR-29b-3p in directly reprogrammed HD-MSNs, also manifested in the aged human striatum.

Figure 16E:
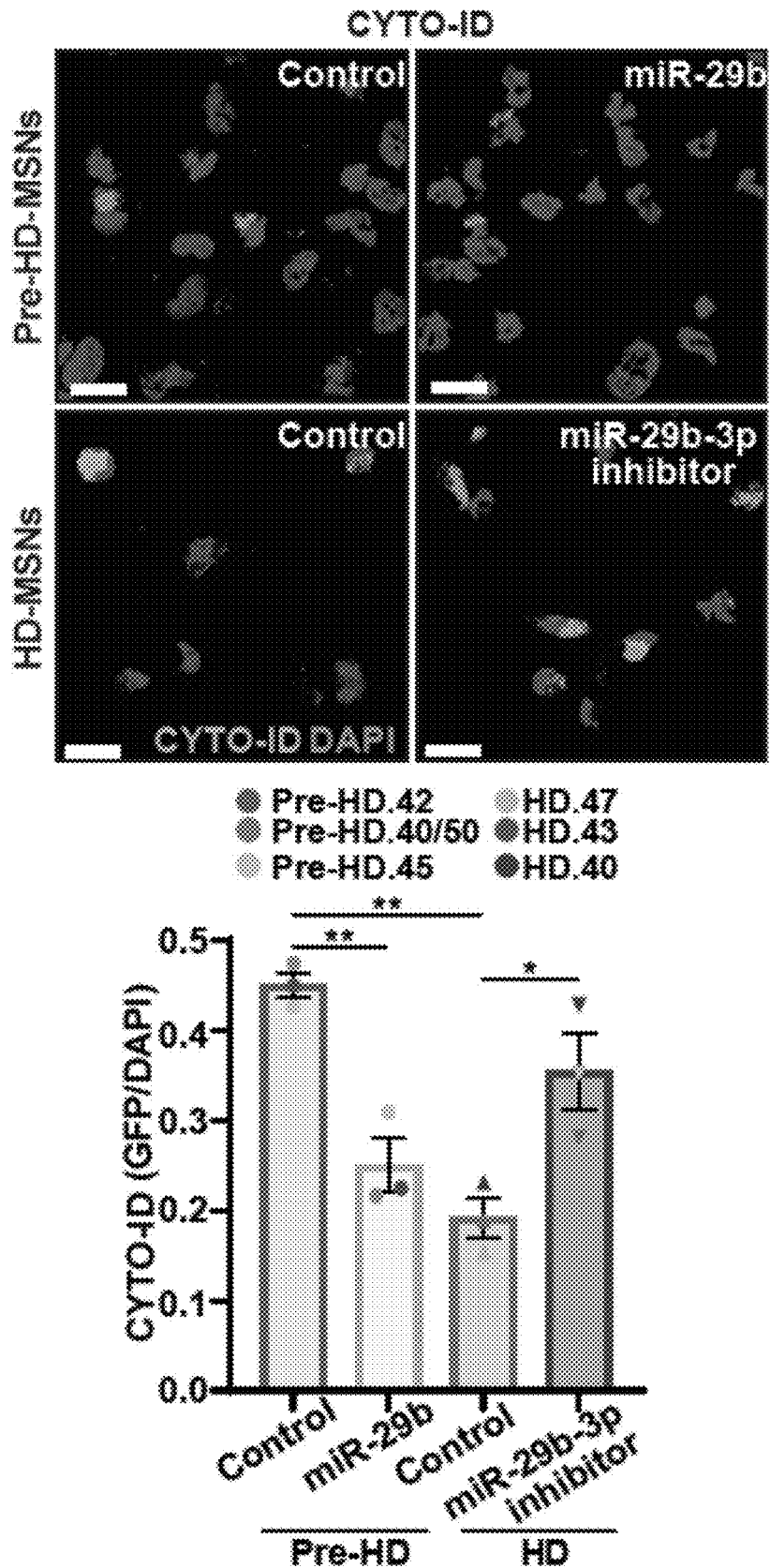
Figure 16F:
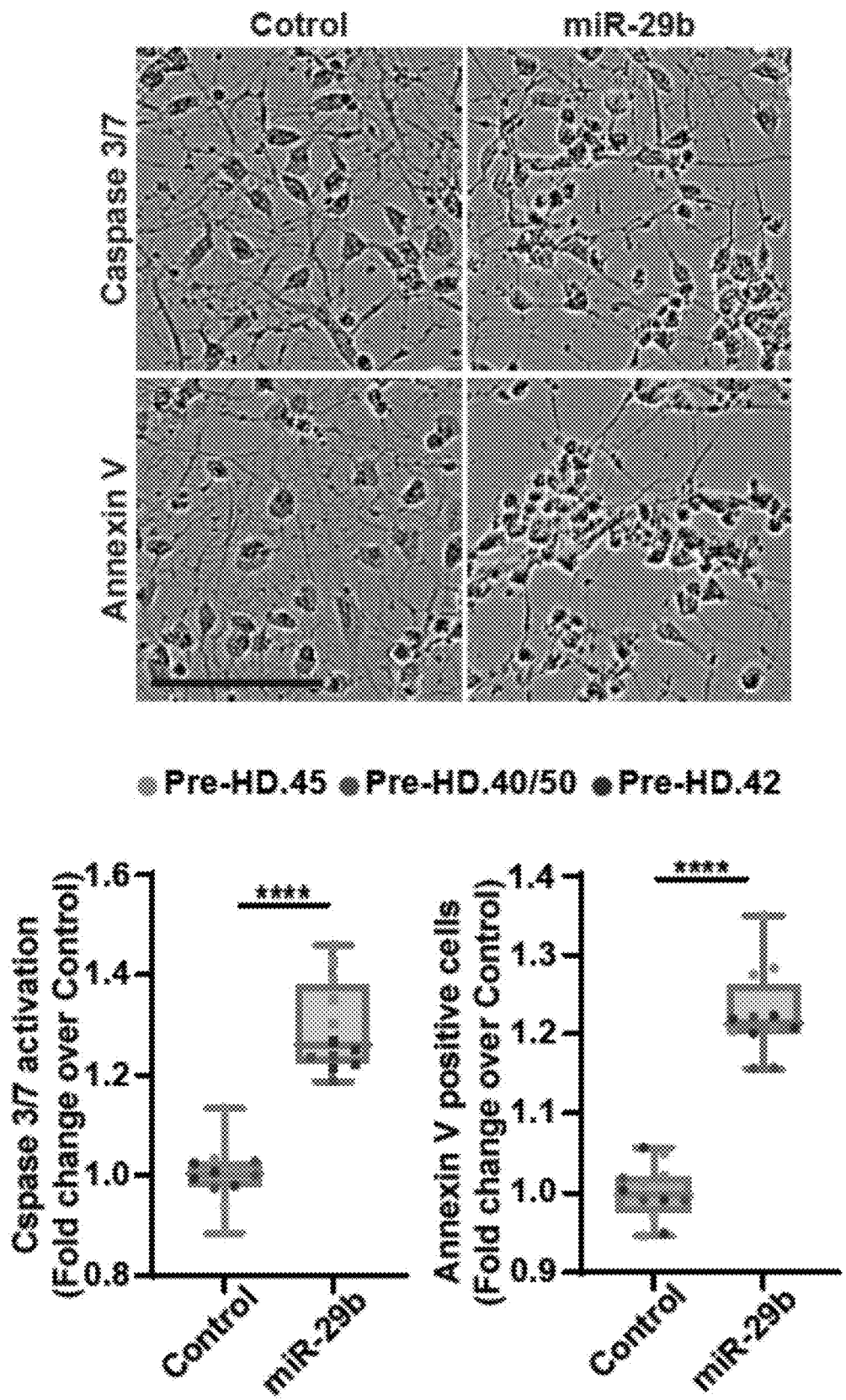
Figure 16G:
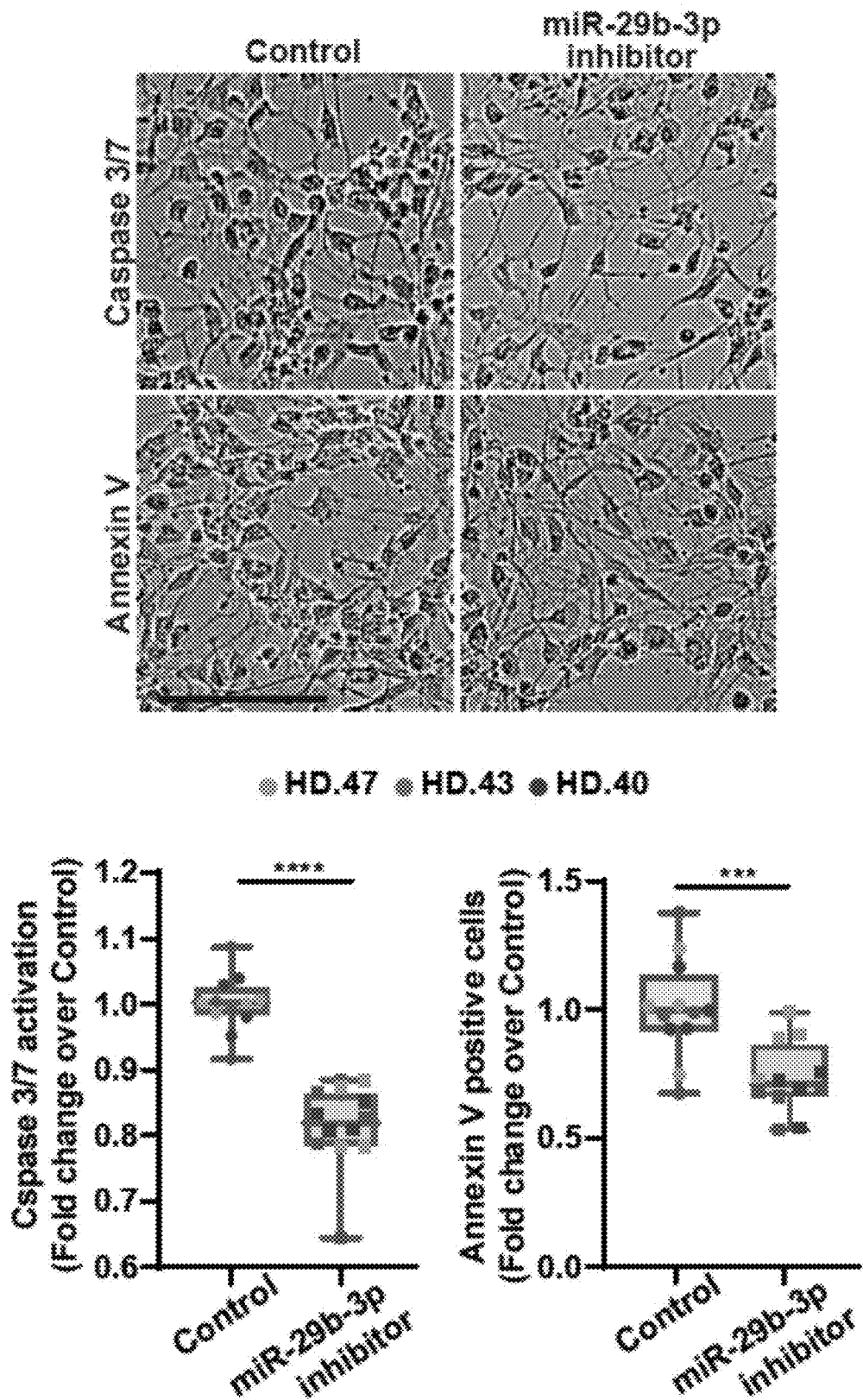
Figure 16H:
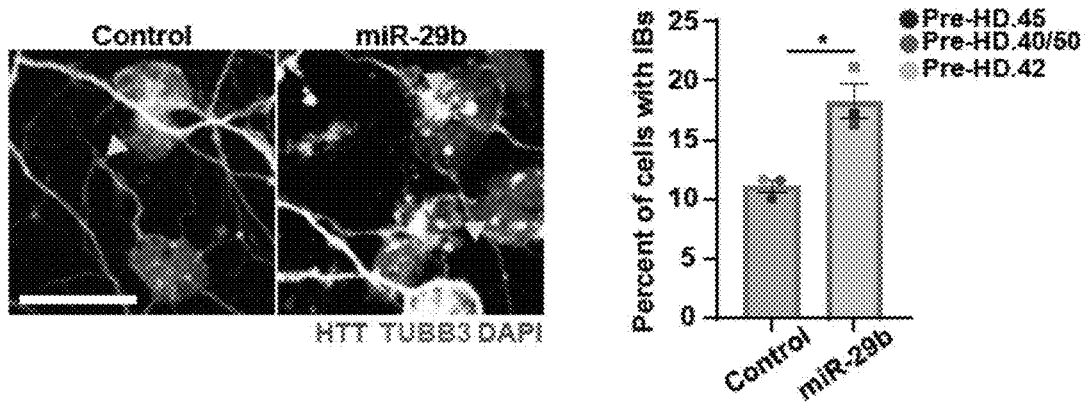
Figure 16I:
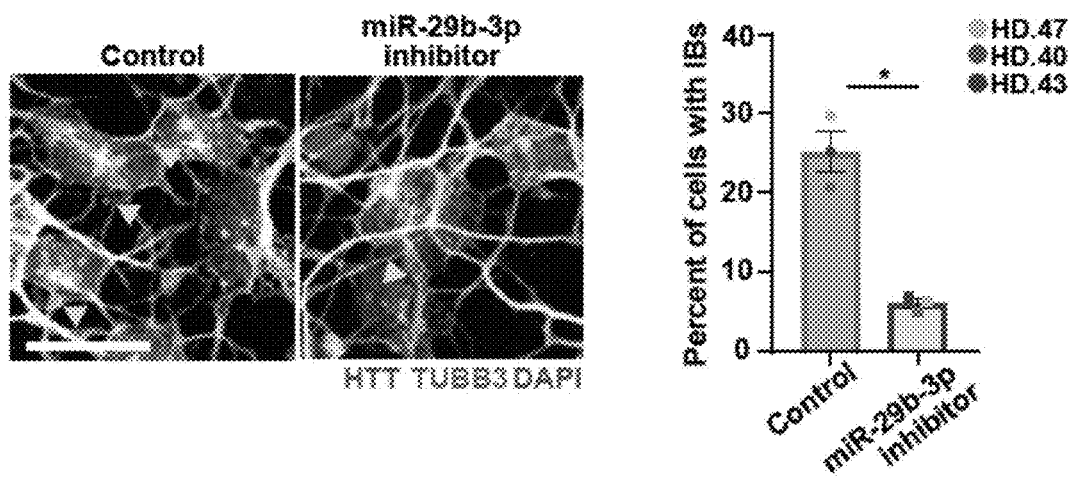
Figure 20G:
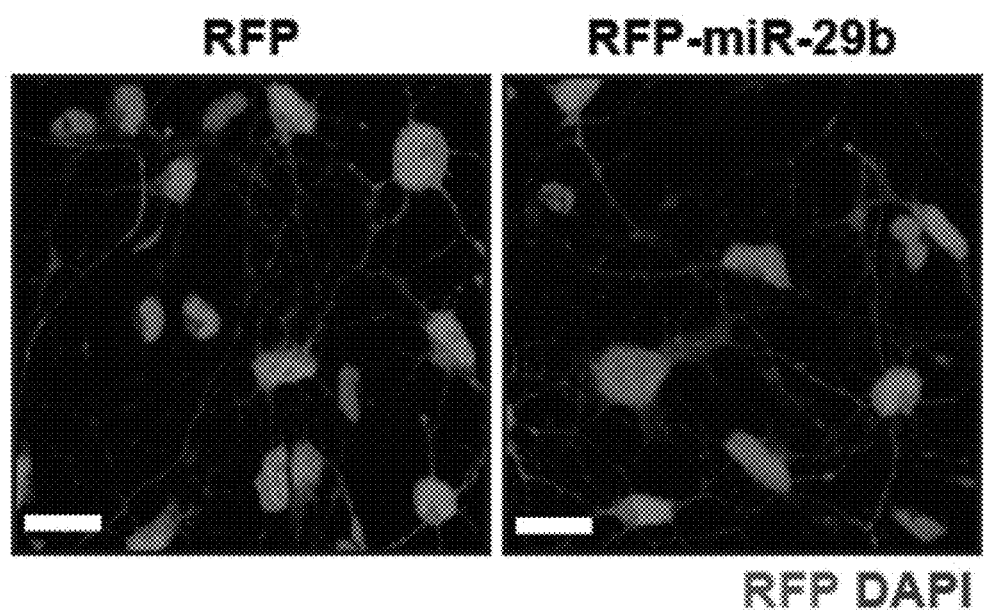
Figure 20H:
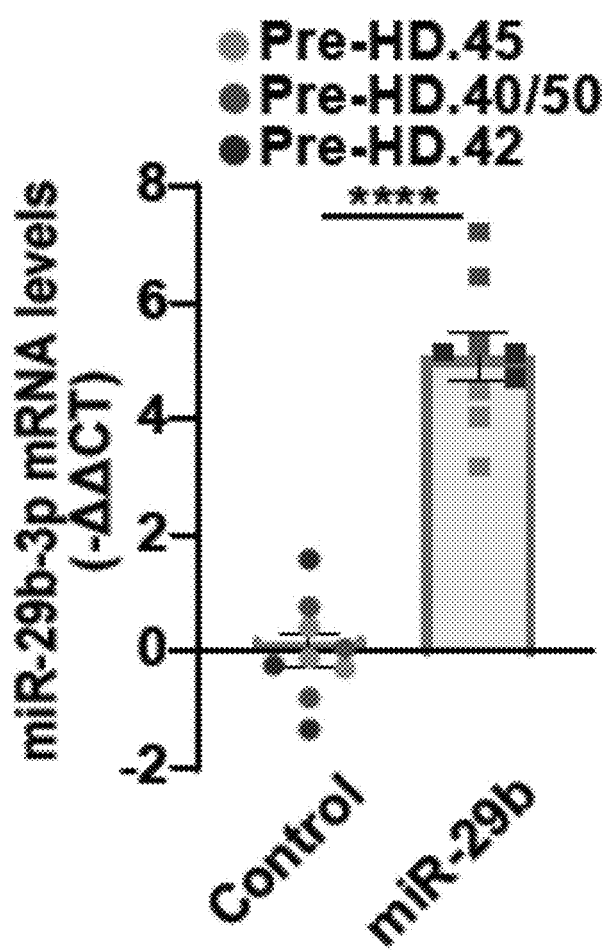
Figure 20I:
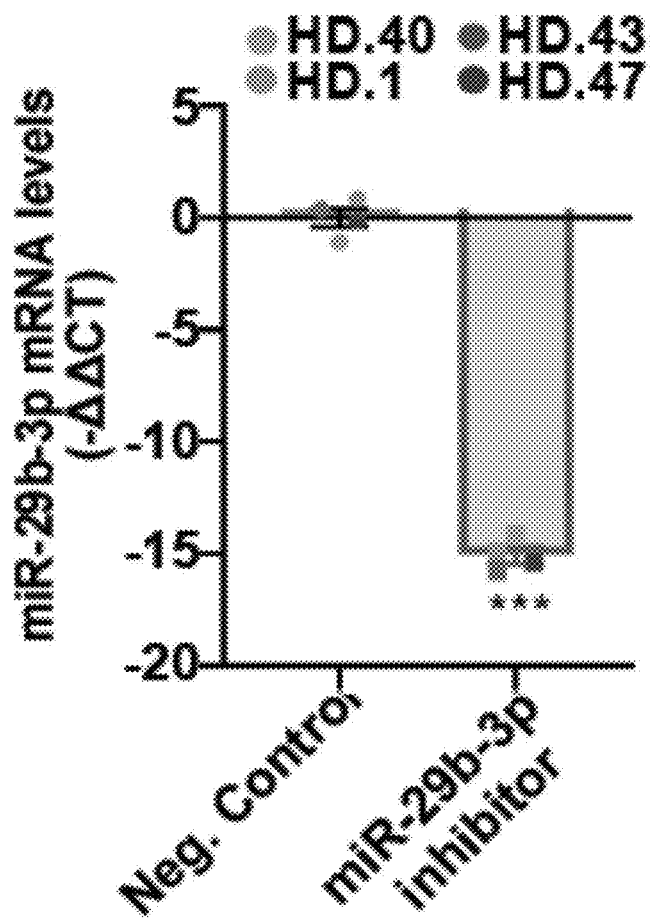

Next, miR-29b-3p's role in autophagy was investigated by perturbing its expression in patient-derived MSNs. First, the expression of miR-29b-3p was checked by RT-qPCR after overexpressing miR-29b in pre-HD-MSNs or treating HD-MSNs with the antisense power inhibitor of miR-29b (see e.g., FIG. 20G and FIG. 20I). Overexpressing miR-29b-3p in pre-HD-MSNs decreased the autophagy activity, whereas reducing miR-29b-3p in HD-MSNs by miR-29b inhibitor increased the autophagy activity compared to the scrambled control, as revealed by CYTO-ID signal (see e.g., FIG. 16E). These results demonstrate that the autophagic state in HD-MSNs can be modified by altering miR-29b-3p levels. Since pre-HD-MSNs were less vulnerable to mHTT-induced toxicity (see e.g., FIG. 15E and FIG. 15F) and miR-29b was shown to be involved in the apoptosis pathway, it was tested whether changing the miR-29b-3p level would also affect HD-MSN degeneration by measuring apoptosis in pre-HD and HD-MSNs. Overexpressing miR-29b-3p in pre-HD-MSNs significantly increased Caspase 3/7 and Annexin V signals compared to the control (RFP expression only), whereas reducing miR-29b-3p in HD-MSNs by miR-29b-3p inhibitor decreased apoptosis of HD-MSNs (see e.g., FIG. 16F, FIG. 16G, and FIG. 20G). Because of the link between mHTT aggregation and autophagy, it was also examined whether miR-29b-3p would influence the amount of mHTT aggregation. Overexpressing miR-29b in three independent pre-HD MSN samples, significantly increased mHTT aggregation compared to the control (see e.g., FIG. 16H), whereas treating HD-MSNs with mir-29b-3p inhibitor significantly reduced the number of cells with mHTT aggregation (see e.g., FIG. 16I). These results collectively indicate the functionality of miR-29b-3p as one of the drivers that downregulate autophagy and promote HD MSN degeneration.

miR-29b-3p Reduces Autophagy Via Directly Targeting STAT3 in HD-MSNs

Figure 17A:
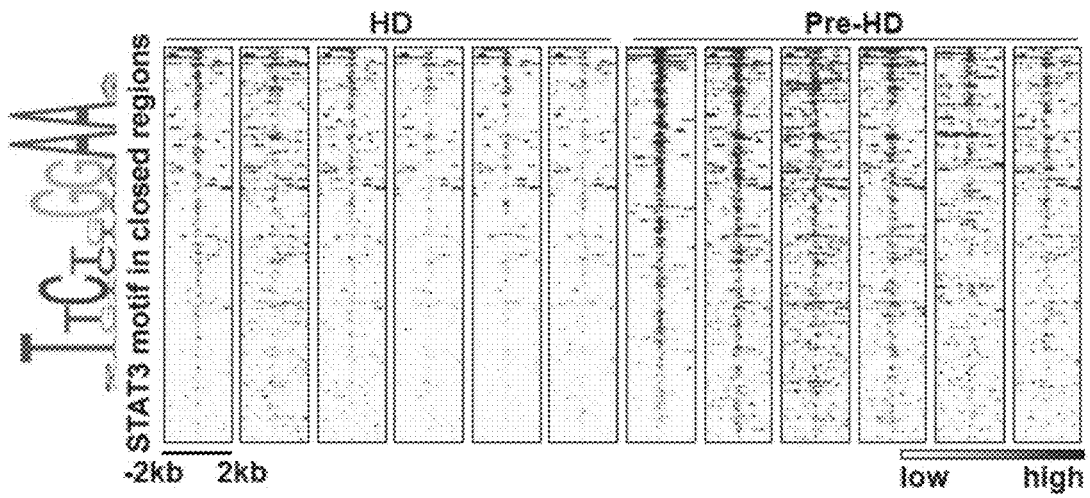
FIG. 17A-FIG. 17J. The expression of autophagy-related genes regulated by miR-29b-3p. (A) Heatmaps of STAT3 binding site density within chromatin loci that close in HD-MSNs compared to pre-HD-MSNs. Legend depicts representative motifs for STAT3 binding sites. (B) Integrative Genomics Viewer (IGV) snapshots showing peaks enriched in pre-HD-MSNs (purple) over HD-MSNs (green) within gene ATG5 and ATG7 (DAR highlighted in grey). (C) RT-qPCR analysis for ATG5 and ATG7 mRNA levels of pre-HD-MSNs with shcontrol or shSTAT3 at PID26 (n=8). (D) The sequence of miR-29-3p seeds in human and mouse STAT3 3'UTR and human STAT3 3'UTR mutant. (E) Luciferase assays with HEK293Le cells co-transfected with miR-NS or miR-29b-3p and wild-type or mutant STAT3 3'UTRs containing point mutations to the seed-match regions of miR-29b-3p (n=4). (F, G) RT-qPCR for STAT3 of pre-HD and HD-MSNs at PID21 (F, n=18) and pre-HD-MSNs expressing control or miR-29b and HD-MSNs with negative control or miR-29-3p inhibitor at PID26 (G, n=4-9). (H) Representative images and quantification of pre-HD-MSNs expressing shcontrol or shSTAT3 for autophagy measurement assayed with CYTO-ID green (n=3, shcontrol: 498 cells, shSTAT3: 404 cells). (I, J) Neuronal cell death assay using Caspase-3/7 or Annexin V reagents in pre-HD-MSNs expressing shcontrol or shSTAT3 at PID 26 (Caspase-3/7) or PID30 (Annexin V) (1, n=12-15) and HD-MSNs expressing negative control, miR-29b-3p inhibitor or miR-29b-3p inhibitor with shSTAT3 at PID 28 (Caspase 3/7) or at PID 32 (Annexin V) (J, n=14-17). The sample size (n) corresponds to the number of biological replicates. Statistical significance was determined using unpaired t-test (C, E, F, H, I) or one-way ANOVA with Tukey's multiple comparisons test (G, J); ** p<0.0001, * p<0.001, ** p<0.01, *p<0.05, ns, not significant; Scale bars in (H) 20 μm, in (I, J) 100 μm; Mean±s.e.m.
Figure 17B:
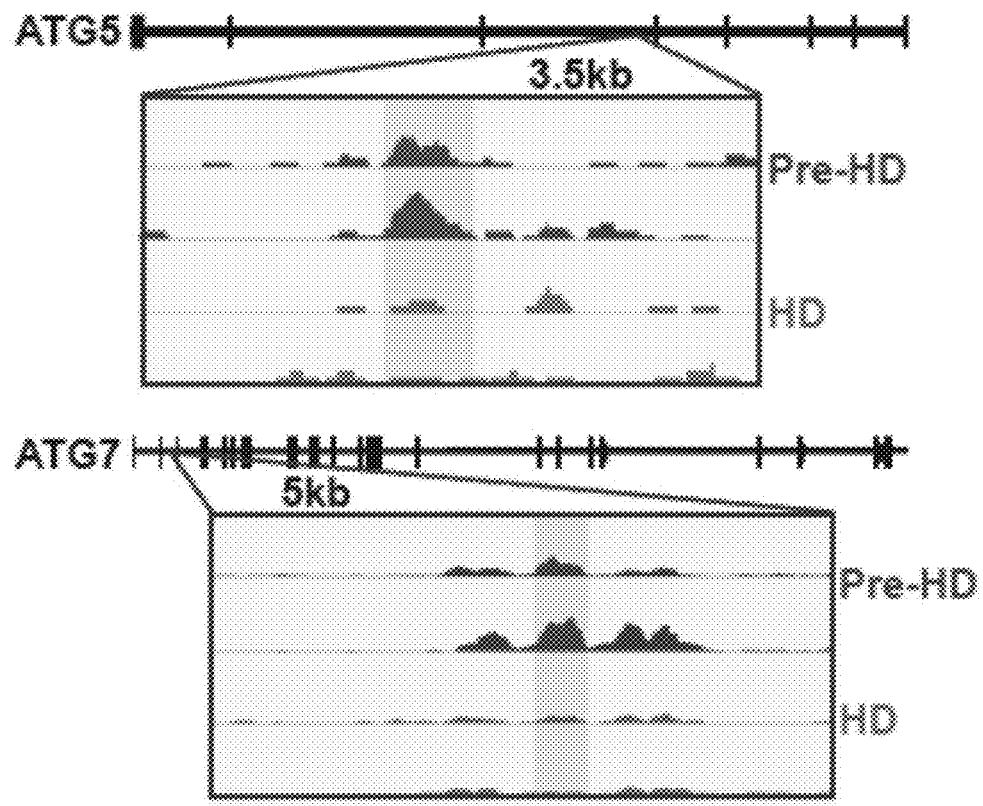
Figure 17C:
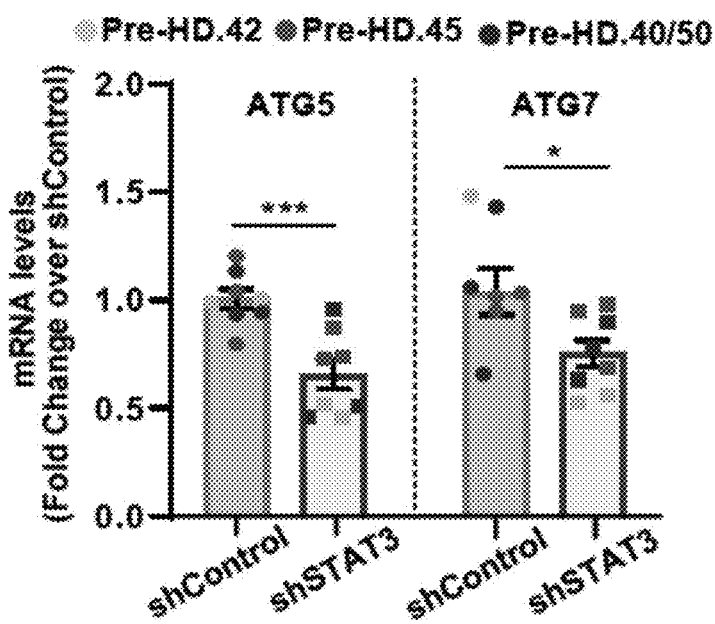
Figure 17D:
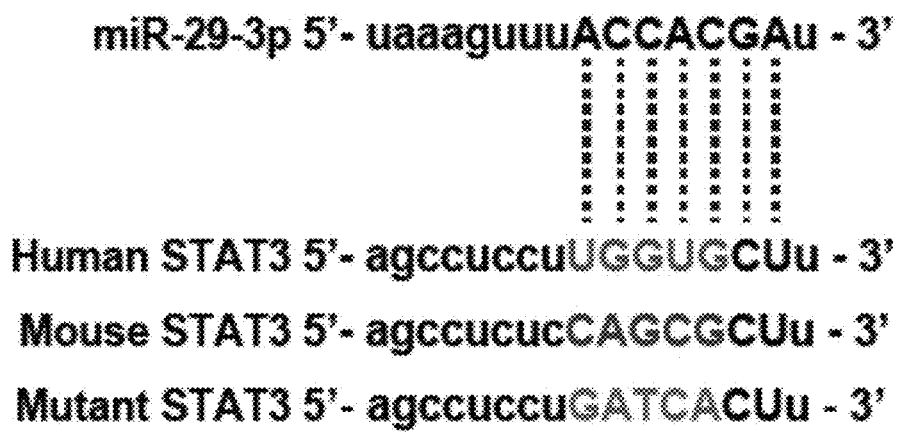
Figure 17E:
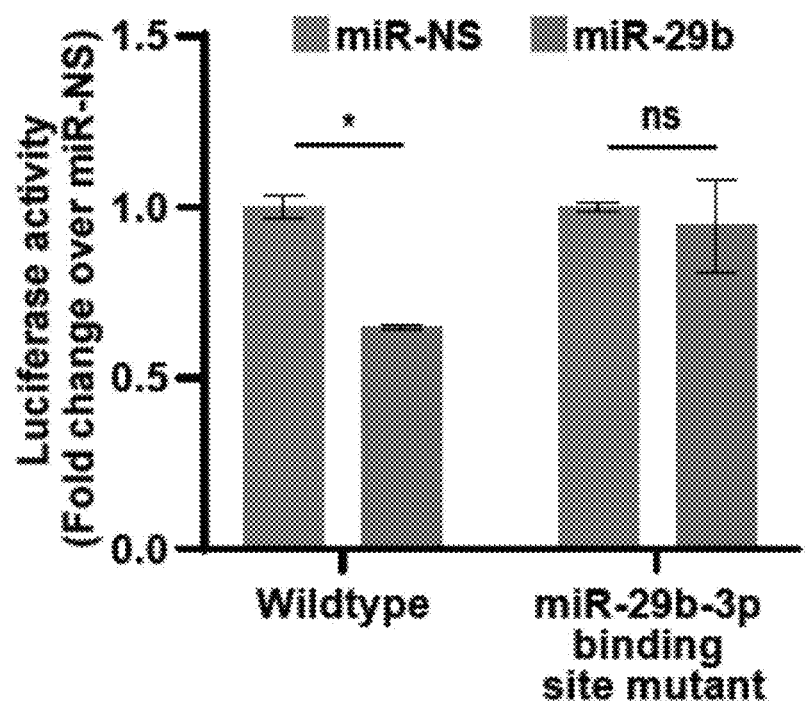
Figure 17F:
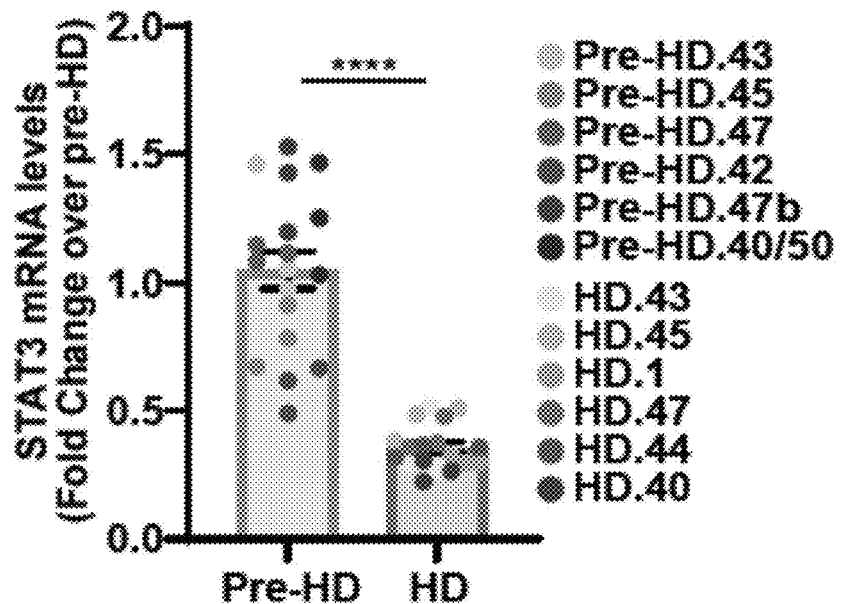
Figure 17G:
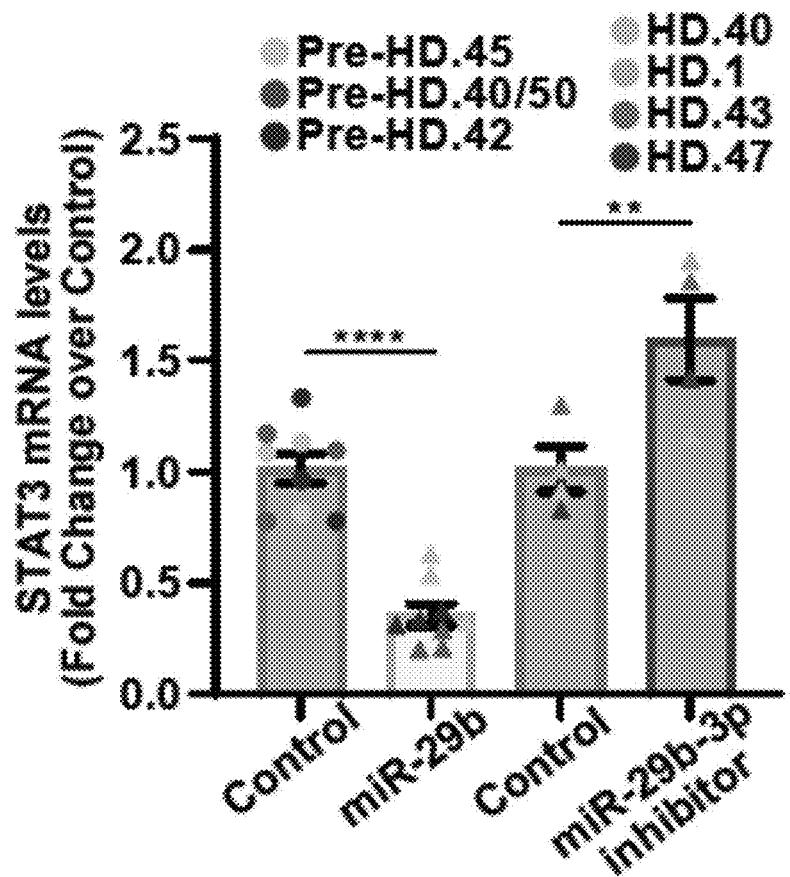
Figure 21A:
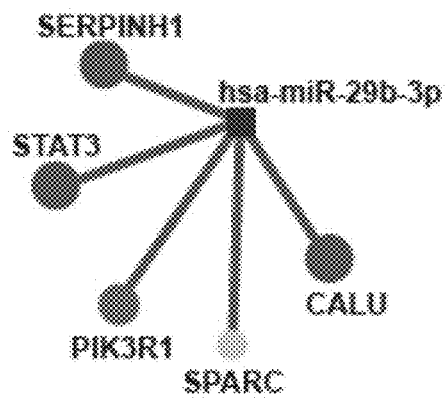
FIG. 21A-FIG. 21D. miR-29b-3p reduces autophagy via directly targeting STAT3 in HD-MSNs. (A) The target genes of miR-29b-3p functionally related to autophagy in the brown module. Visualized by NetworkAnalyst. (B) Heat map representation of ATAC-seq signal intensities at PID 21 for autophagy-related genes that contained STAT3 binding site in the close DARs in HD-MSNs (n=2-3 per each line). (C) RT-qPCR analysis for STAT3 mRNA levels of pre-HD-MSNs with shControl or shSTAT3 at PID26 (n=9 biological replicates for each; * p<0.0001 by t test; mean±SEM). (D) Western bot for STAT3 expression in human adult fibroblasts with shControl or shSTAT3.
Figure 21B:
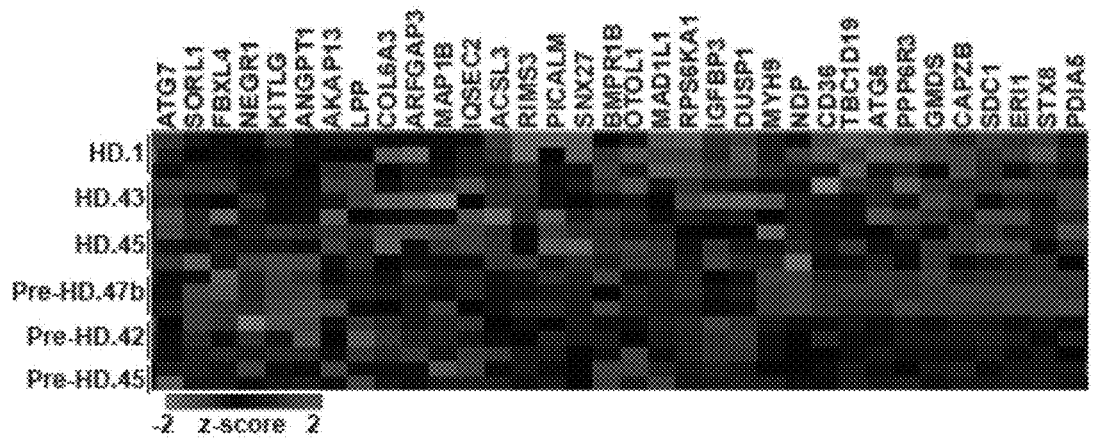

Next, it was sought to identify the critical target gene of miR-29b-3p during HD-MSN degeneration. Among the predicted target genes of miR-29b-3p in the brown module (see e.g., FIG. 21A), STAT3 was selected for several reasons. First, common sequence motifs within the chromatin regions were found to be significantly closed in HD-MSNs compared to pre-HD-MSNs, which led to the identification of consensus sequence corresponding to the binding site of STAT3 (JASPER transcription factor database) (see e.g., FIG. 17A). Second, STAT3 was identified as one of the autophagy-related hub genes in the brown module (see e.g., FIG. 15D). Finally, genes that contained STAT3 binding site in the close DARs in HD-MSNs were enriched with genes associated with autophagy (see e.g., FIG. 21B). Among genes that contained STAT3 binding sites associated with closed DARs in HD-MSNs, 23% of them were linked to autophagy (adjusted p<0.05, log 2FC≤−1), including ATG5 and ATG7 components of autophagy (see e.g., FIG. 17B). When the expression of ATG5 and ATG7 was compared after knockdown of STAT3 in pre-HD-MSNs, the expressions of ATG5 and ATG7 were significantly decreased with shSTAT3 over shControl (see e.g., FIG. 17C). Examining the 3'UTR of STAT3 revealed a seed-match sequence for miR-29b-3p in humans, which interestingly was not conserved in mice (see e.g., FIG. 17D). Using the luciferase assay in HEK293Le cells, it was found that miR-29b-3p could effectively target the 3'UTR of STAT3 and reduce the luciferase activity, whereas the targeting was abolished with point mutations in the seed-match sequence (see e.g., FIG. 17E), defining STAT3 as a direct target of miR-29b-3p. STAT3 mRNA levels were also found to be lower in multiple independent HD-MSN samples compared to pre-HD-MSNs (see e.g., FIG. 17F), while overexpressing miR-29b-3p in pre-HD-MSNs and treating HD-MSNs with miR-29b-3p inhibitor led to decreased and increased STAT3 expression, respectively (see e.g., FIG. 17G). Altogether, these results support the notion that miR-29b-3p regulates STAT3 as a direct target in HD-MSNs.

Figure 17H:
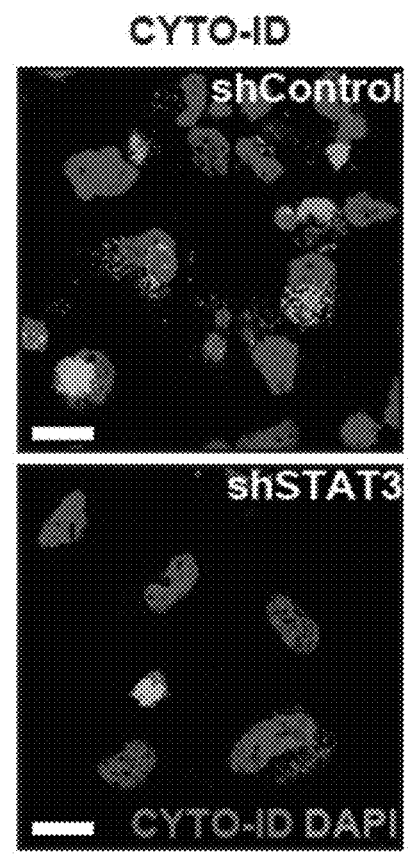
Figure 17H:
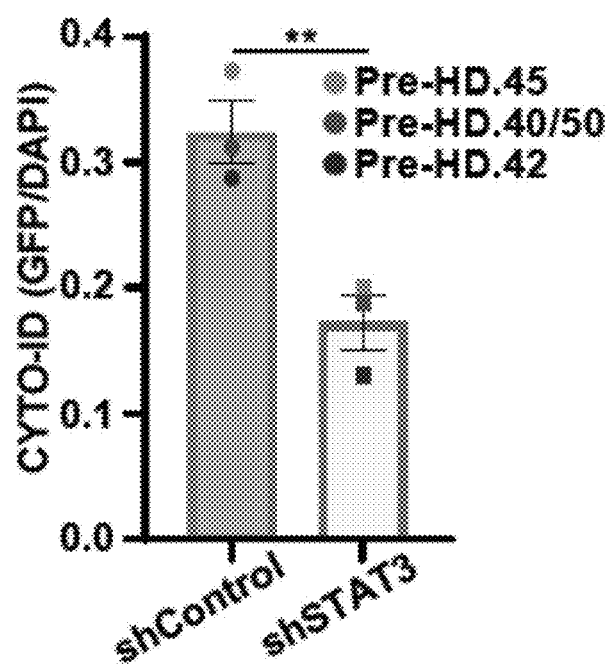
Figure 17I:
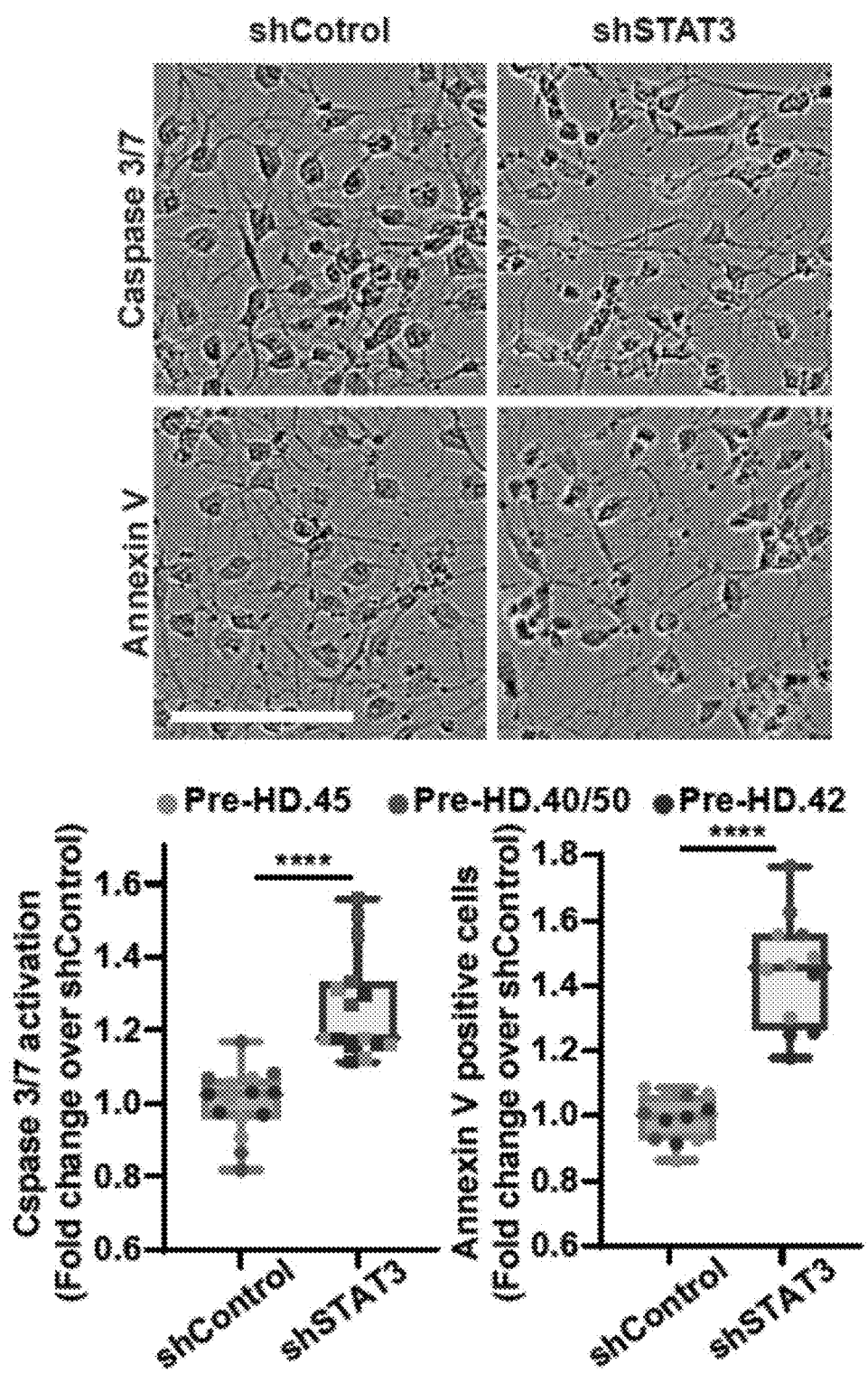
Figure 17J:
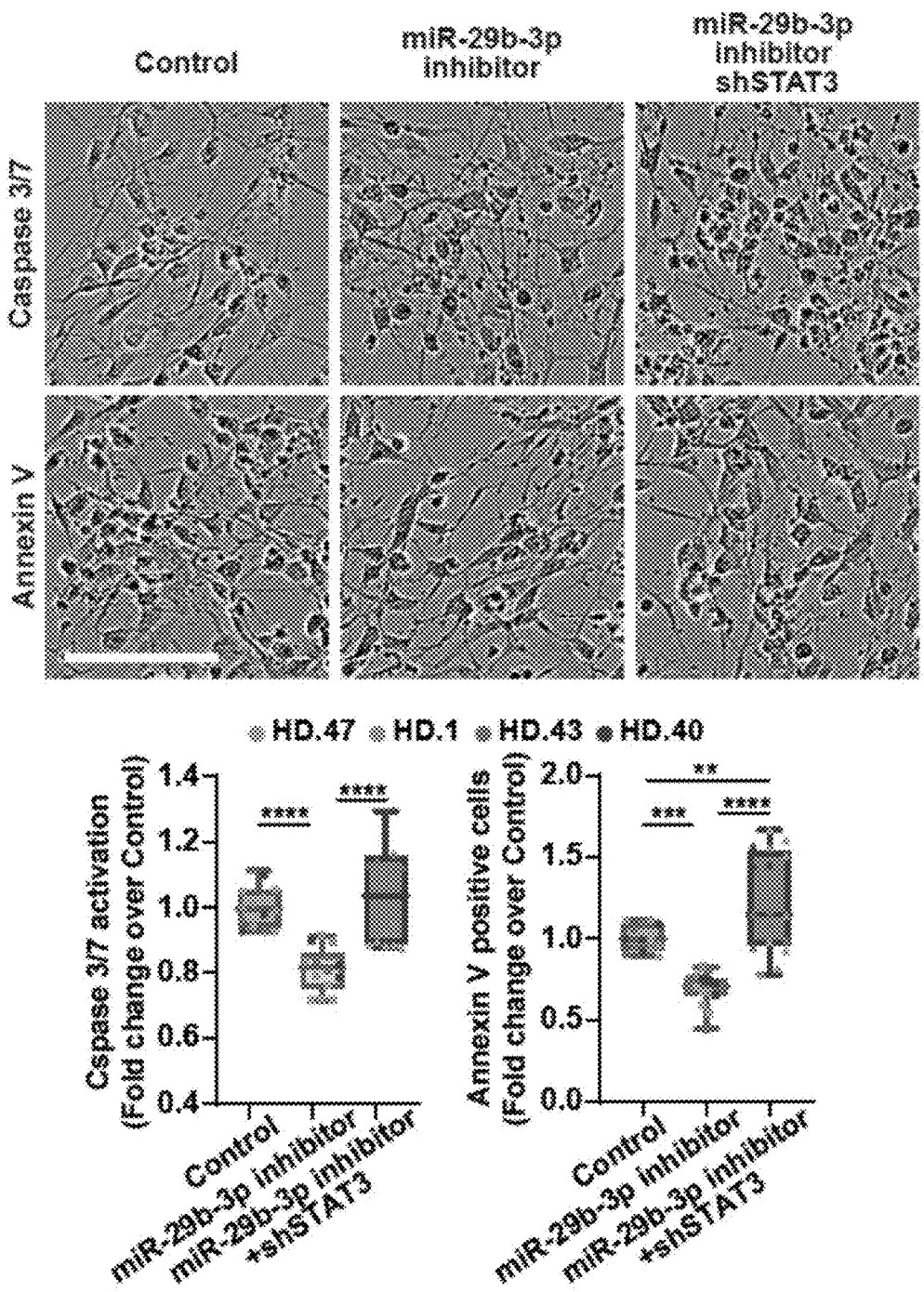
Figure 21C:
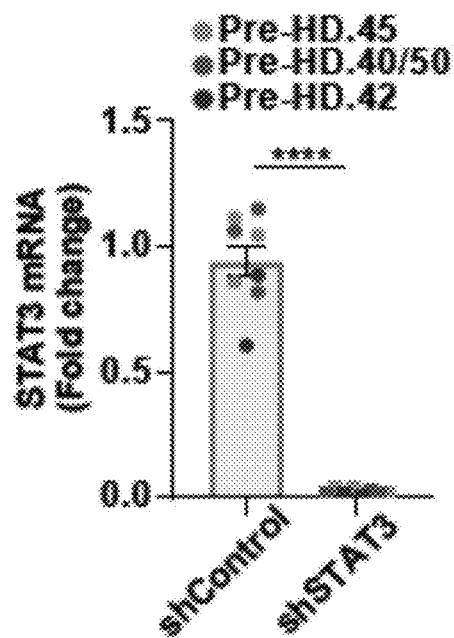
Figure 21D:

Next, it was investigated if STAT3 is involved in the regulation of autophagy activity in patient-derived MSNs. First, knocking down STAT3 in pre-HD-MSNs decreased the autophagy activity (see e.g., FIG. 17H, FIG. 21C, and FIG. 21D) and increased apoptosis of pre-HD-MSNs (see e.g., FIG. 17I). Importantly, treating HD-MSNs with miR-29b-3p inhibitor led to decreased neuronal death, while the rescue from cell death was reversed by knocking down STAT3 in the presence of miR-29b-3p inhibitor (see e.g., FIG. 17J), indicating that the interaction between miR-29b-3p and STAT3 as an integral component driving HD-MSN degeneration.

Figure 18A:
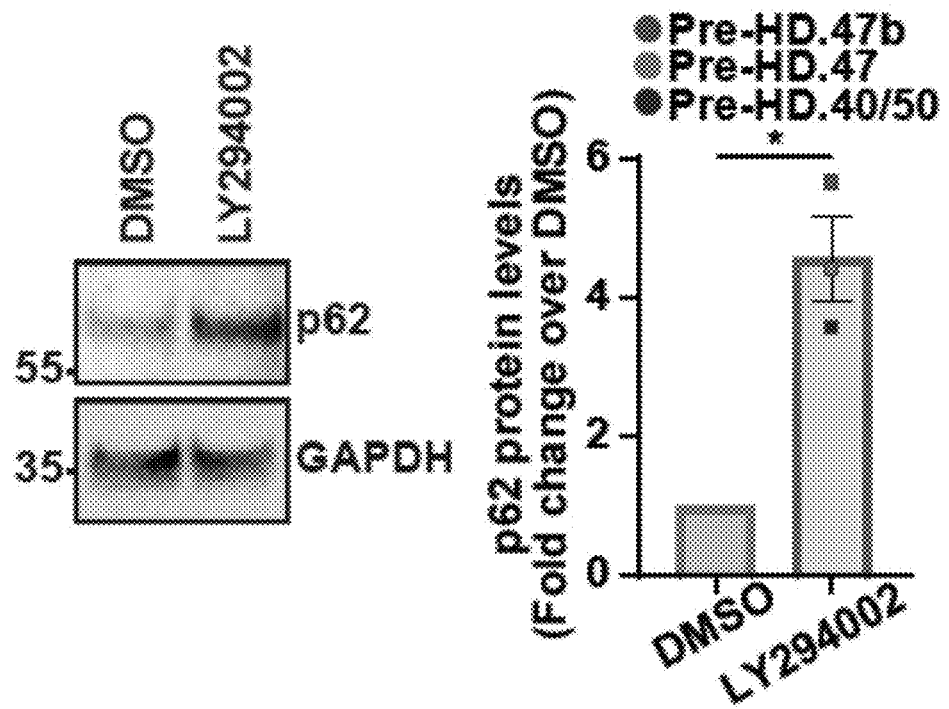
FIG. 18A-FIG. 18K. Switching the pre-onset state towards the post-onset degenerative state by autophagy inhibitor and reversing HD-MSN degeneration toward the pre-onset state by enhancing autophagy. (A, F) Immunoblot for p62 and GAPDH of pre-HD-MSNs treated DMSO or 50 μM LY294002 (A) and HD-MSNs treated DMSO or 0.5 μM G2-115 (F) at PID26. The normalized intensity was calculated from immunoblot images (n=3). The structure of G2-115 (F, top). (B, G) Autophagy measurement assay by CYTO-ID green. Pre-HD-MSNs treated DMSO or 50 μM LY294002 (B, n=11-12) and HD-MSNs treated DMSO or 0.5 μM G2-115 (G, n=12) at PID 26. (C, D, J) Neuronal cell death assay using Caspase-3/7 or Annexin V reagents in pre-HD-MSNs treated DMSO or 50 μM LY294002 at PID 26 (Caspase-3/7) or PID30 (Annexin V) (C, n=9), WT-MSNs treated DMSO or 50 μM LY294002 (D, n=6) and HD-MSNs treated DMSO or 0.5 μM G2-115 at PID 30 (J, n=9). (E, K) Representative images and quantification of the assay for HTT inclusion bodies (IBs) in pre-HD-MSNs treated DMSO or 50 µM LY294002 (E, 4 pre-HD/group; DMSO: 3947 cells, 50 µM LY294002: 4314 cells) and HD-MSNs treated DMSO or 0.5 µM G2-115 (K, 3 HD lines/group DMSO: 285 cells, 0.5 µM G2-115:325 cells) at PID30. (H) Representative images and quantification of HD.44-MSNs with the treatment of DMSO or three different concentrations (0.125, 0.25, or 0.5 UM) of G2-115 at PID 35 assayed for cell death with SYTOX green (n=4). (I) Neuronal cell death assay of HD.40-MSNs with the treatment of DMSO or three different concentrations of G2-115 at PID 30 using Caspase-3/7 or Annexin V reagents. (n=4-8). The sample size (n) corresponds to the number of biological replicates. Statistical significance was determined using unpaired t-test (A-G, J, K) one-way ANOVA with Tukey's multiple comparisons test (H, I); ** p<0.0001,  p<0.01, *p<0.05, ns, not significant. Scale bars in (B, E, H, I) 20 µm; in (C, D, K) 100 µm. Mean±s.e.m.
Figure 18B:
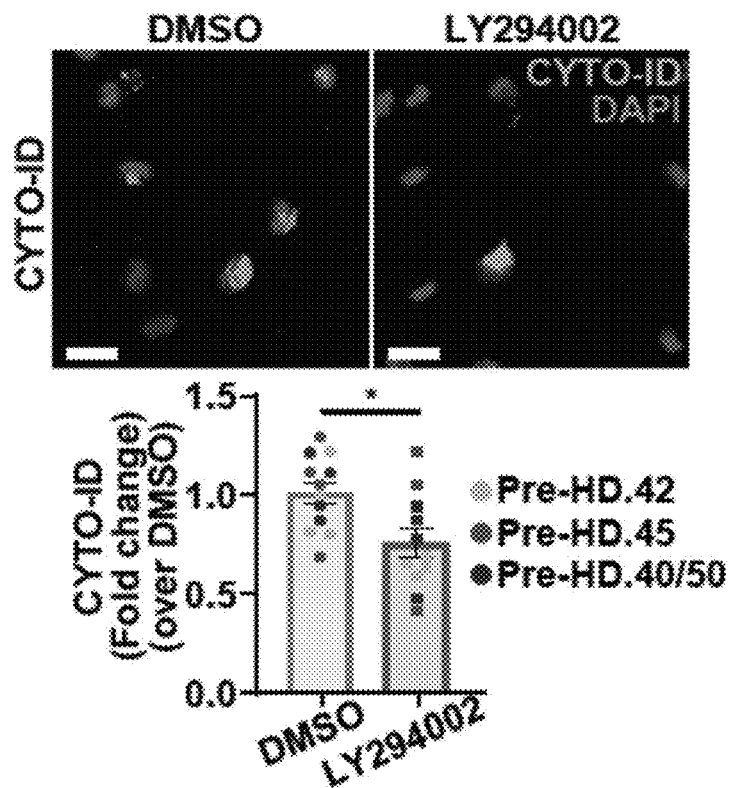
Figure 18C:
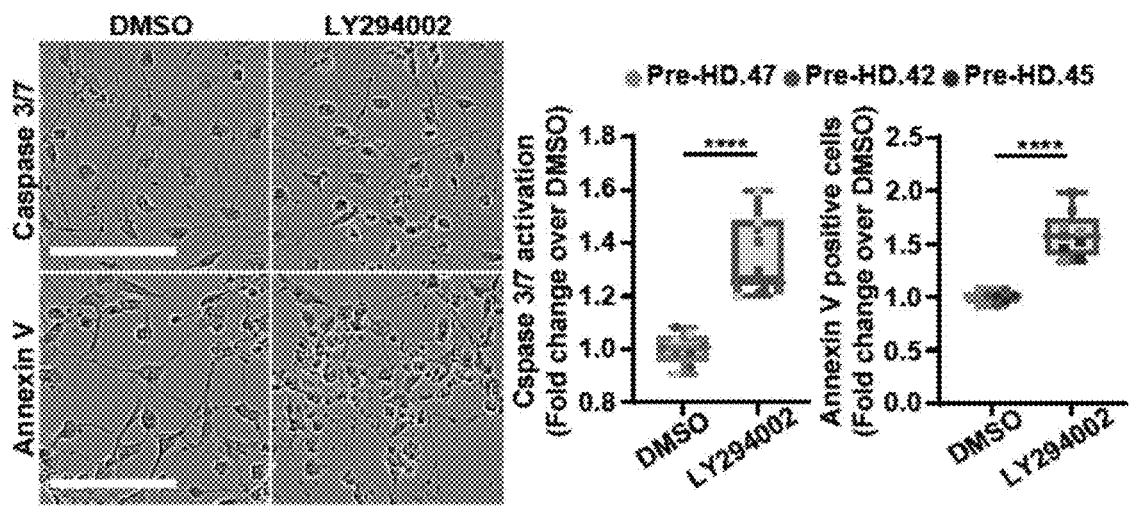
Figure 18D:
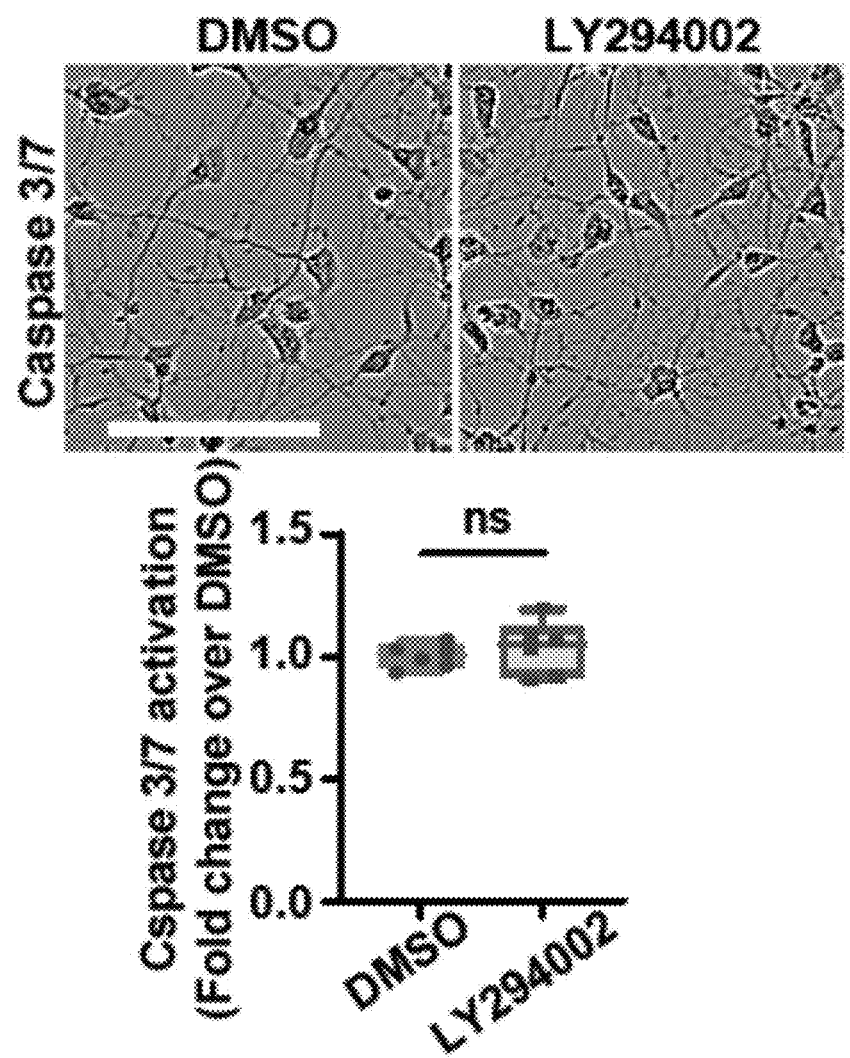
Figure 18E:
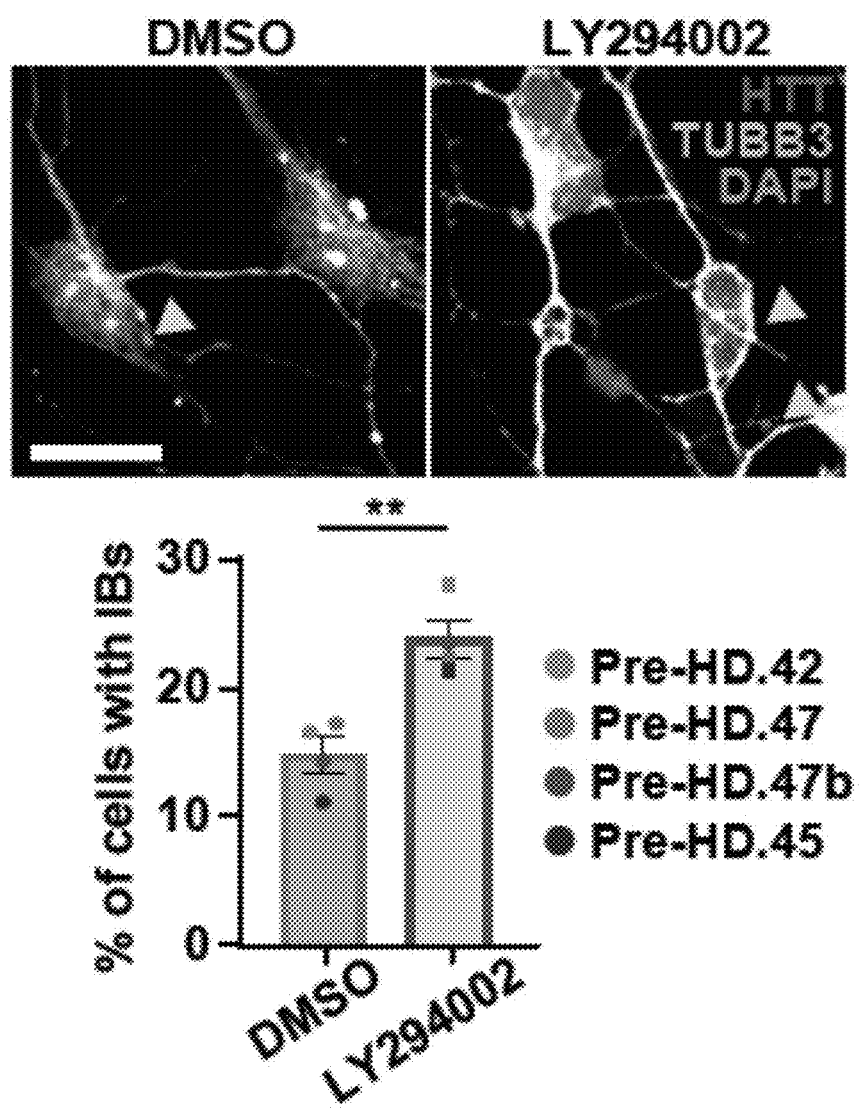
Figure 19H:
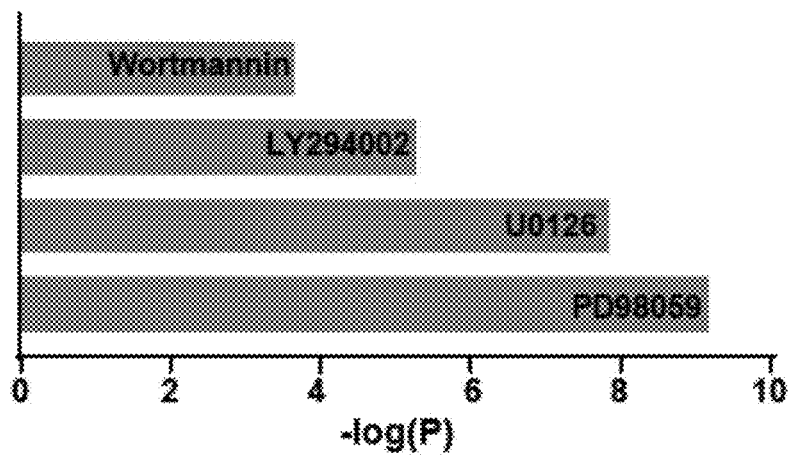
Figure 22A:
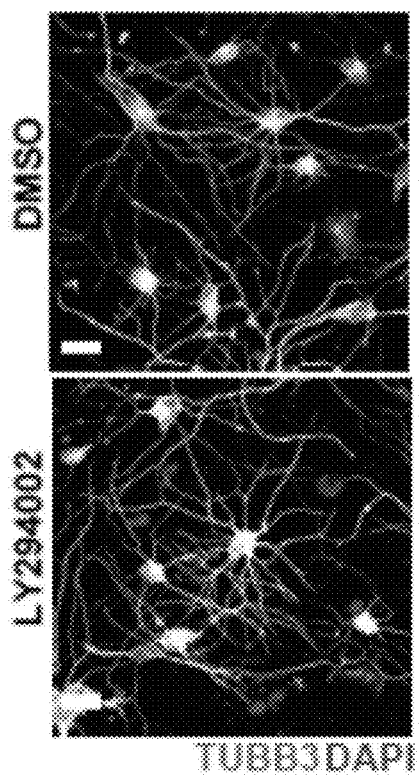
FIG. 22A-FIG. 22C. The development of new autophagy inducer, G2-115. (A) Pre-HD-MSNs with the treatment of DMSO or 50 µM LY294002 at PID 27 immunostained for TUBB3. (Scale bars, 20 µm). (B) Synthetic route for the preparation of G2-115. (C) Representative immunoblot (left) for steady state levels of α1-antitrypsin Z variant (ATZ) and β-actin in the HTO/Z cell line model of α1-antitrypsin deficiency after 24 hr treatment with DMSO alone or G2-115 in DMSO at 0.5 and 2.5 µM. The normalized intensity (right) was calculated from immunoblot images for 0.5 µM versus DMSO control (Individual data plotted, n=4 biological replicates; * p=0.003 by t-test; mean±/−s.e.m).

Switching the Pre-Onset State Towards the Post-Onset Degenerative State By an Autophagy Inhibitor To further test whether pre-HD-MSN survival would be perturbed by reducing autophagy by a small molecule, pre-HD-MSNs were treated with LY294002, a PI3K inhibitor and autophagy inhibitor (see e.g., FIG. 19H). LY294002 effectively lowered autophagy in pre-HD-MSNs evidenced by an increase of p62/SQSTM1 immunoblot signals (see e.g., FIG. 18A) and a decrease of CYTO-ID signal in reprogrammed MSNs (see e.g., FIG. 18B and FIG. 22A). Treating pre-HD-MSNs with LY294002 increased apoptotic signals (see e.g., FIG. 18C), and importantly, this effect was specific for cells with mutant HTT as treating MSNs from healthy individuals (WT-MSNs) with LY294002 did not have a significant effect on apoptosis (see e.g., FIG. 18D). Moreover, in pre-HD-MSNs from four independent patient fibroblasts, LY294002 led to a significant increase in mHTT aggregation compared to DMSO (see e.g., FIG. 18E). These results demonstrate the close link between the regulation of mHTT aggregation by autophagy and MSN degeneration where reducing autophagy pathway by small-molecule pushed the pre-HD-MSN state towards the level detected in HD-MSNs.

Figure 18F:
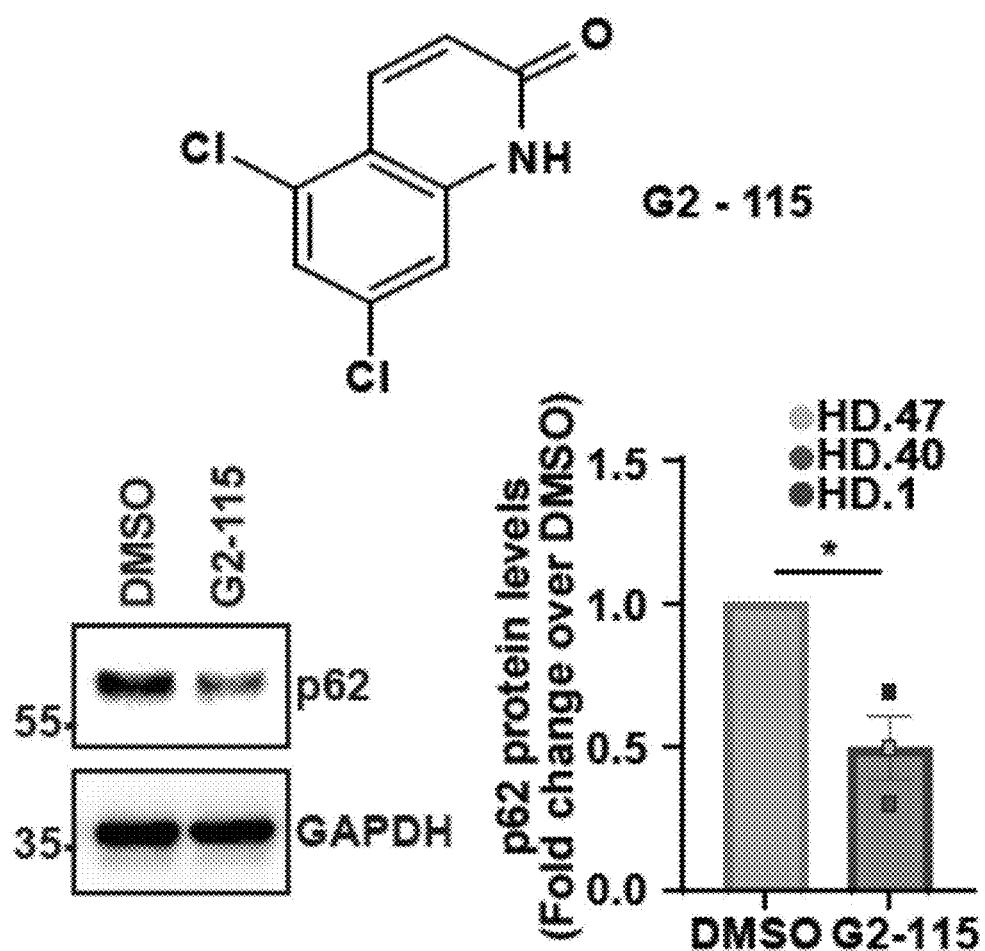
Figure 18G:
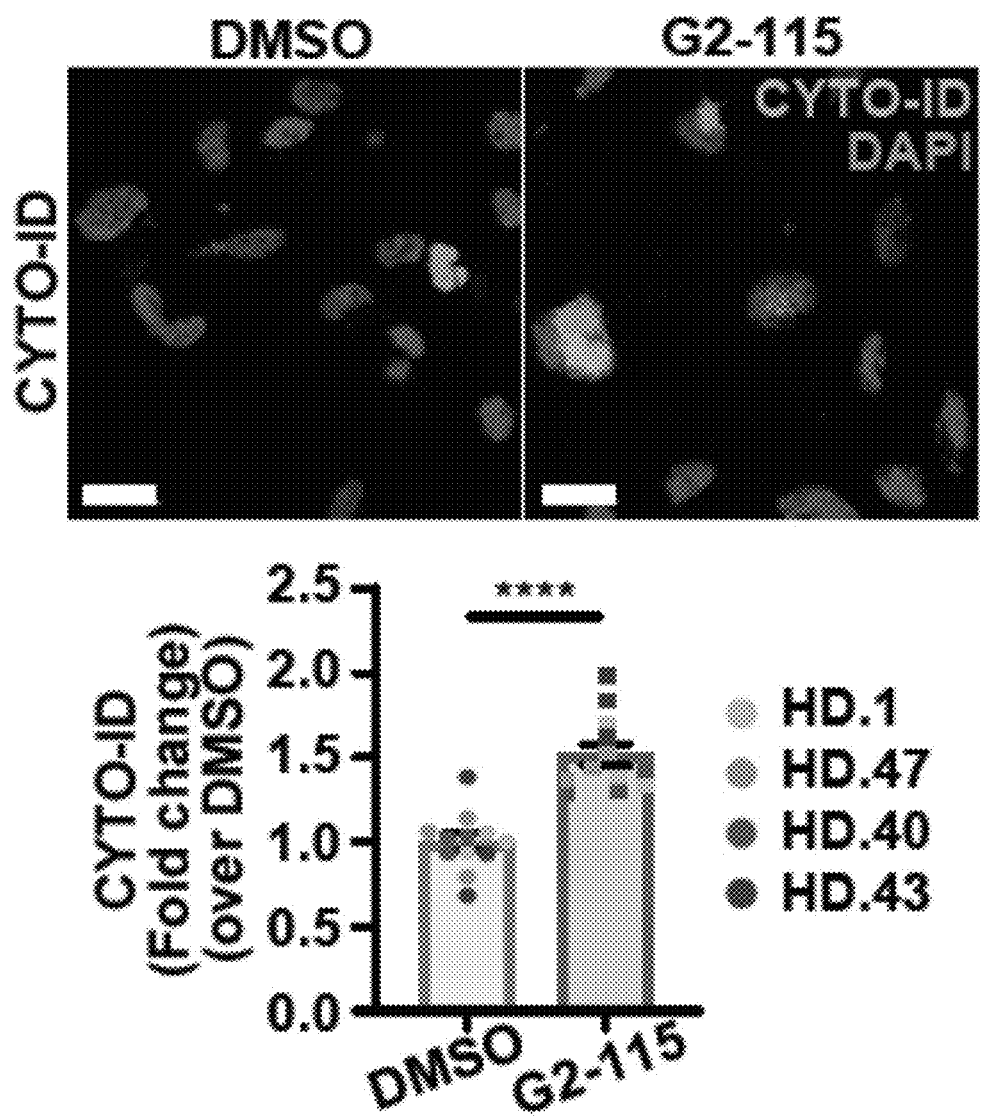
Figure 18H:
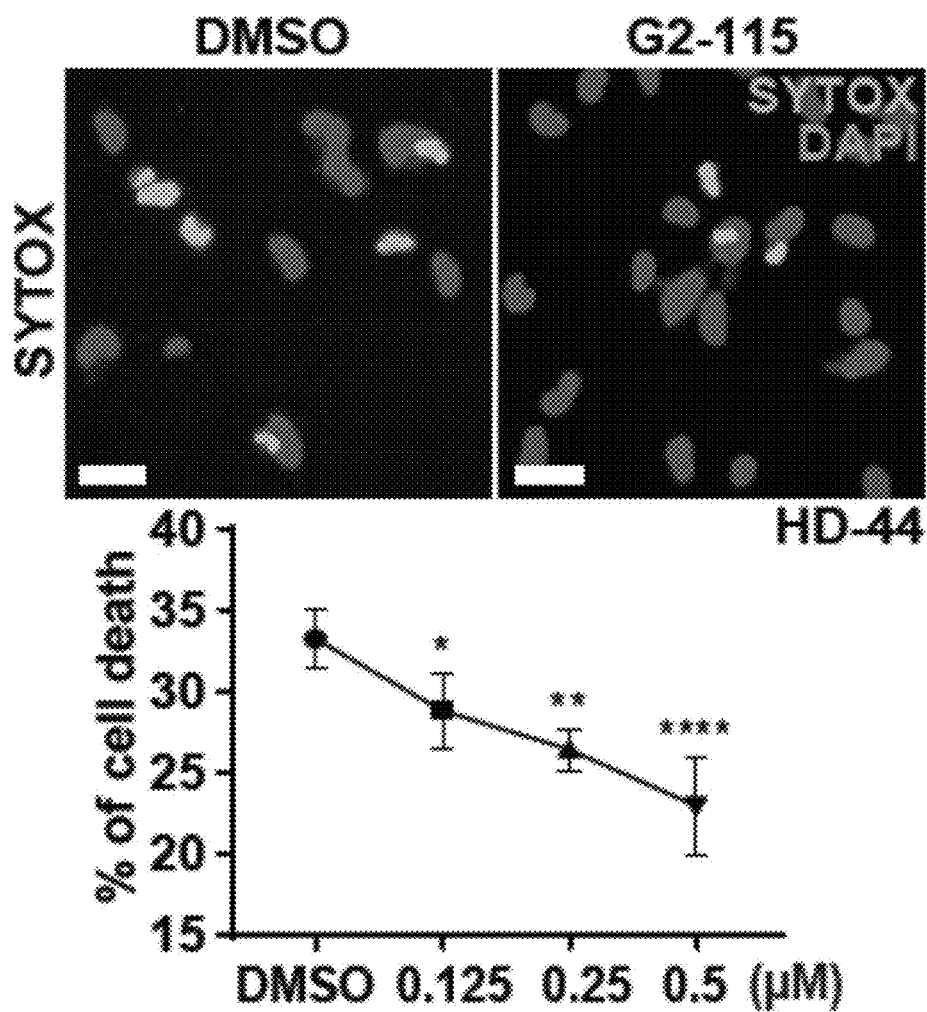
Figure 18I:
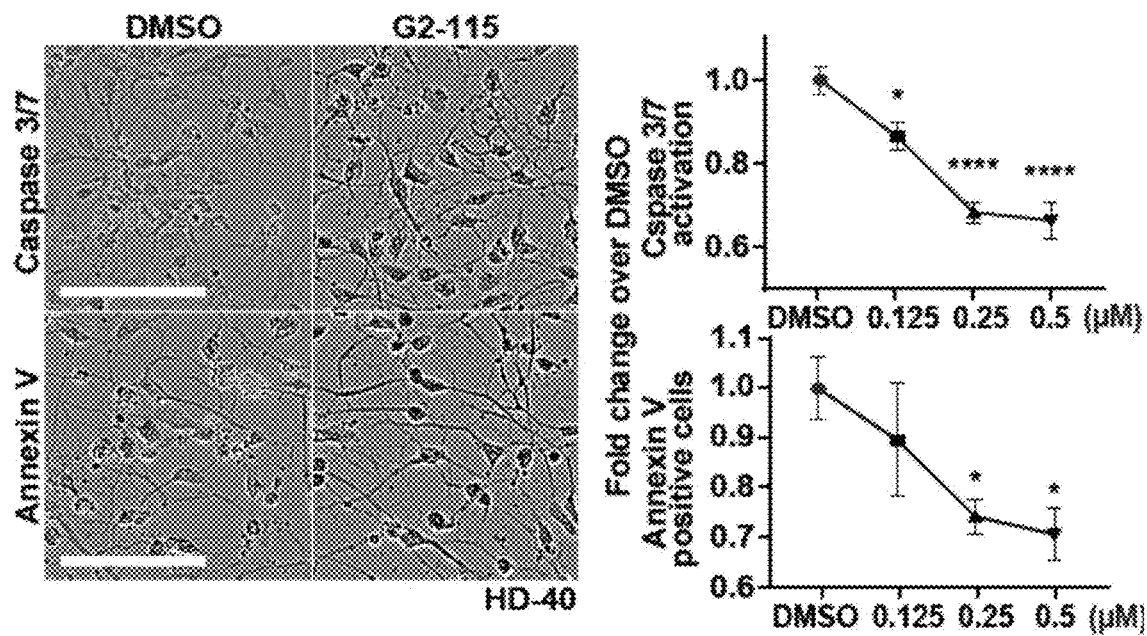
Figure 18J:
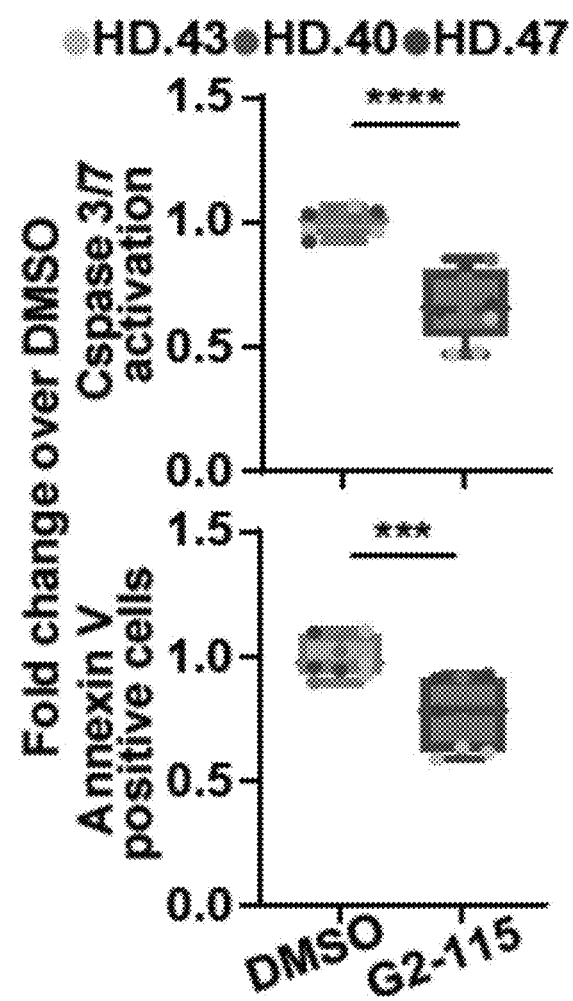
Figure 18K:
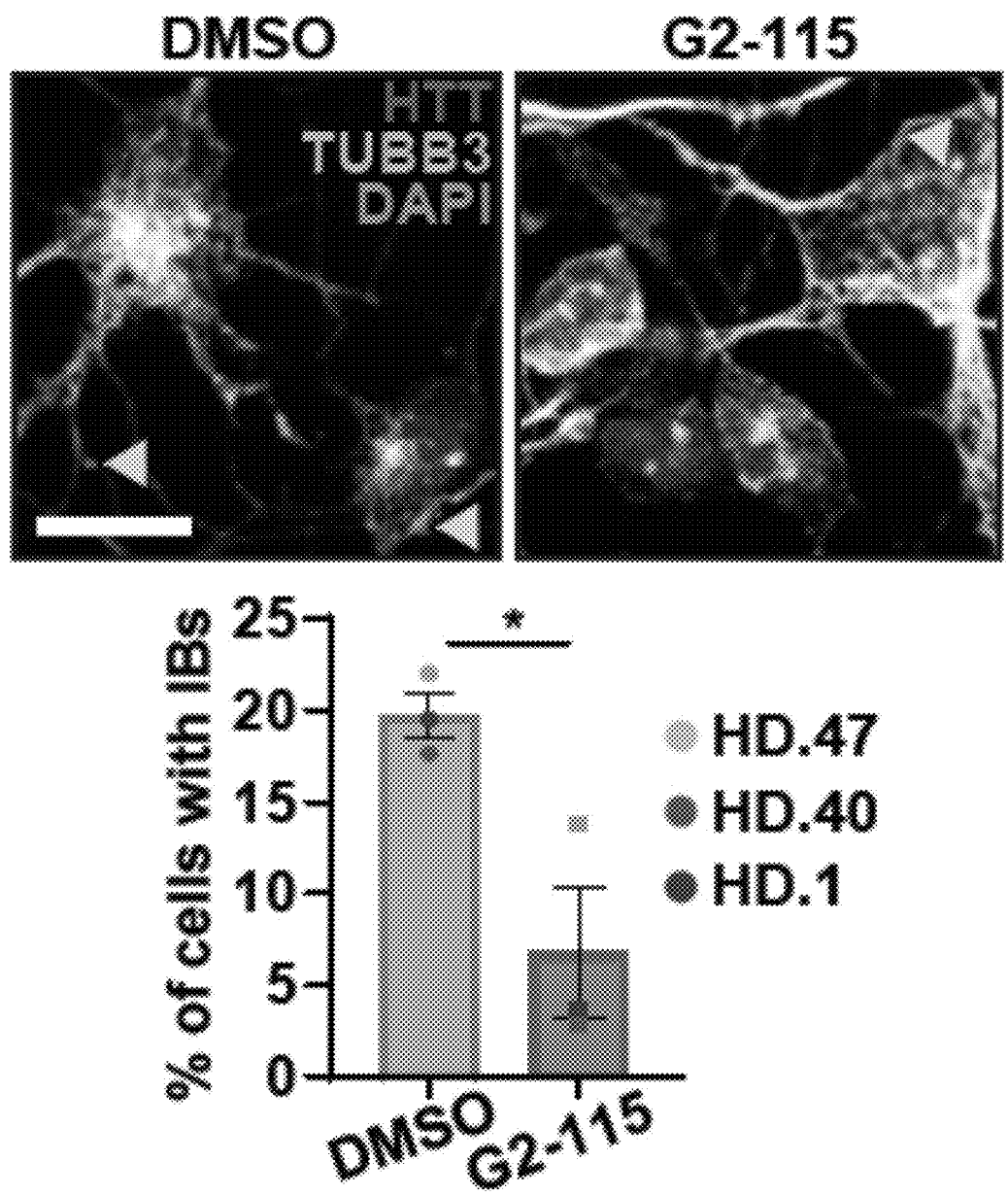
Figure 22B:
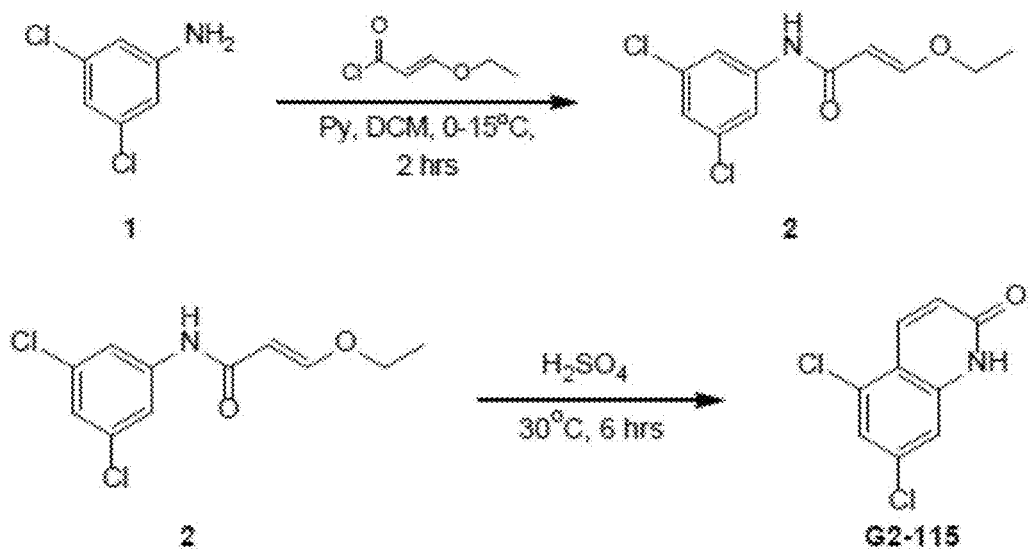
Figure 22C:
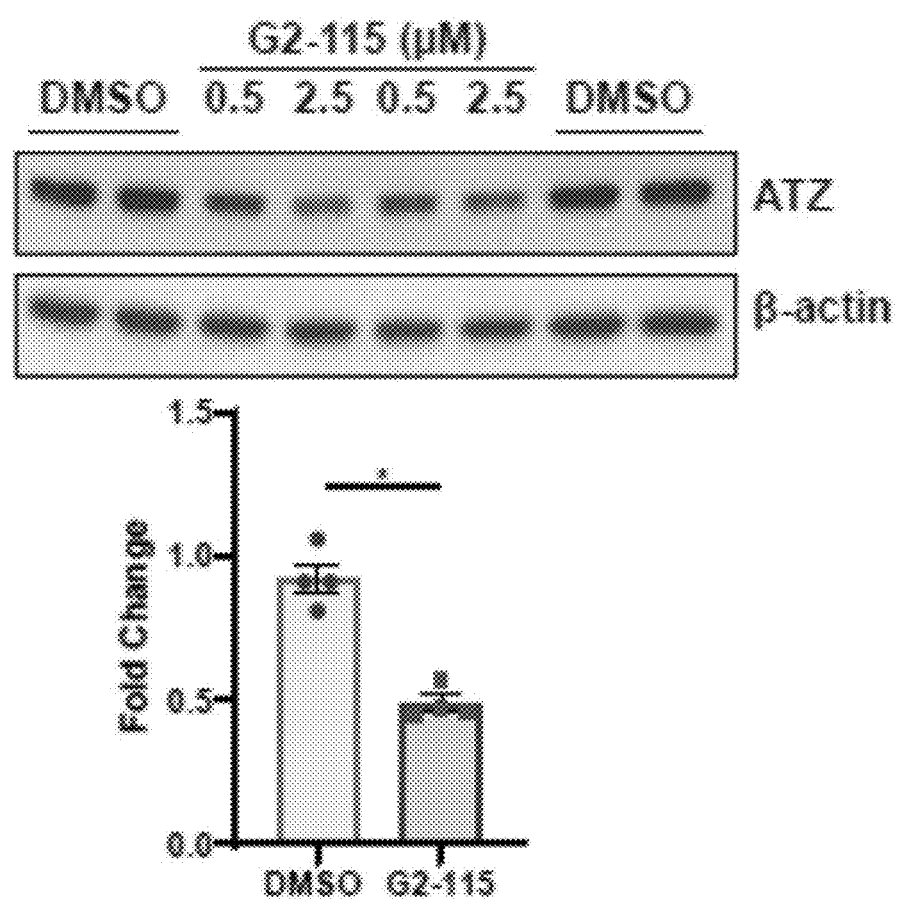

Switching the Post-Onset State Towards the Pre-Onset Degenerative State By Autophagy Activator Since pre-HD-MSNs could be shifted towards the HD-MSN degeneration by an autophagy inhibitor, next it was investigated if overriding the autophagy deficiency in HD-MSNs by a small molecule would alleviate the degeneration state in HD-MSNs toward pre-HD-MSNs. A newly developed analog of glibenclamide (GLB), a sulfonylurea drug that has been used broadly in clinics as an oral hypoglycemic agent, was used. Previously it was shown that a GLB analog, G2, promoted autophagic degradation of misfolded α1-antitrypsin Z variant (ATZ) in mammalian cell models of ATD. The new G2 analog (G2-115) described herein, designed to increase the stability of the compound (see e.g., FIG. 22B), decreased the steady-state levels of ATZ in HTO/Z cell line model of α1-antitrypsin deficiency (see e.g., FIG. 22C). It was then tested if G2-115 would elevate the autophagy activity in HD-MSNs. Treating HD-MSNs with G2-115 led to a decrease in p62/SQSTM1 protein levels measured by immunoblot assay (see e.g., FIG. 18F) and an increase in CYTO-ID signal indicative of increased autophagic vacuoles in HD-MSNs (FIG. 18G). Also, when cells were treated with G2-115 at PID14, a time point when cells undergoing miRNA-mediated conversion adopts the neuronal identity, and further treated every four days, G2-115 resulted in a significant reduction in MSN death in a dose-dependent manner, measured by SYTOX (see e.g., FIG. 18H), and Caspase 3/7 activation and Annexin V signals in HD-MSNs (see e.g., FIG. 18I), as further confirmed in HD-MSNs from three independent patients (see e.g., FIG. 18J). It was then investigated if the induction of autophagy activity by G2-115 treatment would reduce mHTT aggregation. Treating HD-MSNs from three independent patients with G2-115 led to significantly lower levels of mHTT aggregation compared to DMSO treatment (see e.g., FIG. 18K). These results collectively demonstrate the potential of alleviating the degenerative state towards the pre-onset stage by enhancing autophagy in HD-MSNs.

DISCUSSION

HD is an adult-onset disorder in most HD cases. Yet, age-associated pathways that contribute to the onset of HD pathology in patients have remained largely elusive. Elucidating such pathways especially in the spectrum of human lifespan has been a challenging task due to the inability to model the progression of HD pathology with patient neurons. As described herein, directly reprogrammed MSNs from pre-symptomatic and symptomatic stages of HD were used to understand differences in cell-intrinsic properties that render HD-MSNs to be more vulnerable to degeneration than the pre-symptomatic counterpart. Given that the microRNA-mediated neuronal reprogramming occurs through step-wise processes of fibroblast fate erasure and adoption of the neuronal identity in sequence, detecting differences in genetic networks when cells acquired the MSN identity offered experimental means to dissect gene expression and chromatin landscape changes in directly reprogrammed MSNs from different disease stages.

The identification of reduced autophagy activities in symptomatic HD-MSNs associated with transcriptome and chromatin changes revealed the miR-29b-3p-STAT3 axis as one of the main drivers of HD-MSN apoptosis linked to reduced autophagy. The role of autophagy in clearing mHTT aggregates has been recently shown by the discovery of Beclin1, and autophagy-related FYVE protein (ALFY) function in modifying the amount of mHTT aggregation. These results demonstrate the feasibility to enhance autophagy and rescue HD-MSNs from degeneration by repressing miR-29b-3p or pharmacologically as a potential future therapeutic to increase MSN resilience against the mHTT-271 induced toxicity. Interestingly, the 3'UTR of STAT3 contains a seed-match sequence for miR-29b-3p in humans, not conserved in mice. Given the results that highlight the importance of STAT3 function in maintaining autophagy function, future work should be directed to define the specificity of miR-29b-3p-STAT3 interaction in different neuronal subtypes (including subtypes not affected by HD), which will provide insightful information of the differential vulnerability to neuronal death among various neuronal subtypes. Moreover, these findings demonstrating the importance of microRNA-target interaction that may be unique to humans lend further support to patient cell-based modeling platforms.

Because miRNAs usually target not only a single gene, but also multiple components of related pathways, the discovery of microRNAs as important modulators for disease pathology has expanded therapeutic opportunities for oligonucleotides including potential drugs in clinical development including, for instance, Miragen MRG-201, a miR-29 mimic, in a phase 2 study to treat keloid and scar tissue formation. Based on the results shown for HD neurons, however, miRNA antagonist approaches will be required to mitigate the effect of the age-associated increase in miR-29b-3p, as detected in both reprogrammed MSNs and aged human brains.

Activation of autophagy can successfully lower mHTT aggregations in various model systems. However, the protective effect of autophagy on patient neurons has remained poorly understood. Previous studies have shown the potential of STAT3 as a regulator of autophagy activity via the transcriptional regulation of several autophagy-related genes. Herein is provided evidence that STAT3 plays a critical role in checking the neurodegeneration in pre-HD-MSNs through maintaining the autophagy activity. Based on these findings, further investigations into the use of autophagy enhancer compounds such as the G2 analog (G2-115) may eventually offer an effective therapeutic tool that could increase the resilience of MSNs against neurodegeneration in HD. Although the molecular target of drug action for the G2 analog is not known, the data herein provides proof-in-principle that the age-associated decline of autophagy in patient MSNs can be countered and alleviated by pharmacological interventions.

Methods

Plasmids, shRNA, and Lentiviral Preparation

The construction of all plasmids used in this study has been previously described, and they are publicly available at Addgene as pTight-9-124-BclxL (#60857), rtTA-N144 (#66810), pmCTIP2-N106 (#66808), phMYT1L-N174 (#66809), phDLX1-N174 (#60859), phDLX2-N174 (#60860). Lentiviral human STAT3 shRNAs (TRCN0000329887) were obtained from Sigma. For the overexpression of miR-29b-3p, the miRNA-29b-1 genomic sequence was cloned and ligated into the pLemir-turboRFP vector. For luciferase assay, full-length 3'UTR of STAT3 transcripts and 3'UTR mutagenizing miR-29b-3p target sites were cloned and ligated into pmirGLO vector. Lentiviral production was carried out separately for each plasmid, but they were transduced together as a single cocktail as previously described. Briefly, the supernatant was collected 72h after transfection of Lenti-X 293LE cells (Clontech) with each plasmid, in addition to psPAX2 and pMD2.G (Addgene), using polyethyleneimine (Polysciences). Collected lentiviruses were filtered through 0.45 μm PES membranes and the Lenti-X concentrator (Clontech #631232) was added to concentrate the virus 10-fold. After lentiviruses were incubated overnight with the reagent and resuspended in 1/10 of the original volume with 1×PBS, they were spun at 1,500 g spin. In centrifuge tubes, 7 ml of 20% sucrose cushion solution was added, and the resuspended lentiviruses overlay sucrose solution was concentrated at 70,000 g for 2 hr at 4° C. Viral pellets were resuspended in 10% sucrose solution and stored at −80° C. until transduction.

Cell Line and MicroRNA-Mediated Neuronal Reprogramming

Adult dermal fibroblasts from symptomatic HD patients (Coriell NINDS and NIGMS Repositories: ND33947, ND30013, GM02173, GM04230, GM04198, GM02147), presymptomatic HD patients (GM04717, GM04861, GM04855, GM04831, GM04857, GM04829), and healthy controls (GM02171) were acquired from the Coriell Institute for Medical Research. The lentiviral cocktail of rtTA, pTight-9-124-BclxL, CTIP2, MYT1L, DLX1, and DLX2 was added to human fibroblasts for 16 h, then cells were washed and fed with fibroblasts media containing 1 μg/mL doxycycline (DOX). Briefly, transduced fibroblasts were maintained in fibroblasts media for two days with doxycycline before selection with Puromycin (3 mg/ml) on day 3, then were plated onto poly-ornithine, fibronectin, and laminin-coated coverslips on day 5. Cells were subsequently maintained in NeurobasalA (Gibco) media containing B-27 plus supplement and GlutaMAX supplemented with valproic acid (1 mM), dibutyryl cAMP (200 mM), BDNF (10 ng/ml), NT-3 (10 ng/ml), and RA (1 mM) until day 13. On day 14, the cells were half-fed using BrainPhys (Stemcell) containing NeuroCult SM1 neuronal supplement and N2 supplement-A until analysis. Doxing and half-feeding cycles were repeated every 4 days so that cells were either doxed or half-fed every 2 days. On day 6, Blasticidin was added to a final concentration of 3 µg/µL, G418 to a final concentration of 300 µg/µL, and Puromycin to a final concentration of 3 µg/µL. Puromycin was continuously added only in half-feedings until day 30.

SYTOX Assay 0.1 µM SYTOX gene nucleic acid stain (Invitrogen, S7020) and 1 µl/mL of Hoeschst 33342 (Thermo Scientific, 66249) were added into cell medium. Samples were incubated for at least 15 mins at 37° C. prior to imaging. Images were taken using Leica DMI 4000B inverted microscope with Leica Application Suite (LAS) Advanced Fluorescence.

Apoptosis Assay in Live Cells

Cells were treated with 1× Essen Bioscience IncuCyte® Caspase-3/7 Green Reagent (final concentration 5 UM) and 1× Essen Bioscience IncuCyte® Annexin V Green or Red Reagent on day 22 or 26. Image scheduling, collection, and analysis were conducted with the IncuCyte® S3 LiveCell Analysis System and IncuCyte S3 v2017A software. Treated plates were imaged every two hours for 7 days. At each timepoint, over 2 images were taken per well in brightfield, FITC, and TRITC channels. Images were analyzed for the number of green or red objects per well. For the apoptotic index, the number of green or red objects (i.n., fluorescence cells) divided by phase area (µm2) per well was quantified by the IncuCyte® S3 Live-Cell Analysis System.

Antibodies

Primary antibodies used for immunostaining and immunoblot included rabbit anti-MAP2 (CST, #4542), mouse anti-tubulin β III (Covance, MMS-435P), rabbit anti-tubulin β III (Covance, PRB-435P-100), rabbit anti-p62/SQSTM1 (Abcam, ab109012), rabbit anti-GAPDH (Santa Cruz, sc-32233), rabbit anti-DARPP-32 (19A3) (CST, #2306) antibodies. The secondary antibodies for immunostaining included goat anti-rabbit, mouse, or chicken IgG conjugated with Alexa-488, -594, or -647 (Thermo Fisher Scientific).

Immunostaining Analysis

Reprogramming cells were fixed with 4% paraformaldehyde (Electron Microscopy Sciences, #15710) for 20 min at room temperature (RT), and then permeabilized with 0.2% Triton X-100 for 10 min at RT. Cells were blocked with 5% BSA and 1% goat serum in PBS and incubated with primary antibodies at 4° C. overnight, then incubated with secondary antibodies for 1 hr at RT. Cells were incubated with DAPI (Sigma, D-9542) for 5 minutes followed by washing with PBS. Images were captured using a Leica SP5X white light laser confocal system with Leica Application Suite (LAS) Advanced Fluorescence 2.7.3.9723.

Immunoblot Analysis

Cells were lysed in a 2% SDS buffer. The concentrations of whole-cell lysates were measured using the Pierce BCA protein assay kit (Thermo Scientific, #23227). Equal amounts of whole-cell lysates were resolved by SDS-PAGE and transferred to a nitrocellulose membrane (GE Healthcare Life Sciences, #10600006) using a transfer apparatus according to the manufacturer's protocols (Bio-rad). After incubation with 5% BSA in TBS containing 0.1% Tween-20 (TBST) for 1 hr, the 483 membrane was incubated with primary antibodies at 4° C. overnight. Following incubation, membranes were incubated with a horseradish peroxidase-conjugated anti-mouse or anti-rabbit antibody for 30 min.

Blots were developed with the ECL system (Thermo Scientific, #34080) according to the manufacturer's protocols.

RNA Preparations and RT-qPCR

Total RNA from reprogramming cells at indicated day was extracted using RNeasy Micro Kit (Qiagen) or TRIzol Reagent (Invitrogen, 15596026). Reverse transcription was performed using the SuperScript III first strand synthesis system for RT-PCR (Invitrogen, 18080-051) according to the manufacturer's protocol. Quantitative PCR was performed using SYBR Green PCR master mix (Applied Biosystems, 4309155) and StepOnePlus Real-Time PCR system (Applied Biosystems, 4376600) according to the manufacturer's protocol against target genes. Quantitative PCR analysis was done with the following primers: STAT3; 5'-CTTTGAGACCGAGGTGTATCACC-3' (SEQ ID NO: 1) and 5'-GGTCAGCATGTTGTACCACAGG-3' (SEQ ID NO: 2), DARPP-32; 5'-CCAAGGACCGCAAGAAGAT-3' (SEQ ID NO: 3) and 5'-CTCCTCTGGTGAGGAGTGCT-3' (SEQ ID NO: 4), GAPDH; 5'-ATGTTCGTCATGGGTGT-GAA-3' (SEQ ID NO: 5) and 5'-TGTGGTCAT-GAGTCCTTCCA-3' (SEQ ID NO: 6). For the verification of mature miRNA-29b-3p, the TaqMan probes for miR-29b-3p and miR-361-5p were purchased from Life Technologies.

Luciferase Assay

HEK 293 cells plated in a 96-well plate were transfected with 100 ng of pSilencer-miRNA, 100 ng of pmirGLO containing 3'UTR of interest, and PEI (Polysciences, 24765) with Opti-MEM (Life Technologies, 31985). Forty-eight hours after transfection, luciferase activity was assayed using Dual-Glo luciferase assay system (Promega, E2920) according to the manufacturer's protocol using Synergy H1 Hybrid plate reader (BioTek). Luciferase activity was obtained by normalizing firefly luminescence to *renilla* luminescence (luciferase activity=firefly/*renilla*) followed by normalizing to respective pSilencer-miR-NS control.

RNA Sequencing

Samples were submitted to the Genome Access Technology Center at Washington University for library preparation and sequencing. Samples were prepared according to the library kit manufacturer's protocol, indexed, pooled, and sequenced on an Illumina HiSeq. Basecalls and demultiplexing were performed with Illumina's bcl2fastq software and a custom python demultiplexing program with a maximum of one mismatch in the indexing read. RNA seq reads were then aligned to the Ensembl release 76 primary assemblies with STAR version 2.5.1a1. Gene counts were derived from the number of uniquely aligned unambiguous reads by Subread: feature Count version 1.4.6-p52. Isoform expression of known Ensembl transcripts was estimated with Salmon version 0.8.23. Sequencing performance was assessed for the total number of aligned reads, the total number of uniquely aligned reads, and features detected. The ribosomal fraction, known junction saturation, and read distribution over known gene models were quantified with RSeQC version 2.6.24.

Coexpression Network Analysis.

Coexpression network analysis was performed in R using the WGCNA package. To identify gene modules associated with different conditions including the disease stage, age, or gender, a signed consensus network was created by calculating component-wise minimum values for topological overlap. GO enrichment analysis was performed by Enrichr. Enriched biological process terms ($P<0.05$) were visualized by using REVIGO in semantic space as cluster representatives, after reduction of the redundant terms.

Omni-ATAC-Sequencing Preparation

Omni-ATAC was performed as outlined previously. In brief, each sample was treated with DNase for 30 minutes prior to collection. Approximately 50,000 cells were collected for library preparation. Transposition reaction was completed with Nextera Tn5 Transposase (Illumina Tagment DNA Enzyme and Buffer Kit, Illumina) for 30 minutes at 37° C. and library fragments were amplified under optimal amplification conditions. Final libraries were purified by the DNA Clean & Concentrator 5 Kit (Zymo, USA). Libraries were sequenced on Illumina NovaSeq 6000 (Genome Technology Access Center at Washington University in St. Louis).

ATAC-Seq Analyses

ATAC-seq analysis was performed as previously described. Briefly, ATAC-seq reads were aligned to hg38 human genome assembly using bowtie2, and uniquely mapped reads were used for downstream analysis. Peaks for each sample were called using Homer findPeaks and combined altogether to make the own reference map for further differential analysis. Differential peaks were identified using DEseq2 with a cut-off of |log 2FC|≥0.5 and adjust p-value<0.05 and regarded as peaks gained or lost. Gained peaks in HD-MSNs were combined and defined as open chromatin regions. Conversely, all lost peaks in HD-MSNs were defined as closed chromatin regions. Genes were annotated nearest to open or closed regions by using Homer and compared with DEGs of RNA-seq data (adjusted $p<0.05$, $\log_2 FC \leq -0.5$ or log $2FC \geq 0.5$).

Synthetic Route for the Preparation of G2-115

Preparation of intermediate 2. To a solution of 3,5-dichloroaniline (2 g, 12.34 mmol, 1 eq.) in DCM (30 mL) was added pyridine (3.42 g, 43.21 mmol, 3.5 eq.) and 3-ethoxyprop-2-enoyl chloride (1.99 g, 14.81 mmol, 1.2 eq.) at 0° C. The mixture was stirred at 15° C. for 2 hr. The reaction mixture was quenched by aqueous HCl (1M, 10 mL) and extracted with DCM (30 mL×3). The combined organic layers were washed with 550 aq. sat. $NaHCO_3$ (15 mL), dried over $Na_2SO_4$, filtered and concentrated to give (E)-N-(3,5-dichlorophenyl)-3-ethoxy-prop-2-enamide 2 (3.1 g, crude) as a yellow solid. ESI [M+H]=260.0

Preparation of G2-115. A mixture of 2 (1.5 g, 5.77 mmol, 1 eq.) in sulfuric acid (15 mL, 98% purity) was stirred at 30° C. for 6 hr. The reaction mixture was poured into ice water (30 mL) and filtered. The filter cake was triturated with MeOH (8 mL×3) and the filter cake was dried to give 5,7-dichloro-1H-quinolin-2-one G2-115 (1.1 g, 4.97 mmol, 86.1% yield, 96.6% purity) as a brown solid. 1H NMR (400 MHZ, DMSO-d6) δ=12.72-11.45 (m, 1H), 8.05 (br d, J=9.8 Hz, 1H), 7.48 (s, 1H), 7.33 (s, 1H), 6.71-6.59 (m, 1H). ESI [M+H]=214.0/216.0.

What is claimed is:

1. A method of modulating autophagy in a subject in need thereof, comprising administering to the subject a therapeutically effective amount of a pharmaceutical composition comprising an autophagy modulating agent selected from the group consisting of:

(G2-54)

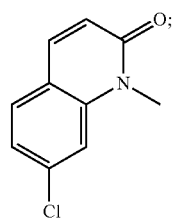

(G2-69)

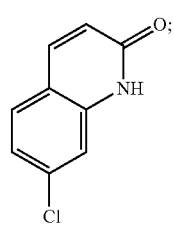

(G2-115)

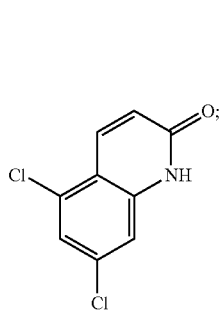

(G2-124)

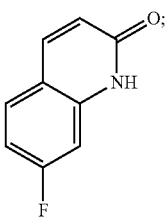

(G2-156)

(G2-195)

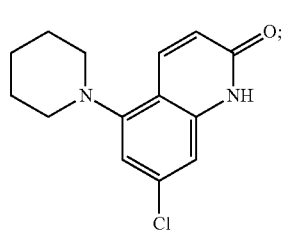

(G2-196)

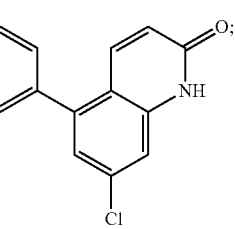

-continued

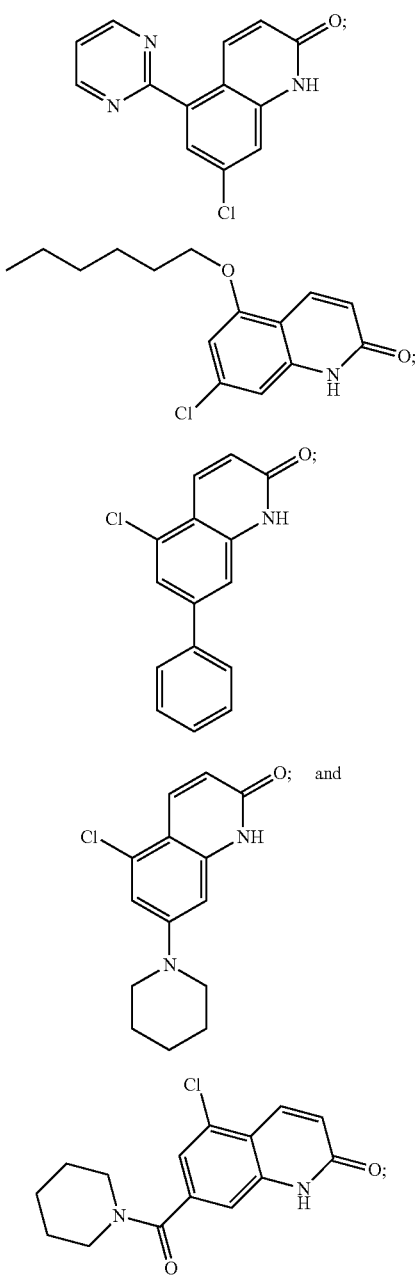

(G2-197)
(G2-218)
(G2-233)
(G2-235) and
(G2-237)

or a pharmaceutically acceptable salt, tautomer, stereoisomer, or analog thereof.

2. The method of claim 1, wherein the subject has or is suspected of having an autophagy-associated disease, disorder, or condition.

3. The method of claim 2, wherein the autophagy-associated disease, disorder, or condition is alpha-1 antitrypsin deficiency (ATD).

4. The method of claim 2, wherein the autophagy-associated disease, disorder, or condition is liver disease from alpha-1-antitrypsin deficiency (ATD).

5. The method of claim 2, wherein the autophagy-associated disease, disorder, or condition is Alzheimer's disease (AD).

6. The method of claim 2, wherein the autophagy-associated disease, disorder, or condition is diabetes.

7. The method of claim 2, wherein the autophagy-associated disease, disorder, or condition is Huntington's disease (HD).

8. The method of claim 2, wherein the autophagy-associated disease, disorder, or condition is cancer.

9. The method of claim 1, wherein the therapeutically effective amount of the pharmaceutical composition comprising the autophagy modulating agent reduces aggregated ATZ protein in the subject having α1-antitrypsin deficiency (ATD).

10. The method of claim 1, wherein the therapeutically effective amount of the pharmaceutical composition comprising the autophagy modulating agent reduces cellular accumulation of misfolded aggregated α1-antitrypsin Z variant (ATZ).

11. The method of claim 1, wherein the therapeutically effective amount of the pharmaceutical composition comprising the autophagy modulating agent reduces cellular accumulation of misfolded or aggregated proteins.

12. The method of claim 1, wherein the therapeutically effective amount of the pharmaceutical composition comprising the autophagy modulating agent has anti-tumor activity in the subject having cancer.

13. The method of claim 1, wherein the therapeutically effective amount of the pharmaceutical composition comprising the autophagy modulating agent reduces neuronal cell death.

14. The method of claim 1, wherein the therapeutically effective amount of the pharmaceutical composition comprising the autophagy modulating agent treats hepatic fibrosis.

15. The method of claim 1, wherein the therapeutically effective amount of the pharmaceutical composition comprising the autophagy modulating agent reduces accumulation of misfolded protein in liver cells, liver damage, liver fibrosis, or liver failure.

16. The method of claim 1, wherein the therapeutically effective amount of the pharmaceutical composition comprising the autophagy modulating agent reduces liver fibrosis.

17. The method of claim 1, wherein the therapeutically effective amount of the pharmaceutical composition comprising the autophagy modulating agent does not affect insulin secretion.

* * * * *